United States Patent
Murata et al.

(10) Patent No.: US 10,331,053 B2
(45) Date of Patent: Jun. 25, 2019

(54) METHOD FOR PRODUCING TONER FOR DEVELOPING ELECTROSTATIC IMAGE

(71) Applicant: KAO CORPORATION, Tokyo (JP)

(72) Inventors: Shoichi Murata, Wakayama (JP); Hiroto Hayashi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/542,583

(22) PCT Filed: Jan. 14, 2016

(86) PCT No.: PCT/JP2016/050991
§ 371 (c)(1),
(2) Date: Jul. 10, 2017

(87) PCT Pub. No.: WO2016/114351
PCT Pub. Date: Jul. 21, 2016

(65) Prior Publication Data
US 2018/0004105 A1    Jan. 4, 2018

(30) Foreign Application Priority Data
Jan. 14, 2015   (JP) ................. 2015-005203

(51) Int. Cl.
*G03G 9/087* (2006.01)
*G03G 9/08* (2006.01)
*C08G 63/20* (2006.01)

(52) U.S. Cl.
CPC .......... *G03G 9/0806* (2013.01); *C08G 63/20* (2013.01); *G03G 9/08755* (2013.01); *G03G 9/08782* (2013.01); *G03G 9/08791* (2013.01); *G03G 9/08795* (2013.01); *G03G 9/08797* (2013.01)

(58) Field of Classification Search
CPC .......... G03G 9/08755; G03G 9/08786; G03G 9/08791; G03G 9/08782; G03G 9/0806
See application file for complete search history.

(56) References Cited

U.S. PATENT DOCUMENTS

| | | | |
|---|---|---|---|
| 2009/0035679 A1* | 2/2009 | Ogawa | G03G 9/081 430/106.2 |
| 2010/0310984 A1 | 12/2010 | Nosella et al. | |
| 2012/0107741 A1 | 5/2012 | Hiraoka et al. | |
| 2014/0370426 A1* | 12/2014 | Ishizuka | G03G 9/08755 430/105 |
| 2015/0004541 A1* | 1/2015 | Takahashi | G03G 9/08755 430/109.4 |
| 2015/0277250 A1 | 10/2015 | Shidahara et al. | |

FOREIGN PATENT DOCUMENTS

| | | |
|---|---|---|
| EP | 0 712 881 A1 | 11/1995 |
| JP | 2007-93808 A | 4/2007 |
| JP | 2012-22283 A | 2/2012 |
| JP | 2012-98427 A | 5/2012 |
| JP | 2014-89442 A | 5/2014 |
| JP | 2014-126862 A | 7/2014 |
| JP | 2014-232168 A | 12/2014 |
| JP | 2016-12067 A | 1/2016 |

OTHER PUBLICATIONS

Search Report dated Jun. 19, 2018 issued in corresponding European patent application 16737422.
International Search Report dated Mar. 1, 2016, in PCT/JP2016/050991, filed Jan. 14, 2016.

* cited by examiner

*Primary Examiner* — Peter L Vajda
(74) *Attorney, Agent, or Firm* — Oblon, McClelland, Maier & Neustadt, L.L.P.

(57) ABSTRACT

The present invention relates to a process for producing a toner for development of electrostatic images, including step (1): subjecting a polyhydric alcohol component and a polycarboxylic acid component to polycondensation reaction in the presence of a hydroxy group- or carboxy group-containing hydrocarbon wax (W1) to obtain a non-crystalline resin (A) containing a constitutional component derived from the hydrocarbon wax (W1) and also containing a polyester moiety; step (2): dispersing the non-crystalline resin (A) obtained in the step (1) in an aqueous medium to obtain an aqueous dispersion of resin particles (X); step (3): aggregating the resin particles (X) obtained in the step (2) in an aqueous medium in the presence of a crystalline polyester (B) to obtain aggregated particles; and step (4): coalescing the aggregated particles obtained in the step (3).

21 Claims, No Drawings

METHOD FOR PRODUCING TONER FOR DEVELOPING ELECTROSTATIC IMAGE

CROSS REFERENCE TO RELATED APPLICATIONS

This application is a national stage entry under 35 USC 371 of PCT/JP2016/050991 filed on Jan. 14, 2016, and claims priority to Japanese Patent Application No. 2015-005203 filed on Jan. 14, 2015.

FIELD OF THE INVENTION

The present invention relates to a process for producing a toner for development of electrostatic images.

BACKGROUND OF THE INVENTION

In the field of electrophotography, with the progress of electrophotographic systems, it has been demanded to develop toners for electrophotography which are adaptable for high image quality and high copying or printing speed. To meet the requirement of a high image quality of toners, there are known processes for producing toners having a narrow particle size distribution and a small particle size by an aggregating and coalescing method (emulsification/aggregation method or aggregation/unifying method) in which fine resin particles, etc., are aggregated and coalesced together in an aqueous medium to obtain the toners. Furthermore, in order to improve basic properties of the toners such as low-temperature fusing properties and storage stability thereof, there have been made studies on development of resins having a specific structure for use in the toners.

For example, JP 2014-126862A discloses a process for producing a toner for development of electrostatic images which exhibits both good low-temperature fusing properties and good heat resistance/storage properties, and are free from occurrence of toner cloud and excellent in charging stability and charging rise-up properties. In the process described in JP 2014-126862A, after mixing resin particles containing a crystalline polyester and releasing agent particles containing a releasing agent with each other, an aggregating agent is added dropwise to the resulting mixed particles at a predetermined temperature, and the obtained mixture is maintained at a predetermined temperature to obtain aggregated particles, and then resin particles formed of a graft polymer containing a main chain segment constituted of a polyester resin and a side chain segment constituted of an addition-polymerized resin are added to the aggregated particles to aggregate and coalesce the aggregated particles with the resin particles, thereby obtaining core/shell particles.

In addition, JP 2007-93808A discloses a toner for electrophotography which contains a polyester obtained by polycondensing a raw material monomer including a monovalent aliphatic compound that has a number-average molecular weight of 400 to 1000 and is at least one compound selected from the group consisting of a monovalent aliphatic carboxylic acid compound and a monovalent aliphatic alcohol, as a resin binder, and which is excellent in dispersibility of a releasing agent therein and has good anti-offset properties.

Furthermore, JP 2014-232168A discloses a toner for development of electrostatic images including a resin binder for toners which includes a polyester resin portion and a vinyl-based resin portion containing constitutional units derived from styrene and (meth)acrylic acid, and further includes a specific amount of a structural moiety derived from a hydroxy group-containing hydrocarbon wax having a melting point of 60 to 110° C., and can exhibit both good low-temperature fusing properties and good long-term storage stability under high-temperature and high-humidity conditions.

SUMMARY OF THE INVENTION

The present invention relates to a process for producing a toner for development of electrostatic images, including the following steps (1) to (4):

step (1): subjecting a polyhydric alcohol component and a polycarboxylic acid component to polycondensation reaction in the presence of a hydroxy group- or carboxy group-containing hydrocarbon wax (W1) to obtain a non-crystalline resin (A) containing a constitutional component derived from the hydrocarbon wax (W1) and also containing a polyester moiety;

step (2): dispersing the non-crystalline resin (A) obtained in the step (1) in an aqueous medium to obtain an aqueous dispersion of resin particles (X);

step (3): aggregating the resin particles (X) obtained in the step (2) in an aqueous medium in the presence of a crystalline polyester (B) to obtain aggregated particles; and step (4): coalescing the aggregated particles obtained in the step (3).

DETAILED DESCRIPTION OF THE INVENTION

As described above, by using a crystalline polyester or a wax in a toner, it is possible to reduce a fusing temperature of the resulting toner owing to melting properties thereof. However, in the aggregating and coalescing method (emulsification/aggregation method or aggregation/unifying method) in which the toner is obtained by aggregating and coalescing the particles in an aqueous medium, it tends to be difficult to uniformly mix the toner components having a relatively high hydrophobicity such as the crystalline polyester and wax owing to lack of a step of forcibly kneading the toner components by application of a high shear force thereto unlike the kneading/pulverization method that is similarly used as a method for production of the toner. As a result, in the aggregating and coalescing method, there tends to occur variation in composition of the resulting particles, so that the obtained toner tends to have a broad charge distribution and tends to be deteriorated in developability. For this reason, there is a demand for a toner that is improved in charging properties in order to attain a sharp charge distribution and ensure good charging stability that is hardly adversely influenced by environmental conditions. In addition, from the viewpoint of achieving a high image quality of the toner, it has also been required not only to reduce a particle size of the toner and attain a sharp particle size distribution of the toner, but also to improve color develop ability of the toner, i.e., optical density of printed images obtained using the toner.

The present invention relates to a process for producing a toner for development of electrostatic images which is excellent in low-temperature fusing properties and charging properties as well as optical density of printed images obtained using the toner.

The present inventors have found that when producing a toner for development of electrostatic images by an aggregating and coalescing method, by using a crystalline polyester and a wax in combination with a resin having a specific structure, it is possible to produce the toner that is excellent in low-temperature fusing properties and charging properties as well as optical density of printed images obtained using the toner.

That is, the present invention relates to a process for producing a toner for development of electrostatic images, including the following steps (1) to (4):

step (1): subjecting a polyhydric alcohol component and a polycarboxylic acid component to polycondensation reaction in the presence of a hydroxy group- or carboxy group-containing hydrocarbon wax (W1) to obtain a non-crystalline resin (A) containing a constitutional component derived from the hydrocarbon wax (W1) and also containing a polyester moiety;

step (2): dispersing the non-crystalline resin (A) obtained in the step (1) in an aqueous medium to obtain an aqueous dispersion of resin particles (X);

step (3): aggregating the resin particles (X) obtained in the step (2) in an aqueous medium in the presence of a crystalline polyester (B) to obtain aggregated particles; and step (4): coalescing the aggregated particles obtained in the step (3).

In accordance with the present invention, there is provided a process for producing a toner for development of electrostatic images which is excellent in low-temperature fusing properties and charging properties as well as optical density of printed images obtained using the toner.

The process for producing a toner for development of electrostatic images according to the present invention includes the aforementioned steps (1) to (4), and can exhibits such an effect that the resulting toner for development of electrostatic images (hereinafter also referred to merely as a "toner") is excellent in low-temperature fusing properties and charging properties such as charge distribution and charging stability as well as optical density of printed images obtained using the toner. The reason why the aforementioned advantageous effect can be attained by the present invention is considered as follows, though it is not clearly determined yet.

That is, the toner produced by the production process of the present invention includes a non-crystalline resin (A) containing a constitutional component derived from a hydroxy group- or carboxy group-containing hydrocarbon wax (W1) and also containing a polyester moiety, and a crystalline polyester (B).

Since the non-crystalline resin (A) containing the polyester moiety is produced in the presence of the hydroxy group- or carboxy group-containing hydrocarbon wax (W1), the resulting non-crystalline resin (A) includes the hydroxy group- or carboxy group-containing hydrocarbon wax (W1) bonded thereto. By dispersing the non-crystalline resin (A) in an aqueous medium, it is possible to form resin particles (X) in which the constitutional component derived from the hydrocarbon wax (W1) is present as a hydrophobic group on an inside of the respective particles, whereas the more hydrophilic polyester moiety is present on an outside thereof.

When the resin particles (X) are aggregated in the presence of the crystalline polyester (B), the crystalline polyester (B) having relatively high hydrophobic properties is finely dispersed by the action of the constitutional component derived from the hydrocarbon wax (W1) and enclosed in the resulting aggregated particles. In addition, when the aggregated particles are coalesced together, the finely dispersed condition of the crystalline polyester (B) in the respective particles is maintained to thereby obtain toner particles having a uniform composition. For this reason, it is considered that the resulting toner is excellent in low-temperature fusing properties, can exhibit a sharp charge distribution that is likely to be influenced by the composition or conditions of the toner particles, and can be improved in charging stability against the change in environmental conditions.

In addition, in the case where the toner produced by the production process of the present invention includes the non-crystalline resin (A) containing the constitutional component derived from the hydroxy group- or carboxy group-containing hydrocarbon wax (W1) and also containing the polyester moiety, the crystalline polyester (B) and a wax (W2), the resin particles (X) are aggregated in the presence of the crystalline polyester (B) and the wax (W2), so that the crystalline polyester (B) having relatively high hydrophobic properties and the wax (W2) are finely dispersed by the action of the constitutional component derived from the hydrocarbon wax (W1) and enclosed in the resulting aggregated particles. In addition, when the aggregated particles are coalesced together, the finely dispersed condition of the crystalline polyester (B) and the wax (W2) in the respective particles is maintained to thereby obtain toner particles having a uniform composition, and further the wax (W2) can be prevented from suffering from exposure onto the surface of the respective toner particles. For this reason, it is considered that the resulting toner is excellent in low-temperature fusing properties, can exhibit a sharp charge distribution that is likely to be influenced by the composition or conditions of the surface of the toner, and can be improved in charging stability against the change in environmental conditions.

Furthermore, since the toner is produced in the aqueous medium by the aggregating and coalescing method, it is possible to produce the toner particles in which the finely dispersed condition of the crystalline polyester (B) is maintained, or the finely dispersed condition of the crystalline polyester (B) and the wax (W2) is maintained. When the toner particles are fused, the crystalline polyester (B) finely dispersed therein is rapidly melted, and the non-crystalline resin (A) is also melted in association therewith via the constitutional component derived from the hydrocarbon wax (W1). As a result, it is considered that the resin portions in the toner particles are improved in compatibility therebetween and can be prevented from suffering from internal refraction and irregular reflection, so that printed images obtained using the toner can be enhanced in optical density.

In the following, the respective steps to be conducted in the production process of the present invention are described.

[Step (1)]

In the step (1), the polyhydric alcohol component and the polycarboxylic acid component are subjected to polycondensation reaction in the presence of the hydroxy group- or carboxy group-containing hydrocarbon wax (W1) to obtain the non-crystalline resin (A) containing the constitutional component derived from the hydrocarbon wax (W1) and also containing the polyester moiety.

<Hydrocarbon Wax (W1)>

The hydrocarbon wax (W1) is in the form of a hydroxy group- or carboxy group-containing hydrocarbon wax, and may contain either one or both of a hydroxy group and a carboxy group. However, from the viewpoint of improving reactivity with the polyester as well as from the viewpoint of improving low-temperature fusing properties and charging properties of the resulting toner and enhancing optical density of printed images obtained using the toner, it is preferred that the hydrocarbon wax (W1) contains both of a hydroxy group and a carboxy group.

The hydroxy group- or carboxy group-containing hydrocarbon wax (W1) is produced by modifying a hydrocarbon wax as a raw material by conventionally known methods. Specific examples of the raw material of the hydrocarbon wax (W1) include a paraffin wax, a Fischer-Tropsch wax, a microcrystalline wax and a polyethylene wax. Of these raw materials of the hydrocarbon wax (W1), preferred are a paraffin wax and a Fischer-Tropsch wax. Examples of commercially available products of the paraffin wax and Fischer-Tropsch wax as the reaction raw materials of the hydrocarbon wax (W1) include "HNP-11", "HNP-9", "HNP-10", "FT-0070", "HNP-51" and "FNP-0090" all available from Nippon Seiro Co., Ltd., etc.

The hydroxy group-containing hydrocarbon wax may be produced by modifying a hydrocarbon wax such as the aforementioned paraffin wax and Fischer-Tropsch wax by subjecting the hydrocarbon wax to oxidation treatment. The oxidation treatment may be conducted, for example, by the methods described in JP 62-79267A, JP 2010-197979A, etc. More specifically, the oxidation treatment is conducted by the method of subjecting the hydrocarbon wax to liquid phase oxidation with an oxygen-containing gas in the presence of boric acid.

Examples of commercially available products of the hydroxy group-containing hydrocarbon wax include "UNILIN 700", "UNILIN 425" and "UNILIN 550" all available from BAKER PETROLITE Corporation, etc.

Examples of the carboxy group-containing hydrocarbon wax includes acid-modified waxes, and the carboxy group-containing hydrocarbon wax may be produced by introducing a carboxy group into a hydrocarbon wax such as the aforementioned paraffin wax and Fischer-Tropsch wax. Examples of the acid-modifying method include those methods described in JP 2006-328388A, JP 2007-84787A, etc. More specifically, the carboxy group may be introduced into the hydrocarbon wax by adding an organic peroxide compound (as a reaction initiator) such as DCP (dicumyl peroxide) and a carboxylic acid compound to a melt of the hydrocarbon wax to react therewith.

Examples of commercially available products of the carboxy group-containing hydrocarbon wax include "Hi-WAX 1105" (maleic anhydride-modified ethylene-propylene copolymer) available from Mitsui Chemicals, Inc., etc.

The hydroxy group- and carboxy group-containing hydrocarbon wax may be produced, for example, by the same method as used in the oxidation treatment for production of the aforementioned hydroxy group-containing hydrocarbon wax.

Examples of commercially available products of the hydroxy group- and carboxy group-containing hydrocarbon wax include "Paracohol 6420", "Paracohol 6470" and "Paracohol 6490" all available from Nippon Seiro Co., Ltd., etc.

The hydroxy value of the hydroxy group-containing hydrocarbon wax is preferably not less than 40 mgKOH/g, more preferably not less than 50 mgKOH/g, even more preferably not less than 70 mgKOH/g and further even more preferably not less than 90 mgKOH/g, and is also preferably not more than 180 mgKOH/g, more preferably not more than 150 mgKOH/g, even more preferably not more than 120 mgKOH/g and further even more preferably not more than 100 mgKOH/g, from the viewpoint of improving reactivity with the polyester and from the viewpoint of improving low-temperature fusing properties and charging properties of the resulting toner and enhancing optical density of printed images obtained using the toner.

From the same viewpoints as described above, the acid value of the carboxy group-containing hydrocarbon wax is preferably not less than 1 mgKOH/g, more preferably not less than 5 mgKOH/g and even more preferably not less than 8 mgKOH/g, and is also preferably not more than 30 mgKOH/g, more preferably not more than 25 mgKOH/g and even more preferably not more than 20 mgKOH/g.

The hydroxy value of the hydroxy group- and carboxy group-containing hydrocarbon wax is preferably not less than 40 mgKOH/g, more preferably not less than 50 mgKOH/g, even more preferably not less than 70 mgKOH/g and further even more preferably not less than 90 mgKOH/g, and is also preferably not more than 180 mgKOH/g, more preferably not more than 150 mgKOH/g, even more preferably not more than 120 mgKOH/g and further even more preferably not more than 100 mgKOH/g, from the viewpoint of improving reactivity with the polyester and from the viewpoint of improving low-temperature fusing properties and charging properties of the resulting toner and enhancing optical density of printed images obtained using the toner.

From the same viewpoints as described above, the acid value of the hydroxy group- and carboxy group-containing hydrocarbon wax is preferably not less than 1 mgKOH/g, more preferably not less than 5 mgKOH/g and even more preferably not less than 8 mgKOH/g, and is also preferably not more than 30 mgKOH/g, more preferably not more than 25 mgKOH/g and even more preferably not more than 20 mgKOH/g.

From the same viewpoints as described above, the sum of the hydroxy value and the acid value of the hydroxy group- and carboxy group-containing hydrocarbon wax is preferably not less than 41 mgKOH/g, more preferably not less than 55 mgKOH/g, even more preferably not less than 80 mgKOH/g and further even more preferably not less than 90 mgKOH/g, and is also preferably not more than 210 mgKOH/g, more preferably not more than 175 mgKOH/g, even more preferably not more than 140 mgKOH/g and further even more preferably not more than 120 mgKOH/g.

Meanwhile, the hydroxy value and the acid value of the hydrocarbon wax (W1) may be determined by the methods described in Examples below.

The melting point of the hydrocarbon wax (W1) is preferably not lower than 60° C., more preferably not lower than 65° C., even more preferably not lower than 70° C. and further even more preferably not lower than 73° C. from the viewpoint of improving low-temperature fusing properties and charging properties of the resulting toner and enhancing optical density of printed images obtained using the toner, and is also preferably not higher than 120° C., more preferably not higher than 110° C., even more preferably not higher than 100° C., further even more preferably not higher than 95° C. and still further even more preferably not higher than 80° C. from the viewpoint of improving low-temperature fusing properties of the resulting toner.

The number-average molecular weight of the hydrocarbon wax (W1) is preferably not less than 500, more preferably not less than 600 and even more preferably not less than 700, and is also preferably not more than 2000, more preferably not more than 1700 and even more preferably not more than 1500, from the viewpoint of improving low-temperature fusing properties and charging properties of the resulting toner and enhancing optical density of printed images obtained using the toner.

<Non-Crystalline Resin (A)>

The non-crystalline resin (A) containing the polyester moiety contains the constitutional component derived from the hydrocarbon wax (W1), and also includes a segment constituted of a polyester resin produced by subjecting a polyhydric alcohol component and a polycarboxylic acid component to polycondensation reaction (hereinafter also referred to as a "polyester segment (a1)").

In the present invention, the non-crystalline resin as used herein means those resins having a crystallinity index of more than 1.4 or less than 0.6 wherein the crystallinity index is defined by a ratio of a softening point to an endothermic maximum peak temperature (softening point (° C.)/endothermic maximum peak temperature (° C.)) of the resin as measured by the method described in Examples below.

The crystallinity index of the non-crystalline resin (A) is preferably not less than 1.5, more preferably not less than 1.6 and even more preferably not less than 1.7, and is also preferably not more than 4.0, more preferably not more than 3.0 and even more preferably not more than 2.5, from the viewpoint of improving low-temperature fusing properties and charging properties of the resulting toner and enhancing optical density of printed images obtained using the toner.

The crystallinity index may be appropriately controlled by adjusting kinds and proportions of the raw material monomers used as well as production conditions such as reaction temperature, reaction time and cooling rate or the like, and the value of the crystallinity index may be determined by the method described in Examples below.

(Polyester Segment (a1))

The polyester segment (a1) is a segment constituted of a polyester resin produced by subjecting a polyhydric alcohol component (A-al) and a polycarboxylic acid component (A-ac) to polycondensation reaction from the viewpoint of improving low-temperature fusing properties and charging properties of the resulting toner and enhancing optical density of printed images obtained using the toner.

The polyhydric alcohol component (A-al) preferably contains an alkyleneoxide adduct of bisphenol A in an amount of not less than 80 mol % from the viewpoint of improving low-temperature fusing properties and charging properties of the resulting toner and enhancing optical density of printed images obtained using the toner. The content of the alkyleneoxide adduct of bisphenol A in the polyhydric alcohol component (A-al) is preferably not less than 80 mol %, more preferably not less than 90 mol %, even more preferably not less than 95 mol %, further even more preferably not less than 98 mol % and still further even more preferably 100 mol % from the same viewpoints as described above.

The alkyleneoxide adduct of bisphenol A is preferably at least one compound selected from the group consisting of an ethyleneoxide adduct of bisphenol A (polyoxyethylene-2,2-bis(4-hydroxyphenyl)propane) and a propyleneoxide adduct of bisphenol A (polyoxypropylene-2,2-bis(4-hydroxyphenyl)propane), and more preferably a propyleneoxide adduct of bisphenol A.

The average molar number of addition of an alkyleneoxide in the alkyleneoxide adduct of bisphenol A is preferably not less than 1, more preferably not less than 1.2 and even more preferably not less than 1.5, and is also preferably not more than 16, more preferably not more than 12, even more preferably not more than 8 and further even more preferably not more than 4, from the viewpoint of improving low-temperature fusing properties and charging properties of the resulting toner and enhancing optical density of printed images obtained using the toner.

The polyhydric alcohol component (A-al) may also contain the other polyhydric alcohol component than the alkyleneoxide adduct of bisphenol A. Examples of the other polyhydric alcohol component which may be contained in the polyhydric alcohol component (A-al) include aliphatic diols, aromatic diols, alicyclic diols, trivalent or higher-valent polyhydric alcohols, and alkylene (having not less than 2 and not more than 4 carbon atoms) oxide adducts of these alcohols (average molar number of addition of the alkyleneoxide: not less than 1 and not more than 16). Specific examples of the other polyhydric alcohol component which may be contained in the polyhydric alcohol component (A-al) include aliphatic diols such as ethylene glycol, 1,2-propanediol, 1,3-propanediol, 1,2-butanediol, 1,3-butanediol, 1,4-butanediol, 2,3-butanediol, neopentyl glycol, 1,4-butenediol, 1,5-pentanediol, 1,6-hexanediol, 1,8-octanediol, 1,9-nonanediol, 1,10-decanediol and 1,12-dodecanediol; aromatic diols such as bisphenol A (2,2-bis(4-hydroxyphenyl)propane) or alkylene (having 4 carbon atoms) oxide adducts of the aromatic diols (average molar number of addition of the alkyleneoxide: not less than 1 and not more than 16); alicyclic diols such as hydrogenated bisphenol A (2,2-bis(4-hydroxycyclohexyl)propane) or alkylene (having not less than 2 and not more than 4 carbon atoms) oxide adducts of the alicyclic diols (average molar number of addition of the alkyleneoxide: not less than 2 and not more than 12); and trivalent or higher-valent polyhydric alcohols such as glycerin, pentaerythritol, trimethylol propane and sorbitol or alkylene (having not less than 2 and not more than 4 carbon atoms) oxide adducts of the trivalent or higher-valent polyhydric alcohols (average molar number of addition of the alkyleneoxide; not less than 1 and not more than 16).

These polyhydric alcohol components (A-al) may be used alone or in combination of any two or more thereof.

Examples of the polycarboxylic acid component (A-ac) include dicarboxylic acids, trivalent or higher-valent polycarboxylic acids, and anhydrides and alkyl (having not less than 1 and not more than 3 carbon atoms) esters of these acids. Of these acids, preferred are dicarboxylic acids, and more preferred is a combination of a dicarboxylic acid and a trivalent or higher-valent polycarboxylic acid.

Examples of the dicarboxylic acids include aromatic dicarboxylic acids, aliphatic dicarboxylic acids and alicyclic dicarboxylic acids. Of these dicarboxylic acids, preferred are aromatic dicarboxylic acids and aliphatic dicarboxylic acids.

The polycarboxylic acid component (A-ac) may also include, in addition to these free acids, anhydrides capable of producing an acid by decomposition thereof during the reaction, and alkyl (having not less than 1 and not more than 3 carbon atoms) esters of the carboxylic acids.

Examples of the aromatic dicarboxylic acids include phthalic acid, isophthalic acid and terephthalic acid. Of these aromatic dicarboxylic acids, from the viewpoint of improving low-temperature fusing properties and charging properties of the resulting toner and enhancing optical density of printed images obtained using the toner, preferred are isophthalic acid and terephthalic acid, and more preferred is terephthalic acid.

From the same viewpoints as described above, the aliphatic dicarboxylic acids preferably have not less than 2 and not more than 30 carbon atoms, and more preferably not less than 3 and not more than 20 carbon atoms.

Examples of the aliphatic dicarboxylic acids having not less than 2 and not more than 30 carbon atoms include oxalic acid, malonic acid, maleic acid, fumaric acid, citraconic acid, itaconic acid, glutaconic acid, succinic acid, adipic acid, sebacic acid, 1,12-dodecanedioic acid, azelaic acid, and substituted succinic acids containing an alkyl group having not less than 1 and not more than 20 carbon atoms or an alkenyl group having not less than 2 and not more than 20 carbon atoms as a substituent group. Of these aliphatic dicarboxylic acids, from the viewpoint of improving charging properties of the resulting toner, preferred is fumaric acid. Specific examples of the substituted succinic acids containing an alkyl group having not less than 1 and not more than 20 carbon atoms or an alkenyl group having not less than 2 and not more than 20 carbon atoms as a substituent group include dodecyl succinic acid, dodecenyl succinic acid and octenyl succinic acid.

Among these dicarboxylic acids, preferred is at least one acid selected from the group consisting of terephthalic acid, fumaric acid, dodecenyl succinic acid and anhydrides of these acids. From the viewpoint of improving low-temperature fusing properties and charging properties of the resulting toner and enhancing optical density of printed images obtained using the toner, more preferred is a combination of any two or more of these acids, and even more preferred is a combination of terephthalic acid and fumaric acid.

As the trivalent or higher-valent polycarboxylic acids, from the viewpoint of improving low-temperature fusing properties and charging properties of the resulting toner and enhancing optical density of printed images obtained using the toner, preferred are trimellitic acid and trimellitic anhydride, and more preferred is trimellitic anhydride.

In addition, in the case where the polycarboxylic acid component (A-ac) includes the trivalent or higher-valent polycarboxylic acids, the content of the trivalent or higher-valent polycarboxylic acids in the polycarboxylic acid component (A-ac) is preferably not less than 3 mol % and more preferably not less than 5 mol %, and is also preferably not more than 30 mol % and more preferably not more than 20 mol %, from the viewpoint of improving low-temperature fusing properties and charging properties of the resulting toner and enhancing optical density of printed images obtained using the toner.

These polycarboxylic acid components (A-ac) may be used alone or in combination of any two or more kinds thereof.

The mole equivalent ratio of a carboxy group (COOH group) of the polycarboxylic acid component (A-ac) to a hydroxy group (OH group) of the polyhydric alcohol component (A-al) (COOH group/OH group) in the polyester segment is preferably not less than 0.7 and more preferably not less than 0.8, and is also preferably not more than 1.3 and more preferably not more than 1.2, from the viewpoint of improving low-temperature fusing properties and charging properties of the resulting toner and enhancing optical density of printed images obtained using the toner.

The non-crystalline resin (A) may be a non-crystalline polyester resin constituted of the aforementioned polyester segment (a1) solely as described above, but is preferably in the form of a composite resin further including the following vinyl-based resin segment (a2) from the viewpoint of improving low-temperature fusing properties and charging properties of the resulting toner and enhancing optical density of printed images obtained using the toner.
(Vinyl-Based Resin Segment (a2))

The vinyl-based resin segment (a2) preferably contains a constitutional unit derived from a styrene-based compound from the viewpoint of improving low-temperature fusing properties and charging properties of the resulting toner and enhancing optical density of printed images obtained using the toner.

As the styrene-based compound, there may be mentioned substituted or unsubstituted styrene. Examples of the substituent group of the substituted styrene include an alkyl group having not less than 1 and not more than 5 carbon atoms, a halogen atom, an alkoxy group having not less than 1 and not more than 5 carbon atoms, a sulfonic group or a salt thereof, etc. Specific examples of the preferred styrene-based compound include styrenes such as styrene, methyl styrene, α-methyl styrene, β-methyl styrene, tert-butyl styrene, chlorostyrene, chloromethyl styrene, methoxystyrene, styrenesulfonic acid or a salt thereof, etc. Of these styrene-based compounds, preferred are those compounds containing styrene as a constituent thereof, and more preferred is styrene.

The content of the styrene-based compound in the raw material vinyl monomer as the component from which the vinyl-based resin segment (a2) is derived is preferably not less than 40% by mass, more preferably not less than 45% by mass and even more preferably not less than 50% by mass, and is also preferably not more than 90% by mass, more preferably not more than 80% by mass, even more preferably not more than 70% by mass and further even more preferably not more than 60% by mass, from the viewpoint of improving low-temperature fusing properties and charging properties of the resulting toner and enhancing optical density of printed images obtained using the toner.

Examples of the raw material vinyl monomer other than the styrene-based compound include (meth)acrylic acid esters such as alkyl (meth)acrylates (whose alkyl group has not less than 1 and not more than 24 carbon atoms), benzyl (meth)acrylate and dimethylaminoethyl (meth)acrylate; olefins such as ethylene, propylene and butadiene; halovinyl compounds such as vinyl chloride; vinyl esters such as vinyl acetate and vinyl propionate; vinyl ethers such as vinyl methyl ether; halogenated vinylidenes such as vinylidene chloride; and N-vinyl compounds such as N-vinyl pyrrolidone. Of these raw material vinyl monomers other than the styrene-based compound, from the viewpoint of improving low-temperature fusing properties and charging properties of the resulting toner and enhancing optical density of printed images obtained using the toner, preferred are (meth)acrylic acid esters, and more preferred are alkyl (meth)acrylates (whose alkyl group has not less than 1 and not more than 24 carbon atoms).

The term "(meth)acrylic acid ester" as used herein means an acrylic acid ester or a methacrylic acid ester.

The number of carbon atoms of the alkyl group in the alkyl (meth)acrylates is preferably not less than 1, more preferably not less than 4 and even more preferably not less than 6 from the viewpoint of improving low-temperature fusing properties and charging properties of the resulting toner and enhancing optical density of printed images obtained using the toner, and is also preferably not more than 24, more preferably not more than 22 and even more preferably not more than 20 from the viewpoint of improving availability of the monomers.

Specific examples of the alkyl (meth)acrylates include methyl (meth)acrylate, ethyl (meth)acrylate, (iso)propyl (meth)acrylate, (iso- or tertiary-)butyl (meth)acrylate, (iso) amyl (meth)acrylate, cyclohexyl (meth) acrylate, 2-ethylhexyl (meth)acrylate, (iso)octyl (meth) acrylate, (iso)decyl (meth)acrylate, (iso)dodecyl (meth) acrylate, (iso)palmityl (meth) acrylate, (iso)stearyl (meth)acrylate and (iso)behenyl (meth)acrylate. Of these alkyl (meth)acrylates, preferred is 2-ethylhexyl (meth)acrylate or stearyl methacrylate, and more preferred is 2-ethylhexyl acrylate.

Meanwhile, the term "(iso- or tertiary-)" as used herein means the structure in which the group expressed by any of "normal", "iso-" and tertiary-" is present, and the term "(iso)" as used herein means the structure in which the group expressed by any of "normal" and "iso-" is present.

As the raw material vinyl monomer constituting the vinyl-based resin segment (a2), among these compounds, preferred is styrene solely or a combination of styrene and the (meth)acrylic acid ester, more preferred is a combination of styrene and the (meth)acrylic acid ester, and even more preferred is a combination of styrene and the alkyl (meth) acrylate containing an alkyl group having not less than 6 and not more than 20 carbon atoms, from the viewpoint of improving availability of the monomers and from the viewpoint of enhancing optical density of printed images obtained using the toner and improving low-temperature fusing properties and charging properties of the resulting toner.

In the case where the styrene-based compound is used in combination with the (meth)acrylic acid ester, the content of the (meth)acrylic acid ester in the raw material vinyl monomer as the component from which the vinyl-based resin segment (a2) is derived is preferably not less than 10% by mass, more preferably not less than 20% by mass, even more preferably not less than 30% by mass and further even more preferably not less than 40% by mass, and is also preferably not more than 60% by mass, more preferably not more than 55% by mass and even more preferably not more than 50% by mass, from the viewpoint of improving low-temperature fusing properties and charging properties of the resulting toner and enhancing optical density of printed images obtained using the toner.

The total content of the styrene-based compound and the (meth)acrylic acid ester in the raw material vinyl monomer as the component from which the vinyl-based resin segment (a2) is derived is preferably not less than 80% by mass, more preferably not less than 90% by mass, even more preferably not less than 95% by mass and further even more preferably 100% by mass, from the viewpoint of improving low-temperature fusing properties and charging properties of the resulting toner and enhancing optical density of printed images obtained using the toner.

In the case where the non-crystalline resin (A) is in the form of a composite resin, by using a bireactive monomer as the raw material monomer of the composite resin, the bireactive monomer is reacted with both the polyester segment (a1) and the vinyl-based resin segment (a2), so that it is possible to suitably produce the composite resin. More specifically, the non-crystalline resin (A) in the form of a composite resin preferably contains a constitutional unit derived from the bireactive monomer. In addition, the constitutional unit derived from the bireactive monomer preferably acts as a bonding point between the vinyl-based resin segment (a2) and the polyester segment (a1).

As the bireactive monomer, there may be used those vinyl monomers containing at least one functional group selected from the group consisting of a hydroxy group, a carboxy group, an epoxy group, a primary amino group and a secondary amino group in a molecule thereof. Of these vinyl monomers, from the viewpoint of improving the reactivity, preferred are vinyl monomers containing a hydroxy group and/or a carboxy group, and more preferred are vinyl monomers containing a carboxy group. Specific examples of the vinyl monomers include acrylic acid, methacrylic acid, fumaric acid and maleic acid. Of these vinyl monomers, from the viewpoint of improving reactivity of both the polycondensation reaction and addition polymerization reaction, preferred is at least one monomer selected from the group consisting of acrylic acid and methacrylic acid, and more preferred is acrylic acid.

From the viewpoint of improving dispersibility of the addition polymer containing the styrene-based compound as a constitutional unit thereof in the polyester resin and well controlling the addition polymerization reaction and polycondensation reaction, the bireactive monomer is used in an amount of preferably not less than 1 mole part, more preferably not less than 3 mole parts and even more preferably not less than 5 mole parts, and also preferably not more than 30 mole parts, more preferably not more than 20 mole parts and even more preferably not more than 10 mole parts, on the basis of 100 mole parts of a whole amount of the polyhydric alcohol component (A-al) as the raw material of the polyester segment (a1). Meanwhile, in the case where the bireactive monomer is used in the composite resin, the contents of the respective components in the composite resin may be calculated assuming that the constitutional unit derived from the bireactive monomer is included in the constitutional units of the polyester segment (a1).

The content of the non-crystalline polyester resin or the composite resin in the non-crystalline resin (A) is preferably not less than 80% by mass, more preferably not less than 90% by mass, even more preferably not less than 95% by mass and further even more preferably substantially 100% by mass from the viewpoint of improving low-temperature fusing properties and charging properties of the resulting toner and enhancing optical density of printed images obtained using the toner.

In the case where the non-crystalline resin (A) is in the form of a composite resin, the content of the polyester segment (a1) in the composite resin is preferably not less than 40% by mass, more preferably not less than 60% by mass and even more preferably not less than 70% by mass from the viewpoint of improving low-temperature fusing properties of the resulting toner and enhancing optical density of printed images obtained using the toner, and is also preferably not more than 90% by mass and more preferably not more than 85% by mass from the viewpoint of improving charging properties of the resulting toner and enhancing optical density of printed images obtained using the toner. From the same viewpoints as described above, the content of the polyester segment (a1) in the composite resin is preferably not less than 40% by mass, more preferably not less than 60% by mass and even more preferably not less than 70% by mass, and is also preferably not more than 90% by mass and more preferably not more than 85% by mass, on the basis of 100% by mass of a total content of the polyester segment (a1) and the vinyl-based resin segment (a2).

The content of the vinyl-based resin segment (a2) in the composite resin is preferably not less than 10% by mass and more preferably not less than 15% by mass from the viewpoint of improving charging properties of the resulting toner and enhancing optical density of printed images obtained using the toner, and is also preferably not more than 60% by mass, more preferably not more than 40% by mass and even more preferably not more than 30% by mass from the viewpoint of improving low-temperature fusing properties of the resulting toner and enhancing optical density of printed images obtained using the toner. From the same viewpoints as described above, the content of the vinyl-based resin segment (a2) in the composite resin is preferably not less than 10% by mass and more preferably not less than 15% by mass, and is also preferably not more than 60% by mass, more preferably not more than 40% by mass and even more preferably not more than 30% by mass, on the basis of 100% by mass of a total content of the polyester segment (a1) and the vinyl-based resin segment (a2).

In addition, the total content of the polyester segment (a1) and the vinyl-based resin segment (a2) in the composite resin is preferably not less than 80% by mass, more preferably not less than 90% by mass, even more preferably not less than 93% by mass and further even more preferably not less than 95% by mass, and is also preferably not more than 100% by mass and more preferably not more than 96% by mass, from the viewpoint of improving low-temperature fusing properties and charging properties of the resulting toner and enhancing optical density of printed images obtained using the toner.

<Production of Non-Crystalline Resin (A)>

More specifically, the non-crystalline resin (A) is preferably produced by the following method (i) because the polycondensation reaction temperature can be selected with a high degree of freedom.

(i) Method in which the polycondensation reaction between the polyhydric alcohol component (A-al) and the polycarboxylic acid component (A-ac) is conducted in the presence of the hydrocarbon wax (W1), followed by the addition polymerization reaction of the raw material vinyl monomer of the vinyl-based resin component (a2) and the bireactive monomer which may be optionally used, if required.

Meanwhile, in the case where the non-crystalline resin (A) is in the form of a composite resin, the bireactive monomer is preferably supplied together with the raw material vinyl monomer of the vinyl-based resin component (a2) to the reaction system, from the viewpoint of improving the reactivity. In addition, from the viewpoint of improving the reactivity, there may be used a catalyst such as an esterification catalyst and an esterification co-catalyst. Furthermore, there may also be used a radical polymerization initiator and a radical polymerization inhibitor.

In addition, there is more preferably used such a method in which after subjecting a part of the polycarboxylic acid component (A-ac) to the polycondensation reaction and then conducting the addition polymerization reaction, the reaction temperature is raised again, and a remaining part of the polycarboxylic acid component (A-ac) is added to the reaction system to allow the polycondensation reaction and, if required, the reaction with the bireactive monomer to further proceed.

In addition, the non-crystalline resin (A) in the form of a composite resin may also be produced by the following method (ii) or (iii).

(ii) Method in which the addition polymerization reaction of the raw material vinyl monomer of the vinyl-based resin component (a2) and the bireactive monomer is conducted in the presence of the hydrocarbon wax (W1), followed by the polycondensation reaction of the raw material monomer of the polyester segment (a1).

(iii) Method in which the polycondensation reaction between the polyhydric alcohol component (A-al) and the polycarboxylic acid component (A-ac) and the addition polymerization reaction between the raw material vinyl monomer of the vinyl-based resin component (a2) and the bireactive monomer are conducted in parallel with each other in the presence of the hydrocarbon wax (W1).

The polycondensation reaction and the addition polymerization reaction in each of the aforementioned methods (i) to (iii) are preferably conducted in the same reaction vessel.

The temperature used in the polycondensation reaction is preferably not lower than 160° C., more preferably not lower than 180° C. and even more preferably not lower than 200° C., and is also preferably not higher than 260° C., more preferably not higher than 250° C. and even more preferably not higher than 245° C., from the viewpoint of enhancing productivity of the non-crystalline resin (A).

The temperature used in the addition polymerization reaction may vary depending upon the kind of radical polymerization initiator used, etc., and is preferably not lower than 110° C., more preferably not lower than 130° C. and even more preferably not lower than 150° C., and is also preferably not higher than 220° C., more preferably not higher than 200° C. and even more preferably not higher than 180° C., from the viewpoint of enhancing productivity of the non-crystalline resin (A).

It is also preferred that the reaction system is held under reduced pressure in a later stage of the polymerization reaction to promote the reaction.

Examples of the esterification catalyst suitably used in the polycondensation reaction include tin compounds such as dibutyl tin oxide and tin (II) di(2-ethyl hexanoate), and titanium compounds such as titanium diisopropylate bistriethanol aminate.

The amount of the esterification catalyst used is preferably not less than 0.01 part by mass, more preferably not less than 0.1 part by mass and even more preferably not less than 0.3 part by mass, and is also preferably not more than 5 parts by mass, more preferably not more than 2 parts by mass and even more preferably not more than 1 part by mass, on the basis of 100 parts by mass of a total amount of the polyhydric alcohol component (A-al) and the polycarboxylic acid component (A-ac), from the viewpoint of improving the reactivity.

Examples of the esterification co-catalyst include pyrogallol compounds such as pyrogallol, gallic acid (same as 3,4,5-trihydroxybenzoic acid) and gallic acid esters; benzophenone derivatives such as 2,3,4-trihydroxybenzophenone and 2,2',3,4-tetrahydroxybenzophenone; and catechin derivatives such as epigallocatechin and epigallocatechin gallate. Of these esterification co-catalysts, gallic acid is preferred from the viewpoint of improving the reactivity.

The amount of the esterification co-catalyst used in the polycondensation reaction is preferably not less than 0.001 part by mass, more preferably not less than 0.01 part by mass and even more preferably not less than 0.03 part by mass, and is also preferably not more than 0.5 part by mass, more preferably not more than 0.2 part by mass and even more preferably not more than 0.1 part by mass, on the basis of 100 parts by mass of a total amount of the polyhydric alcohol component (A-al) and the polycarboxylic acid component (A-ac), from the viewpoint of improving the reactivity.

Examples of the polymerization initiator used in the addition polymerization reaction include conventionally known radical polymerization initiators, e.g., peroxides such as dibutyl peroxide, persulfates such as sodium persulfate and azo compounds such as 2,2'-azobis(2,4-dimethyl valeronitrile), etc.

The amount of the radical polymerization initiator used in the addition polymerization reaction is preferably not less than 1 part by mass and more preferably not less than 3 parts by mass, and is also preferably not more than 20 parts by mass and more preferably not more than 15 parts by mass, on the basis of 100 parts by mass of the raw material vinyl monomer of the vinyl-based resin segment (a2).

Examples of the radical polymerization inhibitor used in the aforementioned reaction include 4-tert-butyl catechol, etc.

The amount of the radical polymerization inhibitor used in the aforementioned reaction is preferably not less than 0.001 part by mass and more preferably not less than 0.005 part by mass, and is also preferably not more than 0.5 part by mass, more preferably not more than 0.2 part by mass and even more preferably not more than 0.1 part by mass, on the basis of 100 parts by mass of a total amount of the polyhydric alcohol component (A-al) and the polycarboxylic acid component (A-ac).

The amount of the hydrocarbon wax (W1) used on the basis of the non-crystalline resin (A) is controlled such that the content of the hydrocarbon wax (W1) in the raw materials constituting the non-crystalline resin (A) is preferably not less than 1% by mass, more preferably not less than 2% by mass and even more preferably not less than 3% by mass, and is also preferably not more than 15% by mass, more preferably not more than 12% by mass and even more preferably not more than 10% by mass, from the viewpoint of improving low-temperature fusing properties and charging properties of the resulting toner and enhancing optical density of printed images obtained using the toner.

The reaction percentage of the hydrocarbon wax (W1) is preferably not less than 70% and more preferably not less than 90% from the viewpoint of improving low-temperature fusing properties and charging properties of the resulting toner and enhancing optical density of printed images obtained using the toner.

Therefore, the content of the constitutional component derived from the hydrocarbon wax (W1) in the non-crystalline resin (A) is preferably not less than 0.7% by mass, more preferably not less than 1.4% by mass and even more preferably not less than 2% by mass, and is also preferably not more than 15% by mass, more preferably not more than 12% by mass and even more preferably not more than 10% by mass, from the viewpoint of improving low-temperature fusing properties and charging properties of the resulting toner and enhancing optical density of printed images obtained using the toner.

Meanwhile, the structural moiety derived from the hydrocarbon wax (W1) which is included in the non-crystalline resin (A) means a moiety of the non-crystalline resin (A) to which the hydrocarbon wax (W1) is bonded via an ester bond. The content of the structural moiety derived from the hydrocarbon wax (W1) in the non-crystalline resin (A) may be determined, for example, by subjecting the resin to measurement of nuclear magnetic resonance spectroscopy using proton nuclei ($^1$H-NMR) and calculating an integrated value of characteristic peaks peculiar to the polyester and the hydrocarbon wax (W1) as observed therein. The content of the aforementioned structural moiety derived from the hydrocarbon wax (W1) in the non-crystalline resin (A) may also be conveniently calculated by the method described in Examples below, more specifically, may be calculated on the basis of amounts of the raw materials compounded. In this case, the content of the polyester segment (a1) in the non-crystalline resin (A) may be calculated as a theoretical yield obtained by removing an amount of water produced upon the polymerization for production of the non-crystalline resin (A), and the content of the vinyl-based resin component (a2) in the non-crystalline resin (A) may be calculated assuming that the content of the radical polymerization initiator is involved therein.

The softening point of the non-crystalline resin (A) is preferably not lower than 70° C., more preferably not lower than 90° C. and even more preferably not lower than 100° C. from the viewpoint of improving charging properties of the resulting toner and enhancing optical density of printed images obtained using the toner, and is also preferably not higher than 140° C., more preferably not higher than 120° C. and even more preferably not higher than 110° C. from the viewpoint of improving low-temperature fusing properties and charging properties of the resulting toner and enhancing optical density of printed images obtained using the toner.

The glass transition temperature of the non-crystalline resin (A) is preferably not lower than 30° C., more preferably not lower than 35° C. and even more preferably not lower than 40° C., and is also preferably not higher than 70° C., more preferably not higher than 60° C. and even more preferably not higher than 55° C., from the same viewpoints as described above.

The acid value of the non-crystalline resin (A) is preferably not less than 5 mgKOH/g, more preferably not less than 10 mgKOH/g and even more preferably not less than 15 mgKOH/g, and is also preferably not more than 40 mgKOH/g, more preferably not more than 35 mgKOH/g and even more preferably not more than 30 mgKOH/g, from the viewpoint of improving dispersion stability of the belowmentioned resin particles (X) and from the viewpoint of improving low-temperature fusing properties and charging properties of the resulting toner and enhancing optical density of printed images obtained using the toner.

The softening point, glass transition temperature and acid value of the non-crystalline resin (A) may be appropriately controlled by adjusting kinds and proportions of the raw material monomers used as well as production conditions such as reaction temperature, reaction time and cooling rate or the like, and the values of these properties may be respectively determined by the methods described in Examples below.

Meanwhile, when the non-crystalline resin (A) is used in the form of a mixture of two or more kinds of resins, the softening point, glass transition temperature and acid value of the mixture preferably fall within the aforementioned respective ranges.

[Step (2)]

In the step (2), the non-crystalline resin (A) obtained in the step (1) is dispersed in an aqueous medium to obtain an aqueous dispersion of resin particles (X).

<Resin Particles (X)>

The resin particles (X) are resin particles that constitute the toner obtained by the production process of the present invention, and include the non-crystalline resin (A). The resin particles (X) are obtained in the form of an aqueous dispersion prepared by dispersing the resin component including the non-crystalline resin (A), if required, together with optional components such as a colorant, in an aqueous medium.

The resin particles (X) may be previously compounded with a part or whole of the crystalline polyester (B) which is allowed to coexist therewith in the step (3).

In addition, the resin particles (X) may be previously compounded with a part or whole of the crystalline polyester (B) as well as a part or whole of the wax (W2) which both are allowed to coexist therewith in the step (3).

As the method of producing the aqueous dispersion of the resin particles (X), there may be used a method of adding the non-crystalline resin (A), etc., to the aqueous medium and subjecting the resulting mixture to dispersion treatment using a disperser or the like, a method of gradually adding the aqueous medium to the non-crystalline resin (A), etc., to subject the resulting mixture to phase inversion emulsification, and the like. Among these methods, the method using the phase inversion emulsification is preferred from the viewpoint of improving low-temperature fusing properties and charging properties of the resulting toner and enhancing optical density of printed images obtained using the toner.

<Aqueous Medium>

The aqueous medium used for producing the resin particles (X) preferably contains water as a main component. From the viewpoint of improving dispersion stability of the aqueous dispersion of the resin particles (X) and attaining good environmental suitability, the content of water in the aqueous medium is preferably not less than 80% by mass, more preferably not less than 90% by mass, even more preferably not less than 95% by mass, further even more preferably not less than 98% by mass and still further even more preferably 100% by mass. As the water, deionized water or distilled water is preferably used.

Examples of components other than water which may constitute the aqueous medium together with water include water-soluble organic solvents, e.g., alkyl alcohols having not less than 1 and not more than 5 carbon atoms; dialkyl ketones having not less than 3 and not more than 5 carbon atoms, such as acetone and methyl ethyl ketone; and cyclic ethers such as tetrahydrofuran. Of these organic solvents, from the viewpoint of preventing inclusion of the organic solvents into the resulting toner, preferred are alkyl alcohols having not less than 1 and not more than 5 carbon atoms which are incapable of dissolving the polyester therein, and more preferred are methanol, ethanol, isopropanol and butanol.

(Phase Inversion Emulsification Method)

As the method of performing the phase inversion emulsification, there may be mentioned a method (1-1) of adding the aqueous medium to a solution prepared by dissolving the non-crystalline resin (A) and the aforementioned other optional components in an organic solvent to subject the resulting solution to phase inversion emulsification, and a method (1-2) of adding the aqueous medium to a resin mixture prepared by melting and mixing the non-crystalline resin (A) and the aforementioned other optional components to subject the resulting mixture to phase inversion emulsification. Of these methods, from the viewpoint of obtaining a homogeneous aqueous dispersion of the resin particles (X), preferred is the method (1-1).

In the method (1-1), it is preferred that the non-crystalline resin (A) and the aforementioned other optional components are first dissolved in an organic solvent to prepare an organic solvent solution of a mixture containing the non-crystalline resin (A) and the aforementioned other optional components, and then the aqueous medium is added to the thus obtained solution to subject the solution to phase inversion emulsification.

The organic solvent used in the aforementioned method preferably has a solubility parameter (SP value: refer to "Polymer Handbook, Third Edition", published in 1989 by John Wiley & Sons, Inc.) of not less than 15.0 MPa$^{1/2}$, more preferably not less than 16.0 MPa$^{1/2}$ and even more preferably not less than 17.0 MPa$^{1/2}$, and also preferably not more than 26.0 MPa$^{1/2}$, more preferably not more than 24.0 MPa$^{1/2}$ and even more preferably not more than 22.0 MPa$^{1/2}$, from the viewpoint of facilitating dissolution of the non-crystalline resin (A) and phase inversion thereof in the aqueous medium.

Specific examples of the organic solvent used include alcohol solvents such as ethanol (26.0), isopropanol (23.5) and isobutanol (21.5); ketone solvents such as acetone (20.3), methyl ethyl ketone (19.0), methyl isobutyl ketone (17.2) and diethyl ketone (18.0); ether solvents such as dibutyl ether (16.5), tetrahydrofuran (18.6) and dioxane (20.5); and acetic acid ester solvents such as ethyl acetate (18.6) and isopropyl acetate (17.4). Meanwhile, the numeral values in parentheses appearing after the respective organic solvents indicate SP values (unit: MPa$^{1/2}$) thereof. Of these organic solvents, from the viewpoint of facilitating removal of the organic solvents from the mixed solution obtained after adding the aqueous medium thereto, preferred is at least one solvent selected from the group consisting of ketone solvents and acetic acid ester solvents, more preferred is at least one solvent selected from the group consisting of methyl ethyl ketone, ethyl acetate and isopropyl acetate, and even more preferred is methyl ethyl ketone.

The mass ratio of the organic solvent to the resin(s) constituting the resin particles (X) (organic solvent/resin(s) constituting resin particles (X)) is preferably not less than 0.1, more preferably not less than 0.2 and even more preferably not less than 0.4, and is also preferably not more than 4, more preferably not more than 2 and even more preferably not more than 1, from the viewpoint of facilitating dissolution of the resin and phase inversion thereof in the aqueous medium as well as from the viewpoint of improving dispersion stability of the resin particles (X).

In the aforementioned method (1-1), it is preferable to add a neutralizing agent to the solution. As the neutralizing agent, there may be used a basic substance. Examples of the basic substance include hydroxides of alkali metals such as lithium hydroxide, sodium hydroxide and potassium hydroxide; and nitrogen-containing basic substances such as ammonia, trimethyl amine, ethyl amine, diethyl amine, triethyl amine, diethanol amine, triethanol amine and tributyl amine. Of these basic substances, from the viewpoint of improving dispersion stability and aggregating properties of the resin particles (X), preferred are hydroxides of alkali metals, and more preferred is sodium hydroxide.

The degree (mol %) of neutralization of the non-crystalline resin (A) with the neutralizing agent is preferably not less than 10 mol % and more preferably not less than 30 mol %, and is also preferably not more than 150 mol %, more preferably not more than 120 mol % and even more preferably not more than 100 mol %.

Meanwhile, the degree (mol %) of neutralization of the resin may be calculated according to the following formula.

Degree of neutralization=[{mass (g) of neutralizing agent added/equivalent of neutralizing agent}/[{acid value of resin (mgKOH/g)×mass (g) of resin}/(56×1000)]]×100.

The amount of the aqueous medium added is preferably not less than 100 parts by mass, more preferably not less than 150 parts by mass and even more preferably not less than 200 parts by mass, and is also preferably not more than 900 parts by mass, more preferably not more than 600 parts by mass and even more preferably not more than 400 parts by mass, on the basis of 100 parts by mass of the non-crystalline resin (A) constituting the resin particles (X), from the viewpoint of improving dispersion stability of the resin particles (X) and obtaining uniform aggregated particles in the subsequent step (3).

In addition, from the viewpoint of improving dispersion stability of the resin particles (X), the mass ratio of the aqueous medium to the organic solvent (aqueous medium/organic solvent) is preferably not less than 20/80, more preferably not less than 50/50 and even more preferably not less than 80/20, and is also preferably not more than 97/3, more preferably not more than 93/7 and even more preferably not more than 90/10.

The temperature used upon adding the aqueous medium is preferably not lower than a glass transition temperature of the non-crystalline resin (A) from the viewpoint of improving dispersion stability of the resin particles (X). More specifically, the temperature used upon adding the aqueous medium is preferably not lower than 50° C., more preferably not lower than 60° C. and even more preferably not lower than 70° C., and is also preferably not higher than 85° C., more preferably not higher than 80° C. and even more preferably not higher than 75° C.

From the viewpoint of obtaining the resin particles (X) having a small particle size, the velocity of addition of the aqueous medium until terminating the phase inversion is preferably not less than 0.1 part by mass/minute, more preferably not less than 0.5 part by mass/minute, even more preferably not less than 1 part by mass/minute and further even more preferably not less than 3 parts by mass/minute, and is also preferably not more than 50 parts by mass/minute, more preferably not more than 30 parts by mass/minute, even more preferably not more than 20 parts by mass/minute and further even more preferably not more than 10 parts by mass/minute, on the basis of 100 parts by mass of the non-crystalline resin (A) constituting the resin particles (X). However, the velocity of addition of the aqueous medium after terminating the phase inversion is not particularly limited.

After completion of the phase inversion emulsification, the step of removing the organic solvent from the obtained dispersion may be conducted, if required. Since the organic solvent is dissolved in the aqueous medium, distillation is preferably used as the method of removing the organic solvent from the dispersion. In this case, the dispersion is preferably heated to a temperature not lower than a boiling point of the organic solvent used while stirring to thereby distil off the organic solvent therefrom. In addition, from the viewpoint of maintaining good dispersion stability of the resin particles (X), the dispersion is more preferably subjected to distillation under reduced pressure, and furthermore the distillation is preferably conducted under constant temperature and constant pressure conditions. Meanwhile, the dispersion may be heated after reducing the pressure, or the pressure may be reduced after heating the dispersion.

In addition, it is not necessarily required to completely remove the organic solvent from the aqueous dispersion, and a small amount of the organic solvent may remain in the aqueous dispersion. In this case, the amount of the organic solvent remaining in the aqueous dispersion is preferably not more than 1% by mass, more preferably not more than 0.5% by mass and even more preferably substantially 0%.

Meanwhile, the term "substantially 0%" as used herein means that the amount of the organic solvent remaining in the aqueous dispersion of the resin particles is not more than 0.01% by mass. The amount of the organic solvent remaining in the aqueous dispersion of the resin particles is more preferably not more than 0.001% by mass.

The solid content of the resulting aqueous dispersion of the resin particles (X) is preferably not less than 5% by mass, more preferably not less than 10% by mass and even more preferably not less than 15% by mass, and is also preferably not more than 50% by mass, more preferably not more than 40% by mass, even more preferably not more than 30% by mass and further even more preferably not more than 25% by mass, from the viewpoint of enhancing productivity of the toner and improving dispersion stability of the aqueous dispersion of the resin particles (X). Meanwhile, the solid content means a total content of non-volatile components including resins, colorants, surfactants and the like.

The volume median particle size ($D_{50}$) of the resin particles (X) in the aqueous dispersion is preferably not less than 0.05 μm, more preferably not less than 0.10 μm and even more preferably not less than 0.12 μm, and is also preferably not more than 0.80 μm, more preferably not more than 0.40 μm and even more preferably not more than 0.20 μm, from the viewpoint of obtaining a toner that is capable of forming high quality images.

Meanwhile, the volume median particle size ($D_{50}$) as used herein means a particle size at which a cumulative volume frequency calculated on the basis of a volume fraction of the particles from a smaller particle size side thereof is 50%, and may be determined by the method described in Examples below.

The coefficient of variation of particle size distribution (CV: %) of the resin particles (X) is preferably not less than 5%, more preferably not less than 15% and even more preferably not less than 20% from the viewpoint of enhancing productivity of the aqueous dispersion of the resin particles (X), and is also preferably not more than 50%, more preferably not more than 40% and even more preferably not more than 30% from the viewpoint of obtaining a toner that is capable of forming high quality images.

Meanwhile, the CV as used herein means the value represented by the following formula. The volume-average particle size as denoted in the following formula means a particle size that is obtained by multiplying a particle size of particles as measured on the volume basis by a proportion of the particles having the particle size and then dividing the obtained value by the number of the particles. More specifically, the volume-average particle size may be determined by the method described in Examples below.

CV (%)=[Standard Deviation of Particle Size Distribution (nm)/Volume-Average Particle Size (nm)]×100.

[Step (3)]

The step (3) is a step of aggregating the resin particles (X) obtained in the step (2) in an aqueous medium in the presence of the crystalline polyester (B) to obtain aggregated particles, and preferably a step of aggregating the resin particles (X) obtained in the step (2) in an aqueous medium in the presence of the crystalline polyester (B) and a wax (W2) to obtain aggregated particles. More specifically, from the viewpoint of improving low-temperature fusing properties and charging properties of the resulting toner and enhancing optical density of printed images obtained using the toner, the step (3) is more preferably any of the following steps (3-1) to (3-3).

(3-1) Method in which an aqueous dispersion of the resin particles (X) and an aqueous dispersion of resin particles (Y) containing the crystalline polyester (B), preferably together with a wax (W2) particle dispersion containing the wax (W2) and, if required, optional components such as an aggregating agent, a surfactant and a colorant, are subjected to aggregation treatment in an aqueous medium to obtain aggregated particles;

(3-2) Method in which upon producing the aqueous dispersion of the resin particles (X) in the aforementioned step (2), the non-crystalline resin (A) and the crystalline polyester (B) are mixed to obtain a resin mixture, and by using the resin mixture, resin particles ($X_{AB}$) containing the resin particles (X) as well as the crystalline polyester (B) incorporated in the resin particles (X) are produced, and further the resin particles ($X_{AB}$), preferably together with a wax (W2) particle dispersion containing the wax (W2) and, if required, optional components such as an aggregating agent, a surfactant and a colorant, are subjected to aggregation treatment in an aqueous medium to obtain aggregated particles; or (3-3) Method in which upon producing the aqueous dispersion of the resin particles (X) in the aforementioned step (2), the non-crystalline resin (A), the crystalline polyester (B)

and the wax (W2) are mixed to obtain a mixture thereof, and by using the mixture, resin particles ($X_{ABW2}$) containing the resin particles (X) as well as the crystalline polyester (B) and the wax (W2) which are incorporated in the resin particles (X) are produced, and further the resin particles ($X_{ABW2}$), if required, together with optional components such as an aggregating agent, a surfactant and a colorant, are subjected to aggregation treatment in an aqueous medium to obtain aggregated particles.

As described above, in the step (3), the crystalline polyester (B) and the wax (W2) may be present either in such a state that they are incorporated in the resin particles (X), or may be present in such a state that they are not incorporated in the resin particles (X), i.e., may be present in the form of resin particles (Y) containing the crystalline polyester (B), wax (W2) particles, etc.

Among these methods, from the viewpoint of improving production stability of the toner, preferred is the method (3-1) or the method (3-2), and more preferred is the method (3-1).

In addition, the step (3) may also include the following step (3A), and may further include the following step (3B) to be successively conducted subsequent to the step (3A):

step (3A): aggregating the resin particles (X) obtained in the step (2) in an aqueous medium in the presence of the crystalline polyester (B) and further preferably the wax (W2) to obtain aggregated particles (1); and step (3B): adding resin particles (Z) containing a non-crystalline polyester (C) to the aggregated particles (1) obtained in the step (3A) to obtain aggregated particles (2) formed by adhering the resin particles (Z) to the aggregated particles (1).

Meanwhile, in the case where the step (3A) is carried out, but the step (3B) is not carried out, the "aggregated particles obtained in the step (3)" as denoted in the step (4) mean the "aggregated particles (1) obtained in the step (3A)", and in such a case, the step (4) is referred to as the step (4A).

On the other hand, in the case where the step (3A) and the step (3B) both are carried out, the "aggregated particles obtained in the step (3)" as denoted in the step (4) mean the "aggregated particles (2) obtained in the step (3B)", and in such a case, the step (4) is referred to as the step (4B).

<Step (3A)>

The step (3A) is a step of aggregating the resin particles (X) obtained in the step (2) in an aqueous medium in the presence of the crystalline polyester (B) to obtain aggregated particles (1), and preferably a step of aggregating the resin particles (X) obtained in the step (2) in an aqueous medium in the presence of the crystalline polyester (B) and the wax (W2) to obtain the aggregated particles (1). The aforementioned method (3-1), i.e., the method in which an aqueous dispersion of the resin particles (X) and an aqueous dispersion of resin particles (Y) containing the crystalline polyester (B), preferably together with a wax (W2) particle dispersion containing the wax (W2) and, if required, optional components such as an aggregating agent, a surfactant and a colorant, are subjected to aggregation treatment in an aqueous medium to obtain aggregated particles, is explained below as an example.

(Crystalline Polyester (B))

The crystalline polyester (B) is produced by subjecting a polyhydric alcohol (B-al) and a polycarboxylic acid component (B-ac) to polycondensation reaction.

The crystalline polyester as used in the present invention means those polyesters whose crystallinity index as defined above is not less than 0.6 and not more than 1.4.

The crystallinity index of the crystalline polyester (B) is preferably not less than 0.8 and more preferably not less than 0.9, and is also preferably not more than 1.3 and more preferably not more than 1.2, from the viewpoint of improving low-temperature fusing properties and charging properties of the resulting toner and enhancing optical density of printed images obtained using the toner.

The crystallinity index may be appropriately controlled by adjusting kinds and proportions of the raw material monomers used as well as production conditions such as reaction temperature, reaction time and cooling rate or the like, and the value of the crystallinity index may be determined by the method described in Examples below.

The polyhydric alcohol component (B-al) preferably contains an α,ω-aliphatic diol having not less than 4 and not more than 16 carbon atoms in an amount of not less than 80 mol % from the viewpoint of improving low-temperature fusing properties and charging properties of the resulting toner and enhancing optical density of printed images obtained using the toner. The content of the α,ω-aliphatic diol having not less than 4 and not more than 16 carbon atoms in the polyhydric alcohol component (B-al) is preferably not less than 80 mol %, more preferably not less than 85 mol %, even more preferably not less than 90 mol %, further even more preferably not less than 95 mol % and still further even more preferably 100 mol %.

The number of carbon atoms of the α,ω-aliphatic diol is more preferably not less than 6 and even more preferably not less than 8, and is also more preferably not more than 14 and even more preferably not more than 12, from the same viewpoints as described above. Specific examples of the α,ω-aliphatic diol include 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, etc. Of these α,ω-aliphatic diols, from the viewpoint of improving low-temperature fusing properties and charging properties of the resulting toner and enhancing optical density of printed images obtained using the toner, preferred are 1,6-hexanediol, 1,10-decanediol and 1,12-dodecanediol; more preferred are 1,6-hexanediol and 1,10-decanediol; and even more preferred is 1,10-decanediol.

The polyhydric alcohol component (B-al) may also contain the other polyhydric alcohol components than the α,ω-aliphatic diol having not less than 4 and not more than 16 carbon atoms. Examples of the other polyhydric alcohol components include aliphatic diols having not less than 2 and not more than 7 carbon atoms such as ethylene glycol, 1,2-propylene glycol, 1,3-propylene glycol and neopentyl glycol; aromatic diols such as alkyleneoxide adducts of bisphenol A; and trivalent or higher-valent alcohols such as glycerin, pentaerythritol and trimethylol propane.

These polyhydric alcohol components (B-al) may be used alone or in combination of any two or more thereof.

The polycarboxylic acid component (B-ac) preferably contains an aliphatic saturated dicarboxylic acid having not less than 8 and not more than 16 carbon atoms in an amount of not less than 80 mol % from the viewpoint of improving low-temperature fusing properties and charging properties of the resulting toner and enhancing optical density of printed images obtained using the toner. The content of the aliphatic saturated dicarboxylic acid having not less than 8 and not more than 16 carbon atoms in the polycarboxylic acid component (B-ac) is preferably not less than 80 mol %, more preferably not less than 85 mol %, even more preferably not less than 90 mol %, further even more preferably not less than 95 mol % and still further even more preferably 100 mol %.

The number of carbon atoms of the aliphatic saturated dicarboxylic acid is more preferably not less than 9 and even more preferably not less than 10, and is also more preferably not more than 14 and even more preferably not more than 12, from the same viewpoints as described above. Specific examples of the aliphatic saturated dicarboxylic acid are sebacic acid and dodecanedioic acid. Of these acids, preferred is sebacic acid.

The polycarboxylic acid component (B-ac) may also include, in addition to these free acids, anhydrides capable of producing an acid by decomposition thereof during the reaction, and alkyl (having not less than 1 and not more than 3 carbon atoms) esters of the carboxylic acids.

These polycarboxylic acid components (B-ac) may be used alone or in combination of any two or more kinds thereof.

The mole equivalent ratio of a carboxy group (COOH group) of the polycarboxylic acid component (B-ac) to a hydroxy group (OH group) of the polyhydric alcohol component (B-al) (COOH group/OH group) is preferably not less than 0.7, more preferably not less than 0.8 and even more preferably not less than 0.9, and is also preferably not more than 1.3, more preferably not more than 1.2 and even more preferably not more than 1.1, from the viewpoint of improving low-temperature fusing properties and charging properties of the resulting toner and enhancing optical density of printed images obtained using the toner.

The softening point of the crystalline polyester (B) is preferably not lower than 60° C., more preferably not lower than 70° C. and even more preferably not lower than 80° C. from the viewpoint of improving charging properties of the resulting toner and enhancing optical density of printed images obtained using the toner, and is also preferably not higher than 150° C., more preferably not higher than 120° C. and even more preferably not higher than 100° C. from the viewpoint of improving low-temperature fusing properties of the resulting toner and enhancing optical density of printed images obtained using the toner.

The melting point of the crystalline polyester (B) is preferably not lower than 50° C., more preferably not lower than 60° C. and even more preferably not lower than 65° C., and is also preferably not higher than 100° C., more preferably not higher than 90° C. and even more preferably not higher than 80° C., from the same viewpoints as described above.

The acid value of the crystalline polyester (B) is preferably not less than 5 mgKOH/g, more preferably not less than 10 mgKOH/g and even more preferably not less than 15 mgKOH/g, and is also preferably not more than 35 mgKOH/g, more preferably not more than 30 mgKOH/g and even more preferably not more than 25 mgKOH/g, from the viewpoint of improving low-temperature fusing properties and charging properties of the resulting toner as well as from the viewpoint of improving dispersion stability of the below-mentioned resin particles (Y).

The softening point, melting point and acid value of the crystalline polyester (B) may be appropriately controlled by adjusting kinds and proportions of the raw material monomers used as well as production conditions such as reaction temperature, reaction time and cooling rate or the like, and the values of these properties may be respectively determined by the methods described in Examples below.

Meanwhile, while the crystalline polyester (B) is in the form of a mixture of two or more kinds of polyesters, the values of the softening point, glass transition temperature and acid value of the mixture preferably fall within the aforementioned respective ranges.

(Production of Crystalline Polyester (B))

The crystalline polyester (B) may be produced, for example, by subjecting the polyhydric alcohol component (B-al) and the polycarboxylic acid component (B-ac) to polycondensation reaction in an inert gas atmosphere, if required, using an esterification catalyst, an esterification co-catalyst, a radical polymerization inhibitor, etc.

As the esterification catalyst, esterification co-catalyst and radical polymerization inhibitor, there may be used the same as those used for synthesis of the aforementioned non-crystalline resin (A).

The amount of the esterification catalyst used is preferably not less than 0.01 part by mass, more preferably not less than 0.05 part by mass and even more preferably not less than 0.1 part by mass, and is also preferably not more than 5 parts by mass, more preferably not more than 2 parts by mass and even more preferably not more than 1 part by mass, on the basis of 100 parts by mass of a total amount of the polyhydric alcohol component (B-al) and the polycarboxylic acid component (B-ac).

The temperature used in the polycondensation reaction is preferably not lower than 120° C., more preferably not lower than 160° C. and even more preferably not lower than 180° C., and is also preferably not higher than 250° C., more preferably not higher than 230° C. and even more preferably not higher than 220° C.

(Resin Particles (Y))

The resin particles (Y) are preferably obtained in the form of an aqueous dispersion thereof by dispersing the resin component including the crystalline polyester (B), if required, together with optional components such as a colorant, in an aqueous medium.

As the method of producing the aqueous dispersion of the resin particles (Y), there may be used the same methods as used in the case of the resin particles (X), i.e., a method of adding the crystalline polyester (B), etc., to the aqueous medium and subjecting the resulting mixture to dispersion treatment using a disperser, a method of gradually adding the aqueous medium to the crystalline polyester (B), etc., to subject the resulting mixture to phase inversion emulsification, and the like. Among these methods, the method using the phase inversion emulsification is preferred from the viewpoint of improving low-temperature fusing properties and charging properties of the resulting toner and enhancing optical density of printed images obtained using the toner.

In the phase inversion emulsification, similarly to the method used for production of the resin particles (X), there is preferably used a method of adding the aqueous medium to a solution prepared by dissolving the resin and the aforementioned other optional components in an organic solvent to subject the resulting organic solvent solution to phase inversion emulsification. The preferred forms of the aqueous medium and organic solvent used in the aforementioned method are the same as those used for production of the resin particles (X).

The mass ratio of the organic solvent to the resin(s) constituting the resin particles (Y) (organic solvent/resin(s) constituting resin particles (Y)) is preferably not less than 0.1, more preferably not less than 0.2 and even more preferably not less than 0.4, and is also preferably not more than 4, more preferably not more than 2 and even more preferably not more than 1, from the viewpoint of facilitating dissolution of the resin and phase inversion thereof in the aqueous medium as well as from the viewpoint of improving dispersion stability of the resin particles (Y).

In addition, from the viewpoint of improving dispersion stability of the resin particles (Y), it is preferable to add a neutralizing agent to the solution. The preferred forms of the neutralizing agent are the same as those used for production of the resin particles (X).

The degree (mol %) of neutralization of the crystalline polyester (B) with the neutralizing agent is preferably not less than 10 mol % and more preferably not less than 30 mol %, and is also preferably not more than 150 mol %, more preferably not more than 120 mol % and even more preferably not more than 100 mol %.

The amount of the aqueous medium added is preferably not less than 100 parts by mass, more preferably not less than 150 parts by mass and even more preferably not less than 200 parts by mass, and is also preferably not more than 900 parts by mass, more preferably not more than 600 parts by mass and even more preferably not more than 400 parts by mass, on the basis of 100 parts by mass of the resin(s) constituting the resin particles (Y), from the viewpoint of improving dispersion stability of the resin particles (Y).

From the same viewpoints as described above, the mass ratio of the aqueous medium to the organic solvent (aqueous medium/organic solvent) is preferably not less than 20/80, more preferably not less than 50/50 and even more preferably not less than 80/20, and is also preferably not more than 97/3, more preferably not more than 93/7 and even more preferably not more than 90/10.

The temperature used upon adding the aqueous medium is preferably not lower than 30° C., more preferably not lower than 50° C. and even more preferably not lower than 60° C., and is also preferably not higher than 85° C., more preferably not higher than 80° C. and even more preferably not higher than 75° C., from the viewpoint of improving dispersion stability of the resin particles (Y).

From the viewpoint of obtaining the resin particles (Y) having a small particle size, the velocity of addition of the aqueous medium until terminating the phase inversion is preferably not less than 0.1 part by mass/minute, more preferably not less than 0.5 part by mass/minute, even more preferably not less than 1 part by mass/minute and further even more preferably not less than 5 parts by mass/minute, and is also preferably not more than 50 parts by mass/minute, more preferably not more than 30 parts by mass/minute, even more preferably not more than 20 parts by mass/minute and further even more preferably not more than 10 parts by mass/minute, on the basis of 100 parts by mass of the resin(s) constituting the resin particles (Y). However, the velocity of addition of the aqueous medium after terminating the phase inversion is not particularly limited.

After completion of the phase inversion emulsification, the step of removing the organic solvent from the obtained dispersion may be conducted, if required.

The preferred forms of the method of removing the organic solvent and the amount of the organic solvent remaining in the aqueous dispersion are the same as those used for production of the resin particles (X).

The solid content of the resulting aqueous dispersion of the resin particles (Y) is preferably not less than 5% by mass, more preferably not less than 10% by mass and even more preferably not less than 15% by mass, and is also preferably not more than 50% by mass, more preferably not more than 40% by mass, even more preferably not more than 30% by mass and further even more preferably not more than 25% by mass, from the viewpoint of enhancing productivity of the toner and improving dispersion stability of the aqueous dispersion of the resin particles (Y). Meanwhile, the solid content means a total content of non-volatile components including resins, colorants, surfactants and the like.

The volume median particle size ($D_{50}$) of the resin particles (Y) in the aqueous dispersion is preferably not less than 0.05 μm, more preferably not less than 0.10 μm and even more preferably not less than 0.12 μm, and is also preferably not more than 0.80 μm, more preferably not more than 0.40 μm and even more preferably not more than 0.20 μm, from the viewpoint of improving low-temperature fusing properties and charging properties of the resulting toner and enhancing optical density of printed images obtained using the toner.

The coefficient of variation of particle size distribution (CV: %) of the resin particles (Y) is preferably not less than 5%, more preferably not less than 15% and even more preferably not less than 20% from the viewpoint of enhancing productivity of the aqueous dispersion of the resin particles (Y), and is also preferably not more than 50%, more preferably not more than 40% and even more preferably not more than 30% from the viewpoint of obtaining a toner that is capable of forming high quality images.

The mass ratio of the non-crystalline resin (A) to the crystalline polyester (B) [(A)/(B)] is preferably not less than 70/30, more preferably not less than 75/25, even more preferably not less than 85/15 and further even more preferably not less than 88/12, and is also preferably not more than 98/2, more preferably not more than 95/5 and even more preferably not more than 92/8, from the viewpoint of improving low-temperature fusing properties and charging properties of the resulting toner and enhancing optical density of printed images obtained using the toner.

The total content of the non-crystalline resin (A) and the crystalline polyester (B) in the resin component constituting the toner is preferably not less than 70% by mass, more preferably not less than 80% by mass, even more preferably not less than 90% by mass, further even more preferably not less than 95% by mass, still further even more preferably not less than 98% by mass and still further even more preferably 100% by mass, from the viewpoint of improving low-temperature fusing properties and charging properties of the resulting toner and enhancing optical density of printed images obtained using the toner.

(Wax (W2))

As the wax (W2), there may be used an ester-based wax, a hydrocarbon wax, a silicone wax, a fatty acid amide, etc. Of these waxes, from the viewpoint of improving low-temperature fusing properties and charging properties of the resulting toner and enhancing optical density of printed images obtained using the toner, preferred is the hydrocarbon wax.

Examples of the hydrocarbon wax include low-molecular weight polyolefins such as polyethylene, polypropylene and polybutene; and mineral and petroleum-based waxes such as ozokerite, ceresin, paraffin wax, microcrystalline wax and Fischer-Tropsch wax. Of these hydrocarbon waxes, preferred is the paraffin wax.

Examples of the ester-based wax include esters obtained from a long-chain alcohol and a fatty acid, such as stearyl stearate and behenyl behenate; esters obtained from pentaerythritol and a fatty acid such as behenic acid; and natural waxes such as carnauba wax, rice wax, montan wax and beeswax. Of these ester-based waxes, from the viewpoint of improving low-temperature fusing properties and charging properties of the resulting toner and enhancing optical density of printed images obtained using the toner, preferred are the esters obtained from pentaerythritol and a fatty acid such as behenic acid.

The melting point of the wax (W2) is preferably not lower than 60° C., more preferably not lower than 65° C. and even more preferably not lower than 70° C., and is also preferably not higher than 100° C., more preferably not higher than 90° C. and even more preferably not higher than 80° C., from the viewpoint of improving low-temperature fusing properties and charging properties of the resulting toner and enhancing optical density of printed images obtained using the toner.

The amount of the wax (W2) used is preferably not less than 2 parts by mass, more preferably not less than 5 parts by mass and even more preferably not less than 7 parts by mass, and is also preferably not more than 30 parts by mass, more preferably not more than 20 parts by mass and even more preferably not more than 15 parts by mass, on the basis of 100 parts by mass of a total amount of the resin particles (X) and the resin particles (Y), from the viewpoint of improving releasing properties, low-temperature fusing properties and charging properties of the resulting toner and enhancing optical density of printed images obtained using the toner.

The ratio of the amount of the wax (W2) used to the amount of the hydrocarbon wax (W1) used [(W2)/(W1)] is preferably not less than 0.5, more preferably not less than 0.8, even more preferably not less than 1.2 and further even more preferably not less than 1.5, and is also preferably not more than 5.0, more preferably not more than 3.5, even more preferably not more than 2.0 and further even more preferably not more than 1.6, from the viewpoint of improving low-temperature fusing properties and charging properties of the resulting toner and enhancing optical density of printed images obtained using the toner.

The mass ratio of the non-crystalline resin (A) to the wax (W2) [(A)/(W2)] is preferably not less than 2.5, more preferably not less than 3.5 and even more preferably not less than 5.0, and is also preferably not more than 45, more preferably not more than 35, even more preferably not more than 25 and further even more preferably not more than 15, from the viewpoint of improving low-temperature fusing properties and charging properties of the resulting toner and enhancing optical density of printed images obtained using the toner.

The wax (W2) particles are preferably obtained in the form of a dispersion prepared by dispersing the wax (W2) in an aqueous medium. More specifically, the dispersion of the wax (W2) particles is preferably obtained by dispersing the wax (W2) and the aqueous medium in the presence of a surfactant, etc., at a temperature not lower than a melting point of the wax (W2) using a disperser.

As the disperser, there are preferably used a homogenizer, an ultrasonic disperser, a high-pressure disperser, etc., from the viewpoint of improving low-temperature fusing properties and charging properties of the resulting toner and enhancing optical density of printed images obtained using the toner.

As the ultrasonic disperser, there may be used, for example, an ultrasonic homogenizer. Examples of commercially available devices of the ultrasonic homogenizer include "US-150T", "US-300T" and "US-600T" all available from Nihonseiki Kaisha Ltd., and "SONIFIER (registered trademark) 4020-400" and "SONIFIER (registered trademark) 4020-800" both available from Branson Ultrasonics, Emerson Japan, Ltd.

Examples of commercially available devices of the high-pressure disperser include a high-pressure wet-type atomizer "NANOMIZER (registered trademark) NM2-L200-D08" available from Yoshida Kikai Co., Ltd.

In addition, it is preferred that before using the aforementioned disperser, the wax (W2), surfactant and aqueous medium are previously dispersed using a mixer such as a homomixer and a ball mill.

The preferred forms of the aqueous medium used for the wax (W2) are the same as those of the aqueous medium used upon obtaining the aqueous dispersion of the resin particles (Y).

The wax (W2) particles are preferably dispersed in the aqueous medium in the presence of a surfactant, from the viewpoint of improving dispersion stability of the wax particles and obtaining uniform aggregated particles.

Examples of the surfactant include a nonionic surfactant, an anionic surfactant, a cationic surfactant, etc. Of these surfactants, the anionic surfactant is preferred from the viewpoint of improving dispersion stability of the wax particles and improving aggregating properties of the wax particles and the resin particles. Specific examples of the anionic surfactant include sodium dodecylbenzenesulfonate, sodium dodecylsulfate, sodium laurylethersulfate and dipotassium alkenyl succinates. Of these anionic surfactants, preferred are dipotassium alkenyl succinates.

The content of the surfactant in the wax (W2) particle dispersion is preferably not less than 0.1% by mass, more preferably not less than 0.3% by mass and even more preferably not less than 0.5% by mass, and is also preferably not more than 5.0% by mass and more preferably not more than 2.0% by mass, from the viewpoint of improving dispersion stability of the wax particles, improving aggregating properties of the wax particles upon production of the toner, and preventing liberation of the wax particles from the resulting aggregated particles.

The solid content of the wax (W2) particle dispersion is preferably not less than 5% by mass, more preferably not less than 10% by mass and even more preferably not less than 15% by mass, and is also preferably not more than 50% by mass, more preferably not more than 30% by mass and even more preferably not more than 25% by mass, from the viewpoint of enhancing productivity of the toner and improving dispersion stability of the wax particle dispersion.

The volume median particle size ($D_{50}$) of the wax (W2) particles is preferably not less than 0.1 μm, more preferably not less than 0.2 μm and even more preferably not less than 0.3 μm, and is also preferably not more than 1 μm, more preferably not more than 0.8 μm and even more preferably not more than 0.6 μm, from the viewpoint of obtaining uniform aggregated particles and from the viewpoint of enhancing optical density of printed images obtained using the toner and improving low-temperature fusing properties and charging properties of the resulting toner.

The coefficient of variation of particle size distribution (CV) of the wax (W2) particles is preferably not less than 10% and more preferably not less than 25% from the viewpoint of enhancing productivity of the toner, and is also preferably not more than 50%, more preferably not more than 45% and even more preferably not more than 42% from the viewpoint of obtaining uniform aggregated particles and improving charging properties of the resulting toner.

The volume median particle size ($D_{50}$) and CV of the wax (W2) particles may be concretely determined by the methods described in Examples below.

Meanwhile, the toner produced according to the present invention may also contain a colorant and an antistatic agent, if required. Also, the toner may further contain other additives such as a reinforcing filler such as fibrous substances, an antioxidant and an anti-aging agent, etc., unless the advantageous effects of the present invention are adversely influenced by addition thereof.

(Aggregated Particles (1))

The aggregated particles (1) may be suitably produced by the method in which the aqueous dispersion of the resin particles (X) and the aqueous dispersion of the resin particles (Y), preferably together with the wax (W2) particle dispersion and further, if required, optional components such as an aggregating agent, a surfactant and a colorant, are subjected to aggregation treatment in an aqueous medium to thereby obtain the aggregated particles.

More concretely, it is preferred that the aqueous dispersion of the resin particles (X) and the aqueous dispersion of the resin particles (Y), preferably together with the wax (W2) particle dispersion and further, if required, the optional components such as an aggregating agent, a surfactant and a colorant, are first mixed with each other in the aqueous medium to thereby obtain a mixed dispersion, and then the particles in the mixed dispersion are aggregated to thereby obtain a dispersion of the aggregated particles (1). From the viewpoint of efficiently conducting the aggregation of the particles, an aggregating agent is preferably added to the mixed dispersion.

Meanwhile, in the case where the resin particles (X) or the resin particles (Y) contain no colorant, it is preferred that a colorant is mixed in the mixed dispersion. The mixed dispersion may also be mixed with resin particles other than the resin particles (X) and the resin particles (Y). In this case, the total content of the resin particles (X) and the resin particles (Y) in whole resin particles contained in the mixed dispersion is preferably not less than 80% by mass, more preferably not less than 90% by mass, even more preferably not less than 95% by mass, further even more preferably not less than 98% by mass and still further even more preferably 100% by mass.

The order of mixing of the respective components is not particularly limited, and these components may be added in any order or all of the components may be added at the same time.

In the case where the colorant is mixed in the mixed dispersion, it is preferred to use a dispersion of colorant particles which is prepared by dispersing the colorant in an aqueous medium.

Examples of the colorant include a pigment and a dye. Of these colorants, from the viewpoint of enhancing optical density of printed images obtained using the toner, the pigment is preferably used.

Examples of the pigment include a cyan pigment, a yellow pigment, a magenta pigment and a black pigment. Preferred examples of the cyan pigment include a phthalocyanine pigment, and more preferred is copper phthalocyanine. Preferred examples of the yellow pigment include a monoazo pigment, an isoindoline pigment and a benzimidazolone pigment. Preferred examples of the magenta pigment include a quinacridone pigment, a soluble azo pigment such as a BONA lake pigment, and an insoluble azo pigment such as a naphthol AS pigment. Preferred examples of the black pigment include carbon blacks.

Examples of the dye include acridine dyes, azo dyes, benzoquinone dyes, azine dyes, anthraquinone dyes, indigo dyes, phthalocyanine dyes and aniline black dyes.

These colorants may be used alone or in combination of any two or more thereof.

The amount of the colorant used is preferably not less than 2 parts by mass, more preferably not less than 5 parts by mass and even more preferably not less than 7 parts by mass, and is also preferably not more than 30 parts by mass, more preferably not more than 20 parts by mass and even more preferably not more than 15 parts by mass, on the basis of 100 parts by mass of a total amount of the resin particles (X) and the resin particles (Y), from the viewpoint of enhancing optical density of printed images obtained using the toner and obtaining high quality images.

The colorant particle dispersion is preferably obtained by dispersing the colorant and the aqueous medium in the presence of a surfactant, etc., using a disperser. Examples of the preferred disperser include a homogenizer and an ultrasonic disperser.

The preferred forms of the aforementioned aqueous medium are the same as those of the aqueous medium used upon production of the aqueous dispersion of the resin particles (X).

The colorant particles are preferably dispersed in the aqueous medium in the presence of a surfactant from the viewpoint of improving dispersion stability of the colorant particles.

Examples of the surfactant include a nonionic surfactant, an anionic surfactant, a cationic surfactant, etc. Of these surfactants, the anionic surfactant is preferred from the viewpoint of improving dispersion stability of the colorant particles and improving aggregating properties of the colorant particles with the resin particles (X) and the resin particles (Y). Specific examples of the anionic surfactant include sodium dodecylbenzenesulfonate, sodium dodecylsulfate, sodium laurylethersulfate and dipotassium alkenyl succinates. Of these anionic surfactants, preferred is sodium dodecylbenzenesulfonate.

The content of the surfactant in the colorant particle dispersion is preferably not less than 0.1% by mass, more preferably not less than 0.5% by mass and even more preferably not less than 1.0% by mass, and is also preferably not more than 5.0% by mass and more preferably not more than 4.5% by mass, from the viewpoint of improving dispersion stability of the colorant particles, improving aggregating properties of the colorant particles upon production of the toner and preventing liberation of the colorant particles from the resulting aggregated particles.

The solid content of the colorant particle dispersion is preferably not less than 5% by mass, more preferably not less than 10% by mass and even more preferably not less than 15% by mass, and is also preferably not more than 50% by mass, more preferably not more than 40% by mass and even more preferably not more than 30% by mass, from the viewpoint of enhancing productivity of the toner and improving dispersion stability of the colorant particle dispersion.

The volume median particle size ($D_{50}$) of the colorant particles is preferably not less than 0.050 µm, more preferably not less than 0.080 µm and even more preferably not less than 0.10 µm, and is also preferably not more than 0.50 µm, more preferably not more than 0.30 µm and even more preferably not more than 0.15 µm, from the viewpoint of obtaining a toner that is capable of forming high quality images.

The content of the resin particles (total content of the resin particles (X) and the resin particles (Y)) in the aforementioned mixed dispersion is preferably not less than 5% by mass, more preferably not less than 10% by mass and even more preferably not less than 12% by mass from the viewpoint of improving low-temperature fusing properties and charging properties of the resulting toner and enhancing optical density of printed images obtained using the toner, and is also preferably not more than 40% by mass, more preferably not more than 30% by mass and even more preferably not more than 20% by mass from the viewpoint of well controlling aggregation of the particles to obtain aggregated particles having a desired particle size.

The mass ratio of the resin particles (X) to the resin particles (Y) [(X)/(Y)] in the aforementioned mixed dispersion is preferably not less than 70/30, more preferably not less than 75/25, even more preferably not less than 85/15 and further even more preferably not less than 88/12, and is also preferably not more than 98/2, more preferably not more than 95/5 and even more preferably not more than 92/8, from the viewpoint of improving low-temperature fusing properties and charging properties of the resulting toner and enhancing optical density of printed images obtained using the toner.

The content of the wax (W2) particles in the aforementioned mixed dispersion is preferably not less than 2 parts by mass, more preferably not less than 5 parts by mass and even more preferably not less than 7 parts by mass on the basis of 100 parts by mass of a total amount of the resin particles (X) and the resin particles (Y) from the viewpoint of improving releasing properties, low-temperature fusing properties and charging properties of the resulting toner and enhancing optical density of printed images obtained using the toner, and is also preferably not more than 30 parts by mass, more preferably not more than 20 parts by mass and even more preferably not more than 15 parts by mass on the basis of 100 parts by mass of a total amount of the resin particles (X) and the resin particles (Y) from the viewpoint of improving low-temperature fusing properties of the resulting toner.

In the case where the colorant particles are mixed in the aforementioned mixed dispersion, the content of the colorant particles in the mixed dispersion is preferably not less than 2 parts by mass, more preferably not less than 5 parts by mass and even more preferably not less than 7 parts by mass, and is also preferably not more than 30 parts by mass, more preferably not more than 20 parts by mass and even more preferably not more than 15 parts by mass, on the basis of 100 parts by mass of a total amount of the resin particles (X) and the resin particles (Y) from the viewpoint of obtaining a toner that is capable of forming high quality images.

The mixing temperature is preferably not lower than 0° C., more preferably not lower than 10° C. and even more preferably not lower than 20° C., and is also preferably not higher than 40° C. and more preferably not higher than 30° C., from the viewpoint of well controlling aggregation of the particles to obtain aggregated particles having a desired particle size.

[Aggregating Agent]

Next, the particles in the mixed dispersion are aggregated together to obtain a dispersion of the aggregated particles (1). In this case, an aggregating agent is preferably added to the mixed dispersion from the viewpoint of efficiently conducting aggregation of the particles.

The aggregating agent used in the present invention is preferably an electrolyte, and more preferably a salt, from the viewpoint of obtaining a toner having a desired particle size while preventing excessive aggregation thereof. Specific examples of the aggregating agent include organic aggregating agents such as a cationic surfactant in the form of a quaternary salt and polyethyleneimine; and inorganic aggregating agents such as an inorganic metal salt, an inorganic ammonium salt and a divalent or higher-valent metal complex. Of these aggregating agents, from the viewpoint of improving aggregating properties of the particles to obtain uniform aggregated particles, preferred are inorganic aggregating agents, more preferred are an inorganic metal salt and an inorganic ammonium salt, and even more preferred is an inorganic ammonium salt.

The valence of the cation in the inorganic aggregating agents is preferably a pentavalence or lower, more preferably a divalence or lower and even more preferably a monovalence from the viewpoint of obtaining a toner having a desired particle size while preventing excessive aggregation thereof. Examples of the monovalent cation in the inorganic aggregating agents include a sodium ion, a potassium ion and an ammonium ion. Of these monovalent cations, preferred is an ammonium ion from the viewpoint of improving low-temperature fusing properties and charging properties of the resulting toner and enhancing optical density of printed images obtained using the toner.

Specific examples of the inorganic metal salt include metal salts such as sodium sulfate, sodium nitrate, sodium chloride, calcium chloride and calcium nitrate; and inorganic metal salt polymers such as poly(aluminum chloride) and poly(aluminum hydroxide).

Specific examples of the inorganic ammonium salt include ammonium sulfate, ammonium chloride and ammonium nitrate.

Among these aggregating agents, preferred is ammonium sulfate.

The amount of the aggregating agent used is preferably not less than 5 parts by mass, more preferably not less than 10 parts by mass and even more preferably not less than 20 parts by mass on the basis of 100 parts by mass of the resins constituting the resin particles (X) and the resin particles (Y) from the viewpoint of well controlling aggregation of the particles to obtain aggregated particles having a desired particle size, and also is preferably not more than 50 part by mass, more preferably not more than 45 part by mass and even more preferably not more than 40 part by mass on the basis of 100 parts by mass of the resins constituting the resin particles (X) and the resin particles (Y) from the viewpoint of improving low-temperature fusing properties and charging properties of the resulting toner and enhancing optical density of printed images obtained using the toner.

The aggregating agent is preferably added dropwise into the mixed dispersion. In this case, the aggregating agent may be added at one time, or intermittently or continuously. Upon and after adding the aggregating agent, the obtained dispersion is preferably fully stirred.

The aggregating agent to be added dropwise is preferably in the form of an aqueous solution thereof from the viewpoint of well controlling aggregation of the particles to obtain aggregated particles having a desired particle size. The concentration of the aqueous solution of the aggregating agent is preferably not less than 2% by mass, more preferably not less than 4% by mass and even more preferably not less than 6% by mass, and is also preferably not more than 40% by mass, more preferably not more than 30% by mass, even more preferably not more than 20% by mass and further even more preferably not more than 10% by mass.

Also, from the viewpoint of well controlling aggregation of the particles to obtain aggregated particles having a desired particle size and a desired particle size distribution, the pH value of the aqueous solution of the aggregating agent is preferably controlled to not less than 7.0 and not more than 9.0.

The dropwise addition time of the aggregating agent is preferably not less than 1 minute and more preferably not less than 3 minutes from the viewpoint of well controlling aggregation of the particles to obtain aggregated particles having a desired particle size, and is also preferably not more than 120 minutes, more preferably not more than 30 minutes and even more preferably not more than 10 minutes from the viewpoint of enhancing productivity of the toner.

The temperature used upon the dropwise addition of the aggregating agent is preferably not lower than 0° C., more preferably not lower than 10° C. and even more preferably not lower than 20° C., and is also preferably not higher than 45° C., more preferably not higher than 40° C., even more preferably not higher than 35° C. and further even more preferably not higher than 30° C., from the viewpoint of enhancing productivity of the toner.

Furthermore, from the viewpoint of promoting aggregation of the particles and obtaining aggregated particles having a desired particle size and a desired particle size distribution, the temperature of the dispersion obtained after adding the aggregating agent thereto is preferably raised. The temperature of the dispersion to be maintained is preferably not lower than 45° C., more preferably not lower than 50° C. and even more preferably not lower than 55° C., and is also preferably not higher than 70° C., more preferably not higher than 65° C. and even more preferably not higher than 63° C., from the viewpoint of improving low-temperature fusing properties and charging properties of the resulting toner and enhancing optical density of printed images obtained using the toner.

The volume median particle size ($D_{50}$) of the resulting aggregated particles is preferably monitored in the aforementioned temperature range to confirm proceeding of the aggregation of the particles.

From the viewpoint of improving low-temperature fusing properties and charging properties of the resulting toner and enhancing optical density of printed images obtained using the toner, the volume median particle size ($D_{50}$) of the obtained aggregated particles (1) is preferably not less than 2 μm, more preferably not less than 3 μm and even more preferably not less than 4 μm, and is also preferably not more than 10 μm, more preferably not more than 8 μm and even more preferably not more than 6 μm. The volume median particle size ($D_{50}$) of the aggregated particles (1) may be measured by the method described in Examples below.

<Step (3B)>

In the step (3B), resin particles (Z) containing a non-crystalline polyester (C) are added to the aggregated particles (1) obtained in the step (3A) to obtain aggregated particles (2) formed by adhering the resin particles (Z) to the aggregated particles (1).

In the step (3), even by conducting the step (3A) solely, it is possible to exhibit the advantageous effects of the present invention, i.e., it is possible to improve low-temperature fusing properties and charging properties of the resulting toner and enhance optical density of printed images obtained using the toner. However, by further conducting the step (3B), it is possible not only to more effectively prevent desorption of the crystalline polyester (B) and the wax (W2) finely dispersed in the aggregated particles (1) upon coalescing the respective particles in the aggregated particles in the subsequent step (4), but also to further suppress exposure of the wax (W2) onto the surface of the resulting toner particles.

(Resin Particles (Z))

The resin particles (Z) may be produced by the method of dispersing a resin component containing the non-crystalline polyester (C) in an aqueous medium to thereby obtain an aqueous dispersion of the resin particles (Z).

[Non-Crystalline Polyester (C)]

In the present invention, the non-crystalline resin means those resins whose crystallinity index as defined above is more than 1.4 or less than 0.6. The crystallinity index of the non-crystalline polyester (C) is preferably less than 0.6, or more than 1.4 and not more than 4, more preferably less than 0.6, or not less than 1.5 and not more than 4, even more preferably less than 0.6, or not less than 1.5 and not more than 3, and further even more preferably less than 0.6, or not less than 1.5 and not more than 2, from the viewpoint of improving low-temperature fusing properties and charging properties of the resulting toner and enhancing optical density of printed images obtained using the toner.

The crystallinity index may be appropriately controlled by adjusting kinds and proportions of the raw material monomers used as well as production conditions (such as, for example, reaction temperature, reaction time and cooling rate or the like), and the value of the crystallinity index may be determined by the method described in Examples below.

The non-crystalline polyester (C) is a polyester resin that may be produced by subjecting a polyhydric alcohol component (C-al) and a polycarboxylic acid component (C-ac) to polycondensation reaction from the viewpoint of improving low-temperature fusing properties and charging properties of the resulting toner and enhancing optical density of printed images obtained using the toner.

The polyhydric alcohol component (C-al) preferably contains an alkyleneoxide adduct of bisphenol A in an amount of not less than 80 mol % from the viewpoint of improving low-temperature fusing properties and charging properties of the resulting toner and enhancing optical density of printed images obtained using the toner. The content of the alkyleneoxide adduct of bisphenol A in the polyhydric alcohol component (C-al) is preferably not less than 80 mol %, more preferably not less than 90 mol %, even more preferably not less than 95 mol %, further even more preferably not less than 98 mol % and still further even more preferably 100 mol % from the viewpoint of improving low-temperature fusing properties and charging properties of the resulting toner and enhancing optical density of printed images obtained using the toner.

The alkyleneoxide adduct of bisphenol A is preferably at least one compound selected from the group consisting of an ethyleneoxide adduct of bisphenol A (polyoxyethylene-2,2-bis(4-hydroxyphenyl)propane) and a propyleneoxide adduct of bisphenol A (polyoxypropylene-2,2-bis(4-hydroxyphenyl)propane), and more preferably an ethyleneoxide adduct of bisphenol A.

The average molar number of addition of an alkyleneoxide in the alkyleneoxide adduct of bisphenol A is preferably not less than 1, more preferably not less than 1.2 and even more preferably not less than 1.5, and is also preferably not more than 16, more preferably not more than 12, even more preferably not more than 8 and further even more preferably not more than 4, from the viewpoint of improving low-temperature fusing properties and charging properties of the resulting toner and enhancing optical density of printed images obtained using the toner.

The polyhydric alcohol component (C-al) may also contain the other polyhydric alcohol component than the alkyleneoxide adduct of bisphenol A. Examples of the other polyhydric alcohol component which may be contained in the polyhydric alcohol component (C-al) include the same as those described with respect to the polyhydric alcohol component (A-al) constituting the polyester segment (a1) of the aforementioned non-crystalline resin (A). Specific examples of the other polyhydric alcohol component which may be contained in the polyhydric alcohol component (C-al) include aliphatic diols, aromatic diols, alicyclic diols, trivalent or higher-valent polyhydric alcohols, as well as alkylene (having not less than 2 and not more than 4 carbon atoms) oxide adducts of these compounds (average molar number of addition of the alkyleneoxide: not less than 1 and not more than 16).

These polyhydric alcohol components (C-al) may be used alone or in combination of any two or more thereof.

Examples of the polycarboxylic acid component (C-ac) include dicarboxylic acids, trivalent or higher-valent polycarboxylic acids, and anhydrides and alkyl (having not less than 1 and not more than 3 carbon atoms) esters of these acids. Of these acids, preferred are dicarboxylic acids, and more preferred is a combination of a dicarboxylic acid and a trivalent or higher-valent polycarboxylic acid.

Examples of the dicarboxylic acids include aromatic dicarboxylic acids, aliphatic dicarboxylic acids and alicyclic dicarboxylic acids. Of these dicarboxylic acids, preferred are aromatic dicarboxylic acids and aliphatic dicarboxylic acids, and more preferred are aromatic dicarboxylic acids.

The polycarboxylic acid component (C-ac) may also include, in addition to these free acids, anhydrides capable of producing an acid by decomposition thereof during the reaction, and alkyl (having not less than 1 and not more than 3 carbon atoms) esters of the respective carboxylic acids.

Examples of the aromatic dicarboxylic acids include phthalic acid, isophthalic acid and terephthalic acid. Of these aromatic dicarboxylic acids, from the viewpoint of improving low-temperature fusing properties and charging properties of the resulting toner and enhancing optical density of printed images obtained using the toner, preferred are isophthalic acid and terephthalic acid, and more preferred is terephthalic acid.

From the same viewpoints as described above, the aliphatic dicarboxylic acids preferably have not less than 2 and not more than 30 carbon atoms, and more preferably not less than 3 and not more than 20 carbon atoms.

Examples of the aliphatic dicarboxylic acids having not less than 2 and not more than 30 carbon atoms include oxalic acid, malonic acid, maleic acid, fumaric acid, citraconic acid, itaconic acid, glutaconic acid, succinic acid, adipic acid, sebacic acid, 1,12-dodecanedioic acid, azelaic acid, and substituted succinic acids containing an alkyl group having not less than 1 and not more than 20 carbon atoms or an alkenyl group having not less than 2 and not more than 20 carbon atoms as a substituent group. Of these aliphatic dicarboxylic acids, from the viewpoint of improving charging properties of the resulting toner, preferred is fumaric acid. Specific examples of the substituted succinic acids containing an alkyl group having not less than 1 and not more than 20 carbon atoms or an alkenyl group having not less than 2 and not more than 20 carbon atoms as a substituent group include dodecyl succinic acid, dodecenyl succinic acid and octenyl succinic acid.

Among these dicarboxylic acids, preferred is at least one acid selected from the group consisting of terephthalic acid, fumaric acid, dodecenyl succinic acid and anhydrides of these acids. From the viewpoint of improving low-temperature fusing properties and charging properties of the resulting toner and enhancing optical density of printed images obtained using the toner, more preferred is a combination of any two or more of these acids, and even more preferred is a combination of all of the three acids, i.e., a combination of terephthalic acid, fumaric acid and dodecenyl succinic acid.

As the trivalent or higher-valent polycarboxylic acids, from the viewpoint of improving low-temperature fusing properties and charging properties of the resulting toner and enhancing optical density of printed images obtained using the toner, preferred are trimellitic acid and trimellitic anhydride, and more preferred is trimellitic anhydride.

In addition, in the case where the polycarboxylic acid component (C-ac) includes the trivalent or higher-valent polycarboxylic acids, the content of the trivalent or higher-valent polycarboxylic acids in the polycarboxylic acid component (C-ac) is preferably not less than 3 mol % and more preferably not less than 5 mol %, and is also preferably not more than 30 mol % and more preferably not more than 20 mol %, from the viewpoint of improving low-temperature fusing properties and charging properties of the resulting toner and enhancing optical density of printed images obtained using the toner.

These polycarboxylic acid components (C-ac) may be used alone or in combination of any two or more kinds thereof.

The mole equivalent ratio of a carboxy group (COOH group) of the polycarboxylic acid component (C-ac) to a hydroxy group (OH group) of the polyhydric alcohol component (C-al) (COOH group/OH group) in the non-crystalline polyester (C) is preferably not less than 0.7 and more preferably not less than 0.8, and is also preferably not more than 1.2, more preferably not more than 1.1 and even more preferably not more than 1.05, from the viewpoint of improving low-temperature fusing properties and charging properties of the resulting toner and enhancing optical density of printed images obtained using the toner.

The softening point of the non-crystalline polyester (C) is preferably not lower than 90° C., more preferably not lower than 100° C. and even more preferably not lower than 110° C., and is also preferably not higher than 160° C., more preferably not higher than 140° C. and even more preferably not higher than 130° C., from the viewpoint of improving low-temperature fusing properties and charging properties of the resulting toner and enhancing optical density of printed images obtained using the toner.

The glass transition temperature of the non-crystalline polyester (C) is preferably not lower than 40° C., more preferably not lower than 50° C. and even more preferably not lower than 60° C., and is also preferably not higher than 90° C., more preferably not higher than 80° C. and even more preferably not higher than 70° C., from the same viewpoints as described above.

The acid value of the non-crystalline polyester (C) is preferably not less than 5 mgKOH/g, more preferably not less than 10 mgKOH/g and even more preferably not less than 15 mgKOH/g, and is also preferably not more than 35 mgKOH/g, more preferably not more than 30 mgKOH/g and even more preferably not more than 25 mgKOH/g, from the viewpoint of improving dispersion stability of the resin particles (Z) as well as from the viewpoint of improving low-temperature fusing properties and charging properties of the resulting toner and enhancing optical density of printed images obtained using the toner.

The softening point, glass transition temperature and acid value of the non-crystalline polyester (C) may be appropriately controlled by adjusting kinds and proportions of the raw material monomers used as well as production conditions such as reaction temperature, reaction time and cooling rate or the like, and the values of these properties may be respectively determined by the methods described in Examples below.

Meanwhile, when the non-crystalline polyester (C) is used in the form of a mixture of two or more kinds of resins, the softening point, glass transition temperature and acid value of the mixture preferably fall within the aforementioned respective ranges.

[Production of Non-Crystalline Polyester (C)]

The non-crystalline polyester (C) may be produced, for example, by subjecting the aforementioned polyhydric alcohol component (C-al) and the aforementioned polycarboxylic acid component (C-ac) to polycondensation reaction in an inert gas atmosphere, if required, using an esterification catalyst, an esterification co-catalyst, a radical polymerization inhibitor, etc.

As the esterification catalyst, esterification co-catalyst and radical polymerization inhibitor, there may be used the same as those used for synthesis of the aforementioned polyester segment (a1).

The amount of the esterification catalyst used is preferably not less than 0.01 part by mass, more preferably not less than 0.1 part by mass and even more preferably not less than 0.3 part by mass, and is also preferably not more than 5 parts by mass, more preferably not more than 2 parts by mass and even more preferably not more than 1 part by mass, on the basis of 100 parts by mass of a total amount of the polyhydric alcohol component (C-al) and the polycarboxylic acid component (C-ac).

The amount of the esterification co-catalyst used is preferably not less than 0.001 part by mass, more preferably not less than 0.01 part by mass and even more preferably not less than 0.03 part by mass, and is also preferably not more than 0.5 part by mass, more preferably not more than 0.2 part by mass and even more preferably not more than 0.1 part by mass, on the basis of 100 parts by mass of a total amount of the polyhydric alcohol component (C-al) and the polycarboxylic acid component (C-ac), from the viewpoint of improving the reactivity.

The amount of the radical polymerization inhibitor used is preferably not less than 0.001 part by mass and more preferably not less than 0.01 part by mass, and is also preferably not more than 0.5 part by mass, more preferably not more than 0.3 part by mass and even more preferably not more than 0.15 part by mass, on the basis of 100 parts by mass of a total amount of the polyhydric alcohol component (C-al) and the polycarboxylic acid component (C-ac).

The temperature used in the polycondensation reaction is preferably not lower than 140° C., more preferably not lower than 180° C. and even more preferably not lower than 200° C., and is also preferably not higher than 260° C., more preferably not higher than 250° C. and even more preferably not higher than 245° C., from the viewpoint of improving productivity of the non-crystalline polyester (C).

In addition, it is also preferred that the reaction system is held under reduced pressure in a later stage of the polymerization reaction to promote the reaction.

[Production of Resin Particles (Z)]

The resin particles (Z) are preferably obtained in the form of an aqueous dispersion thereof by dispersing the resin component including the non-crystalline polyester (C), if required, together with the aforementioned optional components, in an aqueous medium.

As the method of producing the aqueous dispersion of the resin particles (Z), there may be used the same method as used for production of the aqueous dispersion of the resin particles (X).

The mass ratio of the organic solvent to the resin(s) constituting the resin particles (Z) (organic solvent/resin(s) constituting resin particles (Z)) is preferably not less than 0.1, more preferably not less than 0.2 and even more preferably not less than 0.4, and is also preferably not more than 4, more preferably not more than 3 and even more preferably not more than 1, from the viewpoint of facilitating dissolution of the resin and phase inversion thereof in the aqueous medium as well as from the viewpoint of improving dispersion stability of the resin particles (Z).

In addition, from the viewpoint of improving dispersion stability of the resin particles (Z), it is preferable to add a neutralizing agent to the solution. The preferred forms of the neutralizing agent are the same as those used for production of the resin particles (X).

The degree (mol %) of neutralization of the non-crystalline polyester (C) with the neutralizing agent is preferably not less than 10 mol % and more preferably not less than 30 mol %, and is also preferably not more than 150 mol %, more preferably not more than 120 mol % and even more preferably not more than 100 mol %.

The amount of the aqueous medium added is preferably not less than 100 parts by mass, more preferably not less than 150 parts by mass and even more preferably not less than 200 parts by mass, and is also preferably not more than 900 parts by mass, more preferably not more than 600 parts by mass and even more preferably not more than 400 parts by mass, on the basis of 100 parts by mass of the resin(s) constituting the resin particles (Z), from the viewpoint of improving dispersion stability of the resin particles (Z).

From the same viewpoint as described above, the mass ratio of the aqueous medium to the organic solvent (aqueous medium/organic solvent) is preferably not less than 20/80, more preferably not less than 50/50 and even more preferably not less than 80/20, and is also preferably not more than 95/5, more preferably not more than 90/10 and even more preferably not more than 85/15.

The temperature used upon adding the aqueous medium is preferably not lower than 60° C. and more preferably not lower than 65° C., and is also preferably not higher than 85° C., more preferably not higher than 80° C. and even more preferably not higher than 75° C., from the viewpoint of improving dispersion stability of the resin particles (Z).

From the viewpoint of obtaining the resin particles (Z) having a small particle size, the velocity of addition of the aqueous medium until terminating the phase inversion is preferably not less than 0.1 part by mass/minute, more preferably not less than 0.5 part by mass/minute, even more preferably not less than 1 part by mass/minute and further even more preferably not less than 3 parts by mass/minute, and is also preferably not more than 50 parts by mass/minute, more preferably not more than 30 parts by mass/minute, even more preferably not more than 20 parts by mass/minute and further even more preferably not more than 10 parts by mass/minute, on the basis of 100 parts by mass of the resin(s) constituting the resin particles (Z). However, the velocity of addition of the aqueous medium after terminating the phase inversion is not particularly limited.

After completion of the phase inversion emulsification, the step of removing the organic solvent from the obtained dispersion may be conducted, if required.

The preferred forms of the method of removing the organic solvent and the amount of the organic solvent remaining in the aqueous dispersion are the same as those used for production of the resin particles (X).

The solid content of the resulting aqueous dispersion of the resin particles (Z) is preferably not less than 5% by mass, more preferably not less than 10% by mass and even more preferably not less than 15% by mass, and is also preferably not more than 50% by mass, more preferably not more than 40% by mass and even more preferably not more than 30% by mass, from the viewpoint of enhancing productivity of the toner and improving dispersion stability of the resin particles (Z). Meanwhile, the solid content means a total content of non-volatile components including resins, surfactants and the like.

The volume median particle size ($D_{50}$) of the resin particles (Z) in the aqueous dispersion is preferably not less than 0.05 μm, more preferably not less than 0.08 μm and even more preferably not less than 0.10 μm, and is also preferably not more than 0.50 μm, more preferably not more than 0.40 μm and even more preferably not more than 0.30 μm, from the viewpoint of obtaining a toner that is capable of forming high quality images.

The coefficient of variation of particle size distribution (CV: %) of the resin particles (Z) is preferably not less than 5%, more preferably not less than 10% and even more preferably not less than 15%, from the viewpoint of enhancing productivity of the aqueous dispersion of the resin particles (Z), and is also preferably not more than 50%, more preferably not more than 40% and even more preferably not more than 30%, from the viewpoint of obtaining a toner that is capable of forming high quality images.

The resin particles (Z) may also contain, in addition to the non-crystalline polyester (C), conventionally known resins that may be used for the toner, for example, such as a polyester other than the polyester (C), a styrene-acrylic copolymer, an epoxy resin, a polycarbonate, a polyurethane, etc.

The content of the non-crystalline polyester (C) in whole resin components contained in the resin particles (Z) is preferably not less than 80% by mass, more preferably not less than 90% by mass, even more preferably not less than 95% by mass and further even more preferably 100% by mass from the viewpoint of improving low-temperature fusing properties and charging properties of the resulting toner and enhancing optical density of printed images obtained using the toner.

In addition, the resin particles (Z) may also contain the aforementioned colorant and antistatic agent, if required. Also, the resin particles (Z) may further contain other additives such as a reinforcing filler such as fibrous substances, an antioxidant and an anti-aging agent unless the advantageous effects of the present invention are adversely affected by the addition thereof.

(Aggregated Particles (2))

The step (3B) is a step of adding the resin particles (Z) to the aggregated particles (1) obtained in the step (3A) to allow the resin particles (Z) to adhere onto the aggregated particles (1), thereby obtaining aggregated particles (2). In the step (3B), it is preferred that the aqueous dispersion of the resin particles (Z) is added the aforementioned dispersion of the aggregated particles (1) to further adhere the resin particles (Z) onto the aggregated particles (1), thereby obtaining a dispersion of the aggregated particles (2).

Before adding the aqueous dispersion of the resin particles (Z) to the dispersion of the aggregated particles (1), the dispersion of the aggregated particles (1) may be diluted by adding an aqueous medium thereto. In addition, when the aqueous dispersion of the resin particles (Z) is added to the dispersion of the aggregated particles (1), the aforementioned aggregating agent may also be used in the step (3B) in order to allow the resin particles (Z) to efficiently adhere onto the aggregated particles (1).

The temperature used upon adding the aqueous dispersion of the resin particles (Z) is preferably not lower than 40° C., more preferably not lower than 45° C. and even more preferably not lower than 50° C., and is also preferably not higher than 80° C., more preferably not higher than 70° C. and even more preferably not higher than 65° C., from the viewpoint of improving low-temperature fusing properties and charging properties of the resulting toner and enhancing optical density of printed images obtained using the toner.

The aqueous dispersion of the resin particles (Z) may be added continuously over a predetermined period of time, or may be added at one time or added plural times in a split addition manner. However, it is preferred that the aqueous dispersion of the resin particles (Z) is added continuously over a predetermined period of time or added plural times in a split addition manner. By adding the aqueous dispersion of the resin particles (Z) in the aforementioned manner, the resin particles (Z) are likely to selectively adhere onto the aggregated particles (1). Among these addition methods, from the viewpoint of promoting selective adhesion of the resin particles (Z) onto the aggregated particles (1) and enhancing productivity of the toner, the aqueous dispersion of the resin particles (Z) is more preferably added continuously over a predetermined period of time.

The velocity of continuous addition of the aqueous dispersion of the resin particles (Z) to the dispersion of the aggregated particles (1) is controlled such that the amount of the resin particles (Z) in the aqueous dispersion added is preferably not less than 0.03 part by mass/minute and more preferably not less than 0.07 part by mass/minute, and is also preferably not more than 1.0 part by mass/minute, more preferably not more than 0.5 part by mass/minute and even more preferably not more than 0.3 part by mass/minute, on the basis of 100 parts by mass of the aggregated particles (1), from the viewpoint of obtaining the uniform aggregated particles (2) and enhancing productivity of the toner.

From the viewpoint of improving low-temperature fusing properties and charging properties of the resulting toner and enhancing optical density of printed images obtained using the toner, the amount of the resin particles (Z) added is controlled such that the mass ratio of the resin particles (Z) to a sum of the resin particles (X) and the resin particles (Y) [(Z)/((X)+(Y))] is preferably not less than 0.1, more preferably not less than 0.15, even more preferably not less than 0.2 and further even more preferably not less than 0.25, and is also preferably not more than 0.9, more preferably not more than 0.6 and even more preferably not more than 0.4.

Meanwhile, in the production process of the present invention, in addition to the non-crystalline resin (A), the crystalline polyester (B) and the non-crystalline polyester (C), conventionally known resins that may be used for the toner, for example, such as a styrene-acrylic copolymer, an epoxy resin, a polycarbonate, a polyurethane, etc., may be used unless the advantageous effects of the present invention are adversely affected by the addition thereof.

In the case of conducting the step (3B), the total content of the non-crystalline resin (A), the crystalline polyester (B) and the non-crystalline polyester (C) in whole resin components constituting the toner is preferably not less than 80% by mass, more preferably not less than 90% by mass, even more preferably not less than 95% by mass, further even more preferably not less than 98% by mass and still further even more preferably 100% by mass from the viewpoint of improving low-temperature fusing properties and charging properties of the resulting toner and enhancing optical density of printed images obtained using the toner.

Also, the mass ratio of the non-crystalline polyester (C) to a sum of the non-crystalline resin (A) and the crystalline polyester (B) [(C)/((A)+(B))] is preferably not less than 0.1, more preferably not less than 0.15, even more preferably not less than 0.2 and further even more preferably not less than 0.25, and is also preferably not more than 0.9, more preferably not more than 0.6 and even more preferably not more than 0.4, from the viewpoint of improving low-temperature fusing properties and charging properties of the resulting toner and enhancing optical density of printed images obtained using the toner.

The volume median particle size ($D_{50}$) of the resulting aggregated particles (2) is preferably not less than 2 μm, more preferably not less than 3 μm and even more preferably not less than 4 μm, and is also preferably not more than 10 μm, more preferably not more than 8 μm and even more preferably not more than 6 μm, from the viewpoint of obtaining a toner that is capable of forming high quality images as well as from the viewpoint of improving low-temperature fusing properties and charging properties of the resulting toner.

In the step (3), at the time at which the aggregated particles are grown so as to have such a particle size that is appropriate as that of the toner, the aggregating step may be stopped.

As the method of stopping the aggregating step, there may be used a method of cooling the dispersion, a method of adding an aggregation stopping agent to the dispersion, a method of diluting the dispersion, etc. Of these methods, from the viewpoint of surely preventing occurrence of unnecessary aggregation of the particles, preferred is the method of stopping the aggregating step by adding an aggregation stopping agent to the dispersion.

As the aggregation stopping agent, a surfactant is preferably used. The aggregation stopping agent is more preferably an anionic surfactant. Examples of the anionic surfactants include alkylbenzenesulfonic acid salts, alkylsulfuric acid salts, alkylethersulfuric acid salts, and polyoxyalkylene alkylethersulfuric acid salts. Of these anionic surfactants, preferred are polyoxyalkylene alkylethersulfuric acid salts, more preferred are polyoxyethylene laurylethersulfuric acid salts, and still more preferred is sodium polyoxyethylene laurylethersulfate.

These aggregation stopping agents may be used alone or in combination of any two or more thereof.

The amount of the aggregation stopping agent added is preferably not less than 0.1 part by mass, more preferably not less than 1 part by mass and even more preferably not less than 2 parts by mass on the basis of 100 parts by mass of a total amount of the resin particles (X), the resin particles (Y) and the resin particles (Z) from the viewpoint of surely preventing occurrence of unnecessary aggregation of the particles, and is also preferably not more than 15 parts by mass, more preferably not more than 10 parts by mass and even more preferably not more than 7 parts by mass on the basis of 100 parts by mass of a total amount of the resin particles (X), the resin particles (Y) and the resin particles (Z) from the viewpoint of reducing an amount of the aggregation stopping agent remaining in the resulting toner. The aggregation stopping agent is preferably added in the form of an aqueous solution thereof from the viewpoint of enhancing productivity of the toner.

The temperature used upon adding the aggregation stopping agent is preferably the same as the temperature at which the dispersion of the aggregated particles (2) is to be maintained, from the viewpoint of enhancing productivity of the toner. More specifically, the temperature used upon adding the aggregation stopping agent is preferably not lower than 40° C., more preferably not lower than 45° C. and even more preferably not lower than 50° C., and is also preferably not higher than 80° C., more preferably not higher than 70° C. and even more preferably not higher than 65° C.

[Step (4)]

In the step (4), the respective particles contained in the aggregated particles obtained in the step (3) are coalesced together.

The respective particles contained in the aggregated particles which are adhered to each other mainly only by a physical force are integrally coalesced together in this step to thereby form toner particles.

In the step (4), from the viewpoint of improving coalescing properties of the aggregated particles as well as from the viewpoint of enhancing optical density of printed images obtained using the toner and improving low-temperature fusing properties and charging properties of the resulting toner, the reaction system is preferably maintained at a temperature not lower than the maximum value of glass transition temperatures of the resin(s) constituting the resin particles (X) or the resin(s) constituting the resin particles (Z).

From the viewpoint of improving coalescing properties of the aggregated particles and enhancing productivity of the toner, the temperature to be maintained in the coalescing step is preferably not lower than a temperature higher by 2° C. than the maximum value of glass transition temperatures of the resin(s) constituting the resin particles (X) or the resin(s) constituting the resin particles (Z), more preferably not lower than a temperature higher by 4° C. than the maximum value of glass transition temperatures, and even more preferably not lower than a temperature higher by 6° C. than the maximum value of glass transition temperatures. The temperature to be maintained in the coalescing step is also preferably not higher than a temperature higher by 30° C. than the maximum value of glass transition temperatures of the resin(s) constituting the resin particles (X) or the resin(s) constituting the resin particles (Z), more preferably not higher than a temperature higher by 20° C. than the maximum value of glass transition temperatures, and even more preferably not higher than a temperature higher by 12° C. than the maximum value of glass transition temperatures.

The time period to be maintained at a temperature not lower than the maximum value of glass transition temperatures of the resin(s) constituting the resin particles (X) or the resin(s) constituting the resin particles (Z) is preferably not less than 1 minute, more preferably not less than 10 minutes and even more preferably not less than 30 minutes, and is also preferably not more than 240 minutes, more preferably not more than 180 minutes, even more preferably not more than 120 minutes and further even more preferably not more than 90 minutes, from the viewpoint of improving low-temperature fusing properties and charging properties of the resulting toner and enhancing optical density of printed images obtained using the toner.

From the viewpoint of improving low-temperature fusing properties and charging properties of the resulting toner and enhancing optical density of printed images obtained using the toner, the volume median particle size ($D_{50}$) of the toner particles contained in the dispersion obtained in the step (4) is preferably not less than 2 μm, more preferably not less than 3 μm and even more preferably not less than 4 μm, and is also preferably not more than 10 μm, more preferably not more than 8 μm and even more preferably not more than 6 μm. In addition, the circularity of the toner particles contained in the dispersion is preferably not less than 0.955, more preferably not less than 0.960 and even more preferably not less than 0.965, and is also preferably not more than 0.990, more preferably not more than 0.985 and even more preferably not more than 0.980, from the viewpoint of improving low-temperature fusing properties and charging properties of the resulting toner and enhancing optical density of printed images obtained using the toner.

[Additional Treatment Step]

After completion of the step (4), the obtained dispersion may be subjected to an additional treatment step. In the additional treatment step, the toner particles are preferably isolated from the dispersion obtained in the step (4).

The toner particles in the dispersion obtained in the step (4) are present in the aqueous medium. Therefore, the dispersion is preferably first subjected to solid-liquid separation treatment. The solid-liquid separation treatment is preferably conducted by a suction filtration method, etc.

The particles obtained after the solid-liquid separation treatment are preferably then washed. In this case, the surfactant added in any previous steps is also preferably removed by washing. Therefore, the resulting particles are preferably washed with an aqueous medium at a temperature not higher than a cloud point of the surfactant. The washing treatment is preferably carried out plural times.

Next, the obtained toner particles are preferably dried. The temperature used upon drying the toner particles is preferably controlled such that the temperature of the toner particles themselves is lower than the minimum value of the glass transition temperatures of the resin(s) constituting the resin particles (X) or the resin(s) constituting the resin particles (Z). As the drying method, there are preferably used a vacuum low-temperature drying method, a vibration-type fluidization drying method, a spray-drying method, a freeze-drying method and a flash jet method, etc. The content of water in the toner particles obtained after drying is preferably adjusted to not more than 1.5% by mass and more preferably not more than 1.0% by mass from the viewpoint of improving charging properties of the resulting toner.

[Toner for Development of Electrostatic Images]

<Toner Particles>

The toner particles obtained by the drying, etc., may be directly used as a toner for development of electrostatic images. However, it is preferred that the toner particles are subjected to the below-mentioned surface treatment, and the thus surface-treated toner particles are used as the toner for development of electrostatic images.

The volume median particle size ($D_{50}$) of the resulting toner particles is preferably not less than 2 μm, more preferably not less than 3 μm and even more preferably not less than 4 μm, and is also preferably not more than 10 μm, more preferably not more than 8 μm and even more preferably not more than 6 μm, from the viewpoint of enhancing productivity of the toner as well as from the viewpoint of enhancing optical density of printed images obtained using the toner and improving low-temperature fusing properties and charging properties of the resulting toner.

The CV of the resulting toner particles is preferably not less than 12%, more preferably not less than 14% and even more preferably not less than 16%, from the viewpoint of enhancing productivity of the toner, and is also preferably not more than 30% and more preferably not more than 26% from the viewpoint of obtaining a toner that is capable of forming high quality images.

The circularity of the resulting toner particles is preferably not less than 0.955, more preferably not less than 0.960 and even more preferably not less than 0.965, and is also preferably not more than 0.990, more preferably not more than 0.985 and even more preferably not more than 0.980, from the viewpoint of improving low-temperature fusing properties and charging properties of the resulting toner and enhancing optical density of printed images obtained using the toner.

The thus obtained toner particles are preferably further subjected to surface treatment in which an external additive such as a fluidizing agent is applied onto the surface of the respective toner particles, and the resulting surface-treated toner particles are preferably used as the toner.

Examples of the external additive include inorganic fine particles such as hydrophobic silica fine particles, titanium oxide fine particles, alumina fine particles, cerium oxide fine particles and carbon blacks; and polymer fine particles such as fine particles of polycarbonates, polymethyl methacrylate, silicone resins, etc. Among these fine particles, preferred are hydrophobic silica fine particles.

When subjecting the toner particles to the surface treatment with the external additive, the amount of the external additive added to the toner particles is preferably not less than 1 part by mass, more preferably not less than 2 parts by mass and even more preferably not less than 3 parts by mass, and is also preferably not more than 5 parts by mass, more preferably not more than 4.5 parts by mass and even more preferably not more than 4 parts by mass, on the basis of 100 parts by mass of the toner particles.

The toner for development of electrostatic images which is obtained according to the present invention can be used as one-component system developer, or can be mixed with a carrier to form a two-component system developer.

With respect to the aforementioned embodiments, the present invention further provides the following aspects <1> to <58> relating to the process for producing a toner for development of electrostatic images.

<1> A process for producing a toner for development of electrostatic images, including the following steps (1) to (4):

step (1): subjecting a polyhydric alcohol component and a polycarboxylic acid component to polycondensation reaction in the presence of a hydroxy group- or carboxy group-containing hydrocarbon wax (W1) to obtain a non-crystalline resin (A) containing a constitutional component derived from the hydrocarbon wax (W1) and also containing a polyester moiety;

step (2): dispersing the non-crystalline resin (A) obtained in the step (1) in an aqueous medium to obtain an aqueous dispersion of resin particles (X);

step (3): aggregating the resin particles (X) obtained in the step (2) in an aqueous medium in the presence of a crystalline polyester (B) to obtain aggregated particles; and step (4): coalescing the aggregated particles obtained in the step (3).

<2> The process for producing a toner for development of electrostatic images according to the above aspect <1>, wherein the steps (3) and (4) are the following steps (3A) and (4A), respectively:

step (3A): aggregating the resin particles (X) obtained in the step (2) in the aqueous medium in the presence of the crystalline polyester (B) to obtain aggregated particles (1); and step (4A): coalescing the aggregated particles (1) obtained in the step (3A).

<3> The process for producing a toner for development of electrostatic images according to the above aspect <1>, wherein the step (3) includes the following steps (3A) and (3B) which are successively carried out in this order, and the step (4) is the following step (4B):

step (3A): aggregating the resin particles (X) obtained in the step (2) in the aqueous medium in the presence of the crystalline polyester (B) to obtain aggregated particles (1);

step (3B): adding resin particles (Z) containing a non-crystalline polyester (C) to the aggregated particles (1) obtained in the step (3A) to obtain aggregated particles (2) formed by adhering the resin particles (Z) onto the aggregated particles (1); and step (4B): coalescing the aggregated particles (2) obtained in the step (3B).

<4> The process for producing a toner for development of electrostatic images according to the above aspect <3>, wherein the step (3B) is a step of adding an aqueous dispersion of the resin particles (Z) containing the non-crystalline polyester (C) to a dispersion of the aggregated particles (1) obtained in the step (3A) to obtain a dispersion of the aggregated particles (2) formed by adhering the resin particles (Z) onto the aggregated particles (1).

<5> The process for producing a toner for development of electrostatic images according to any one of the above aspects <2> to <4>, wherein the step (3A) is a step of mixing an aqueous dispersion of the resin particles (X) and an aqueous dispersion of resin particles (Y) containing the crystalline polyester (B) to aggregate the resin particles (X) and the resin particles (Y), thereby obtaining a dispersion of the aggregated particles (1).

<6> The process for producing a toner for development of electrostatic images according to the above aspect <1>, wherein the step (3) is a step of aggregating the resin particles (X) obtained in the step (2) in the aqueous medium in the presence of the crystalline polyester (B) and a wax (W2) to obtain aggregated particles.

<7> The process for producing a toner for development of electrostatic images according to any one of the above aspects <2> to <5>, wherein the step (3A) is a step of aggregating the resin particles (X) obtained in the step (2) in the aqueous medium in the presence of the crystalline polyester (B) and a wax (W2) to obtain the aggregated particles (1).

<8> The process for producing a toner for development of electrostatic images according to the above aspect <7>, wherein the step (3A) is a step of mixing the aqueous dispersion of the resin particles (X), the aqueous dispersion of the resin particles (Y) containing the crystalline polyester (B) and a wax particle dispersion containing the wax (W2) to aggregate the resin particles (X), the resin particles (Y) and the wax (W2), thereby obtaining the dispersion of the aggregated particles (1).

<9> The process for producing a toner for development of electrostatic images according to any one of the above aspects <1> to <8>, wherein a melting point of the hydrocarbon wax (W1) is preferably not lower than 60° C., more preferably not lower than 65° C., even more preferably not lower than 70° C. and further even more preferably not lower than 73° C., and is also preferably not higher than 120° C., more preferably not higher than 110° C., even more preferably not higher than 100° C., further even more preferably not higher than 95° C. and still further even more preferably not higher than 80° C.

<10> The process for producing a toner for development of electrostatic images according to any one of the above aspects <1> to <9>, wherein the hydrocarbon wax (W1) is a hydroxy group- or carboxy group-containing hydrocarbon wax or a hydrocarbon wax containing both of a hydroxy group and carboxy group, and preferably a hydrocarbon wax containing both of a hydroxy group and carboxy group.

<11> The process for producing a toner for development of electrostatic images according to any one of the above aspects <1> to <10>, wherein a raw material of the hydrocarbon wax (W1) is at least one material selected from the group consisting of a paraffin wax, a Fischer-Tropsch wax, a microcrystalline wax and a polyethylene wax, and preferably at least one material selected from the group consisting of a paraffin wax and a Fischer-Tropsch wax.

<12> The process for producing a toner for development of electrostatic images according to the above aspect <10> or <11>, wherein a hydroxy value of the hydroxy group-containing hydrocarbon wax is preferably not less than 40 mgKOH/g, more preferably not less than 50 mgKOH/g, even more preferably not less than 70 mgKOH/g and further even more preferably not less than 90 mgKOH/g, and is also preferably not more than 180 mgKOH/g, more preferably not more than 150 mgKOH/g, even more preferably not more than 120 mgKOH/g and further even more preferably not more than 100 mgKOH/g.

<13> The process for producing a toner for development of electrostatic images according to the above aspect <10> or <11>, wherein an acid value of the carboxy group-containing hydrocarbon wax is preferably not less than 1 mgKOH/g, more preferably not less than 5 mgKOH/g and even more preferably not less than 8 mgKOH/g, and is also preferably not more than 30 mgKOH/g, more preferably not more than 25 mgKOH/g and even more preferably not more than 20 mgKOH/g.

<14> The process for producing a toner for development of electrostatic images according to any one of the above aspects <1> to <13>, wherein a content of the constitutional component derived from the hydrocarbon wax (W1) in the non-crystalline resin (A) is preferably not less than 0.7% by mass, more preferably not less than 1.4% by mass and even more preferably not less than 2% by mass, and is also preferably not more than 15% by mass, more preferably not more than 12% by mass and even more preferably not more than 10% by mass.

<15> The process for producing a toner for development of electrostatic images according to any one of the above aspects <1> to <14>, wherein a number-average molecular weight of the hydrocarbon wax (W1) is preferably not less than 500, more preferably not less than 600 and even more preferably not less than 700, and is also preferably not more than 2000, more preferably not more than 1700 and even more preferably not more than 1500.

<16> The process for producing a toner for development of electrostatic images according to any one of the above aspects <1> to <15>, wherein the polyhydric alcohol component is a polyhydric alcohol component (A-al), and a content of an alkyleneoxide adduct of bisphenol A in the polyhydric alcohol component (A-al) is preferably not less than 80 mol %, more preferably not less than 90 mol %, even more preferably not less than 95 mol %, further even more preferably not less than 98 mol % and still further even more preferably 100 mol %.

<17> The process for producing a toner for development of electrostatic images according to the above aspect <16>, wherein the alkyleneoxide adduct of bisphenol A is preferably at least one compound selected from the group consisting of an ethyleneoxide adduct of bisphenol A (polyoxyethylene-2,2-bis(4-hydroxyphenyl)propane) and a propyleneoxide adduct of bisphenol A (polyoxypropylene-2,2-bis(4-hydroxyphenyl)propane), and more preferably a propyleneoxide adduct of bisphenol A.

<18> The process for producing a toner for development of electrostatic images according to any one of the above aspects <1> to <17>, wherein the polycarboxylic acid component is a polycarboxylic acid component (A-ac), and the polycarboxylic acid component (A-ac) is at least one compound selected from the group consisting of dicarboxylic acids, trivalent or higher-valent polycarboxylic acids, and anhydrides and alkyl (having not less than 1 and not more than 3 carbon atoms) esters of these acids; and among these compounds, preferred are dicarboxylic acids, and more preferred is a combination of a dicarboxylic acid and a trivalent or higher-valent polycarboxylic acid.

<19> The process for producing a toner for development of electrostatic images according to the above aspect <18>, wherein the polycarboxylic acid component (A-ac) is preferably at least one compound selected from the group consisting of terephthalic acid, fumaric acid, dodecenyl succinic acid and anhydrides of these acids, more preferably a combination of any two or more of these acids, and even more preferably a combination of terephthalic acid and fumaric acid.

<20> The process for producing a toner for development of electrostatic images according to the above aspect <18>, wherein the trivalent or higher-valent polycarboxylic acid is preferably trimellitic acid or trimellitic anhydride, and more preferably trimellitic anhydride.

<21> The process for producing a toner for development of electrostatic images according to any one of the above aspects <1> to <20>, wherein the non-crystalline resin (A) contains the constitutional component derived from the hydrocarbon wax (W1), and is in the form of a composite resin that contains a polyester segment (a1) as a segment constituted of a polyester resin produced by subjecting a polyhydric alcohol component and a polycarboxylic acid component to polycondensation reaction, and a vinyl-based resin segment (a2).

<22> The process for producing a toner for development of electrostatic images according to the above aspect <21>, wherein a raw material vinyl monomer constituting the vinyl-based resin segment (a2) is preferably styrene solely or a combination of styrene and a (meth)acrylic acid ester, more preferably a combination of styrene and a (meth)acrylic acid ester, and even more preferably a combination of styrene and an alkyl (meth)acrylate containing an alkyl group having not less than 6 and not more than 20 carbon atoms.

<23> The process for producing a toner for development of electrostatic images according to the above aspect <21> or <22>, wherein the composite resin preferably contains a constitutional unit derived from a bireactive monomer.

<24> The process for producing a toner for development of electrostatic images according to the above aspect <23>, wherein the bireactive monomer is at least one monomer selected from the group consisting of acrylic acid, methacrylic acid, fumaric acid and maleic acid, preferably at least one monomer selected from the group consisting of acrylic acid and methacrylic acid, and more preferably acrylic acid.

<25> The process for producing a toner for development of electrostatic images according to the above aspect <23> or <24>, wherein the bireactive monomer is used in an amount of preferably not less than 1 mole part, more preferably not less than 3 mole parts and even more preferably not less than 5 mole parts, and also preferably not more than 30 mole parts, more preferably not more than 20 mole parts and even more preferably not more than 10 mole parts, on the basis of 100 mole parts of a whole amount of the polyhydric alcohol component (A-al) as a raw material of the polyester segment (a1).

<26> The process for producing a toner for development of electrostatic images according to any one of the above aspects <1> to <25>, wherein a content of the non-crystalline polyester resin or the composite resin in the non-crystalline resin (A) is preferably not less than 80% by mass, more preferably not less than 90% by mass, even more preferably not less than 95% by mass and further even more preferably substantially 100% by mass.

<27> The process for producing a toner for development of electrostatic images according to any one of the above aspects <21> to <26>, wherein in the case where the non-crystalline resin (A) is in the form of a composite resin, a content of the polyester segment (a1) in the composite resin is preferably not less than 40% by mass, more preferably not less than 60% by mass and even more preferably not less than 70% by mass, and is also preferably not more than 90% by mass and more preferably not more than 85% by mass.

<28> The process for producing a toner for development of electrostatic images according to any one of the above aspects <21> to <27>, wherein in the case where the non-crystalline resin (A) is in the form of a composite resin, a content of the polyester segment (a1) in the composite resin is preferably not less than 40% by mass, more preferably not less than 60% by mass and even more preferably not less than 70% by mass, and is also preferably not more than 90% by mass and more preferably not more than 85% by mass, on the basis of 100% by mass of a total content of the polyester segment (a1) and the vinyl-based resin segment (a2).

<29> The process for producing a toner for development of electrostatic images according to any one of the above aspects <21> to <28>, wherein in the case where the non-crystalline resin (A) is in the form of a composite resin, a content of the vinyl-based resin segment (a2) in the composite resin is preferably not less than 10% by mass and more preferably not less than 15% by mass, and is also preferably not more than 60% by mass, more preferably not more than 40% by mass and even more preferably not more than 30% by mass.

<30> The process for producing a toner for development of electrostatic images according to any one of the above aspects <21> to <29>, wherein in the case where the non-crystalline resin (A) is in the form of a composite resin, a content of the vinyl-based resin segment (a2) in the composite resin is preferably not less than 10% by mass and more preferably not less than 15% by mass, and is also preferably not more than 60% by mass, more preferably not more than 40% by mass and even more preferably not more than 30% by mass, on the basis of 100% by mass of a total content of the polyester segment (a1) and the vinyl-based resin segment (a2).

<31> The process for producing a toner for development of electrostatic images according to any one of the above aspects <21> to <30>, wherein in the case where the non-crystalline resin (A) is in the form of a composite resin, the total content of the polyester segment (a1) and the vinyl-based resin segment (a2) in the composite resin is preferably not less than 80% by mass, more preferably not less than 90% by mass, even more preferably not less than 93% by mass and further even more preferably not less than 95% by mass, and is also preferably not more than 100% by mass and more preferably not more than 96% by mass.

<32> The process for producing a toner for development of electrostatic images according to any one of the above aspects <1> to <31>, wherein the non-crystalline resin (A) is preferably produced by the following method (i):

(i) Method in which a polycondensation reaction between the polyhydric alcohol component (A-al) and the polycarboxylic acid component (A-ac) is conducted in the presence of the hydrocarbon wax (W1), followed by an addition polymerization reaction of a raw material vinyl monomer of the vinyl-based resin component (a2) and the bireactive monomer which may be optionally used, if required.

<33> The process for producing a toner for development of electrostatic images according to any one of the above aspects <1> to <32>, wherein a softening point of the non-crystalline resin (A) is preferably not lower than 70° C., more preferably not lower than 90° C. and even more preferably not lower than 100° C., and is also preferably not higher than 140° C., more preferably not higher than 120° C. and even more preferably not higher than 110° C.

<34> The process for producing a toner for development of electrostatic images according to any one of the above aspects <1> to <33>, wherein a glass transition temperature of the non-crystalline resin (A) is preferably not lower than 30° C., more preferably not lower than 35° C. and even more preferably not lower than 40° C., and is also preferably not higher than 70° C., more preferably not higher than 60° C. and even more preferably not higher than 55° C.

<35> The process for producing a toner for development of electrostatic images according to any one of the above aspects <1> to <34>, wherein a method of producing the aqueous dispersion of the resin particles (X) is a phase inversion emulsification method.

<36> The process for producing a toner for development of electrostatic images according to the above aspect <35>, wherein the phase inversion emulsification method is a method (1-1) of adding an aqueous medium to a solution prepared by dissolving the non-crystalline resin (A) and the other optional components in an organic solvent to subject the resulting mixture to phase inversion emulsification, or a method (1-2) of adding an aqueous medium to a resin mixture prepared by melting and mixing the non-crystalline resin (A) and the other optional components to subject the resulting mixture to phase inversion emulsification, and preferably the method (1-1).

<37> The process for producing a toner for development of electrostatic images according to any one of the above aspects <1> to <36>, wherein a volume median particle size ($D_{50}$) of the resin particles (X) is preferably not less than 0.05 µm, more preferably not less than 0.10 µm and even more preferably not less than 0.12 µm, and is also preferably not more than 0.80 µm, more preferably not more than 0.40 µm and even more preferably not more than 0.20 µm.

<38> The process for producing a toner for development of electrostatic images according to any one of the above aspects <1> to <37>, wherein a softening point of the crystalline polyester (B) is preferably not lower than 60° C., more preferably not lower than 70° C. and even more preferably not lower than 80° C., and is also preferably not higher than 150° C., more preferably not higher than 120° C. and even more preferably not higher than 100° C.

<39> The process for producing a toner for development of electrostatic images according to any one of the above aspects <1> to <38>, wherein a melting point of the crystalline polyester (B) is preferably not lower than 50° C., more preferably not lower than 60° C. and even more preferably not lower than 65° C., and is also preferably not higher than 100° C., more preferably not higher than 90° C. and even more preferably not higher than 80° C.

<40> The process for producing a toner for development of electrostatic images according to any one of the above aspects <5> to <39>, wherein a volume median particle size ($D_{50}$) of the resin particles (Y) is preferably not less than 0.05 µm, more preferably not less than 0.10 µm and even more preferably not less than 0.12 µm, and is also preferably not more than 0.80 µm, more preferably not more than 0.40 µm and even more preferably not more than 0.20 µm.

<41> The process for producing a toner for development of electrostatic images according to any one of the above aspects <1> to <40>, wherein a mass ratio of the non-crystalline resin (A) to the crystalline polyester (B) [(A)/(B)] is preferably not less than 70/30, more preferably not less than 75/25, even more preferably not less than 85/15 and further even more preferably not less than 88/12, and is also preferably not more than 98/2, more preferably not more than 95/5 and even more preferably not more than 92/8.

<42> The process for producing a toner for development of electrostatic images according to any one of the above aspects <1> to <41>, wherein an amount of the hydrocarbon wax (W1) used in the step (1) is controlled such that a content of the hydrocarbon wax (W1) in the raw materials constituting the non-crystalline resin (A) is preferably not less than 1% by mass, more preferably not less than 2% by mass and even more preferably not less than 3% by mass, and is also preferably not more than 15% by mass, more preferably not more than 12% by mass and even more preferably not more than 10% by mass.

<43> The process for producing a toner for development of electrostatic images according to any one of the above aspects <6> to <42>, wherein a melting point of the wax (W2) is preferably not lower than 60° C., more preferably not lower than 65° C. and even more preferably not lower than 70° C., and is also preferably not higher than 100° C., more preferably not higher than 90° C. and even more preferably not higher than 80° C.

<44> The process for producing a toner for development of electrostatic images according to any one of the above aspects <6> to <43>, wherein an amount of the wax (W2) used is preferably not less than 2 parts by mass, more preferably not less than 5 parts by mass and even more preferably not less than 7 parts by mass, and is also preferably not more than 30 parts by mass, more preferably not more than 20 parts by mass and even more preferably not more than 15 parts by mass, on the basis of 100 parts by mass of a total amount of the resin particles (X) and the resin particles (Y).

<45> The process for producing a toner for development of electrostatic images according to any one of the above aspects <6> to <44>, wherein a ratio of an amount of the wax (W2) used to an amount of the hydrocarbon wax (W1) used [(W2)/(W1)] is preferably not less than 0.5, more preferably not less than 0.8, even more preferably not less than 1.2 and further even more preferably not less than 1.5, and is also preferably not more than 5.0, more preferably not more than 3.5, even more preferably not more than 2.0 and further even more preferably not more than 1.6.

<46> The process for producing a toner for development of electrostatic images according to any one of the above aspects <6> to <45>, wherein a mass ratio of the non-crystalline resin (A) to the wax (W2) [(A)/(W2)] is preferably not less than 2.5, more preferably not less than 3.5 and even more preferably not less than 5.0, and is also preferably not more than 45, more preferably not more than 35, even more preferably not more than 25 and further even more preferably not more than 15.

<47> The process for producing a toner for development of electrostatic images according to any one of the above aspects <3> to <46>, wherein the non-crystalline polyester (C) is a polyester resin that is produced by subjecting a polyhydric alcohol component (C-al) and a polycarboxylic acid component (C-ac) to polycondensation reaction.

<48> The process for producing a toner for development of electrostatic images according to the above aspect <47>, wherein a content of an alkyleneoxide adduct of bisphenol A in the polyhydric alcohol component (C-al) is preferably not less than 80 mol %, more preferably not less than 90 mol %, even more preferably not less than 95 mol %, further even more preferably not less than 98 mol % and still further even more preferably 100 mol %.

<49> The process for producing a toner for development of electrostatic images according to the above aspect <48>, wherein the alkyleneoxide adduct of bisphenol A is preferably at least one compound selected from the group consisting of an ethyleneoxide adduct of bisphenol A (polyoxyethylene-2,2-bis(4-hydroxyphenyl)propane) and a propyleneoxide adduct of bisphenol A (polyoxypropylene-2,2-bis(4-hydroxyphenyl)propane), and more preferably an ethyleneoxide adduct of bisphenol A.

<50> The process for producing a toner for development of electrostatic images according to any one of the above aspects <47> to <49>, wherein the polycarboxylic acid component (C-ac) is preferably a dicarboxylic acid, and more preferably a combination of a dicarboxylic acid and a trivalent or higher-valent polycarboxylic acid.

<51> The process for producing a toner for development of electrostatic images according to any one of the above aspects <47> to <50>, wherein the polycarboxylic acid component (C-ac) is preferably at least one compound selected from the group consisting of terephthalic acid, fumaric acid, dodecenyl succinic acid and anhydrides of these acids, more preferably a combination of any two or more of these acids, and even more preferably a combination of all three of terephthalic acid, fumaric acid and dodecenyl succinic acid.

<52> The process for producing a toner for development of electrostatic images according to the above aspect <50>, wherein the trivalent or higher-valent polycarboxylic acid is preferably trimellitic acid or trimellitic anhydride, and more preferably trimellitic anhydride.

<53> The process for producing a toner for development of electrostatic images according to any one of the above aspects <3> to <52>, wherein a softening point of the non-crystalline polyester (C) is preferably not lower than 90° C., more preferably not lower than 100° C. and even more preferably not lower than 110° C., and is also preferably not higher than 160° C., more preferably not higher than 140° C. and even more preferably not higher than 130° C.

<54> The process for producing a toner for development of electrostatic images according to any one of the above aspects <3> to <53>, wherein a glass transition temperature of the non-crystalline polyester (C) is preferably not lower than 40° C., more preferably not lower than 50° C. and even more preferably not lower than 60° C., and is also preferably not higher than 90° C., more preferably not higher than 80° C. and even more preferably not higher than 70° C.

<55> The process for producing a toner for development of electrostatic images according to any one of the above aspects <3> to <54>, wherein a volume median particle size ($D_{50}$) of the resin particles (Z) is preferably not less than 0.05 µm, more preferably not less than 0.08 µm and even more preferably not less than 0.10 µm, and is also preferably not more than 0.50 µm, more preferably not more than 0.40 µm and even more preferably not more than 0.30 µm.

<56> The process for producing a toner for development of electrostatic images according to any one of the above aspects <3> to <55>, wherein an amount of the resin particles (Z) added is controlled such that a mass ratio of the resin particles (Z) to a sum of the resin particles (X) and the resin particles (Y) [(Z)/((X)+(Y))] is preferably not less than 0.1, more preferably not less than 0.15, even more preferably not less than 0.2 and further even more preferably not less than 0.25, and is also preferably not more than 0.9, more preferably not more than 0.6 and even more preferably not more than 0.4.

<57> The process for producing a toner for development of electrostatic images according to any one of the above aspects <3> to <56>, wherein in the case of conducting the step (3B), a total content of the non-crystalline resin (A), the crystalline polyester (B) and the non-crystalline polyester (C) in whole resin components constituting the toner is preferably not less than 80% by mass, more preferably not less than 90% by mass, even more preferably not less than 95% by mass, further even more preferably not less than 98% by mass and still further even more preferably 100% by mass.

<58> The process for producing a toner for development of electrostatic images according to any one of the above aspects <3> to <57>, wherein in the case of conducting the step (3B), a mass ratio of the non-crystalline polyester (C) to a sum of the non-crystalline resin (A) and the crystalline polyester (B) [(C)/((A)+(B))] is preferably not less than 0.1, more preferably not less than 0.15, even more preferably not less than 0.2 and further even more preferably not less than 0.25, and is also preferably not more than 0.9, more preferably not more than 0.6 and even more preferably not more than 0.4.

EXAMPLES

Respective properties of resins, waxes, resin particles and toners, etc., were measured and evaluated by the following methods.

[Acid Value of Resin]

The acid value of the resin was measured by the same method as prescribed in JIS K 0070 except that chloroform was used as a solvent for the measurement.

[Softening Point, Crystallinity Index, Melting Point and Glass Transition Temperature of Resin]

(1) Softening Point

Using a flow tester "CFT-500D" available from Shimadzu Corporation, 1 g of a sample was extruded through a nozzle having a die pore diameter of 1 mm and a length of 1 mm while heating the sample at a temperature rise rate of 6° C./minute and applying a load of 1.96 MPa thereto by a plunger. The softening point was determined as the temperature at which a half amount of the sample was flowed out when plotting a downward movement of the plunger of the flow tester relative to the temperature.

(2) Crystallinity Index

Using a differential scanning calorimeter "Q100" available from TA Instruments Japan Inc., a sample was weighed in an amount of 0.01 to 0.02 g in an aluminum pan, and cooled from room temperature (20° C.) to 0° C. at a temperature drop rate of 10° C./minute and then allowed to stand as such under the conditions for 1 minute, and further heated to 180° C. at a temperature rise rate of 10° C./minute to measure an endothermic heat amount thereof. Among the endothermic peaks observed in the thus measured characteristic curve, the temperature of the peak having a largest peak area was defined as an endothermic maximum peak temperature (1). The crystallinity index of the sample was calculated from the following formula:

Crystallinity Index=(Softening Pont (° C.)/(Endothermic Maximum Peak Temperature(1)(° C.))

(3) Melting Point and Glass Transition Temperature

Using a differential scanning calorimeter "Q100" available from TA Instruments Japan Inc., a sample was weighed in an amount of 0.01 to 0.02 g in an aluminum pan, heated to 200° C. and then cooled from 200° C. to 0° C. at a temperature drop rate of 10° C./minute, and the sample was further heated at a temperature rise rate of 10° C./minute to measure an endothermic heat amount thereof. Among the endothermic peaks observed in the thus measured characteristic curve, the temperature of the peak having a largest peak area was defined as an endothermic maximum peak temperature (2).

In the case where the sample was a crystalline polyester, the peak temperature was defined as a melting point thereof. On the other hand, in the case where the sample was a non-crystalline polyester, if any endothermic peak was observed in the characteristic curve, the endothermic peak temperature observed was defined as a glass transition temperature thereof. Whereas, when a shift of the characteristic curve was observed without any peaks, the temperature at which a tangential line having a maximum inclination of the curve in the portion of the curve shift was intersected with an extension of the baseline on the low-temperature side of the curve shift was read as the glass transition temperature.

[Hydroxy Value and Acid Value of Wax]

The hydroxy value and the acid value of the wax were measured by the same methods as prescribed in JIS K 0070 except that a mixed solvent containing xylene and ethanol at a mass ratio (xylene:ethanol) of 3:5 was used as a solvent for the measurement.

[Melting Point of Wax]

Using a differential scanning calorimeter "Q100" available from TA Instruments Japan Inc., a sample was weighed in an amount of 0.01 to 0.02 g in an aluminum pan, heated to 200° C. and then cooled from 200° C. to 0° C. at a temperature drop rate of 10° C./minute, and the sample was further heated at a temperature rise rate of 10° C./min to measure an endothermic heat amount thereof. The endothermic maximum peak temperature observed in the thus measured characteristic curve was defined as a melting point of the sample.

[Number-Average Molecular Weight (Mn) of Wax]

The number-average molecular weight (Mn) of the wax was measured by the following gel permeation chromatography (GPC).

(1) Preparation of Sample Solution

A sample was dissolved in chloroform at 25° C. to prepare a solution having a concentration of 0.5 g/100 mL. The resultant solution was then filtered through a fluororesin filter (product name: "DISMIC"; type name: "25JP") available from Advantech Co., Ltd., having a pore size of 0.2 μm to remove insoluble components therefrom, thereby preparing a sample solution.

(2) Measurement

Using the below-mentioned measuring apparatus and analyzing column, chloroform as an eluent was allowed to flow through the column at a flow rate of 1 mL/minute, and the column was stabilized in a thermostat at 40° C. One hundred microliters (100 μL) of the sample solution were injected into the column to measure a molecular weight of the sample. The molecular weight (weight-average molecular weight Mw; number-average molecular weight Mn) of the sample was calculated on the basis of a calibration curve previously prepared. The calibration curve of the molecular weight was prepared by using several kinds of monodisperse polystyrenes "TSKgel Standard Polystyrene" (product name), "type name (Mw)": "A-500 ($5.0 \times 10^2$)", "A-1000 ($1.01 \times 10^3$)", "A-2500 ($2.63 \times 10^3$)", "A-5000 ($5.97 \times 10^3$)", "F-1 ($1.02 \times 10^4$)", "F-2 ($1.81 \times 10^4$)", "F-4 ($3.97 \times 10^4$)", "F-10 ($9.64 \times 10^4$)", "F-20 ($1.90 \times 10^5$)", "F-40 ($4.27 \times 10^5$)", "F-80 ($7.06 \times 10^5$)" and "F-128 ($1.09 \times 10^6$)" all available from Tosoh Corporation, as reference standard samples.

Measuring Apparatus: "HLC-8220 GPC" available from Tosoh Corporation

Analyzing Column: "GMHXL" and "G3000HXL" both available from Tosoh Corporation

[Volume Median Particle Sizes ($D_{50}$) and CV of Resin Particles, Colorant Particles and Wax Particles]

Measuring Apparatus: Laser diffraction particle size analyzer "LA-920" commercially available from HORIBA Ltd.

Measuring Conditions: In a cell for the measurement which was filled with distilled water, the volume median particle size ($D_{50}$) and the volume-average particle size of the particles in the dispersion were measured at a concentration at which an absorbance thereof fell within an adequate range. In addition, CV of the particles was calculated according to the following formula:

$$CV\ (\%) = [\text{Standard Deviation of Particle Size Distribution/Volume-Average Particle Size}] \times 100.$$

[Solid Contents of Aqueous Dispersion of Resin Particles, Dispersion of Aggregated Particles (1), Dispersion of Aggregated Particles (2), Colorant Dispersion and Wax Particle Dispersion]

Measuring Apparatus: Infrared moisture meter "FD-230" available from Kett Electric Laboratory Measuring Conditions:

Five grams of a sample to be measured were subjected to measurement of a water content (% by mass) thereof at a drying temperature of 150° C. under a measuring mode 96 (monitoring time: 2.5 minutes/variation range: 0.05%). The solid contents of the respective dispersions were calculated according to the following formula:

$$\text{Solid Content (\% by mass)} = 100 - \text{Water Content (\% by mass)}.$$

[Volume Median Particle Sizes ($D_{50}$) of Aggregated Particles (1) and Aggregated Particles (2)]

The volume median particle sizes ($D_{50}$) of the respective aggregated particles were measured as follows.

Measuring Apparatus: "Coulter Multisizer (registered trademark) III" commercially available from Beckman Coulter Inc.

Aperture Diameter: 50 μm

Analyzing Software: "Multisizer (registered trademark) III Ver. 3.51" commercially available from Beckman Coulter Inc.

Electrolyte Solution: "Isotone (registered trademark) II" commercially available from Beckman Coulter Inc.

Measuring Conditions:

A concentration of a resultant dispersion is adjusted to the concentration permitting the measurement for particle size of 30000 particles within 20 seconds, by adding a sample dispersion to 100 mL of the electrolyte dispersion. And then, the particle size of the 30000 particles in the resultant dispersion were measured under the concentration, and the volume median particle size ($D_{50}$) of the particles were determined from a particle size distribution thereof.

[Volume Median Particle Size ($D_{50}$) and CV of Toner Particles]

The volume median particle size ($D_{50}$) of the toner particles was measured as follows.

The same measuring apparatus, aperture diameter, analyzing software and electrolyte solution as used for measuring the volume median particle size ($D_{50}$) of the aggregated particles were used.

Dispersing Solution:

A polyoxyethylene lauryl ether "EMULGEN (registered trademark) 109P" (HLB: 13.6) commercially available from Kao Corporation was dissolved in the aforementioned electrolyte solution to prepare a dispersing solution having a concentration of 5% by mass.

Dispersing Conditions:

Ten milligrams of dried toner particles as a sample to be measured were added to 5 mL of the aforementioned dispersing solution, and dispersed therein using an ultrasonic disperser for 1 minute. Thereafter, 25 mL of the electrolyte solution was added to the resulting dispersion, and the obtained mixture was further dispersed using the ultrasonic disperser for 1 minute to prepare a sample dispersion.

Measuring Conditions:

A concentration of a resultant dispersion is adjusted to the concentration permitting the measurement for particle size of 30000 particles within 20 seconds, by adding the sample dispersion to 100 mL of the electrolyte dispersion. And then, the particle size of the 30000 particles in the resultant dispersion were measured under the concentration, and the volume median particle size ($D_{50}$) of the particles were determined from a particle size distribution thereof.

In addition, CV (%) of the particles was calculated according to the following formula:

CV (%)=[Standard Deviation of Particle Size Distribution/Volume-Average Particle Size]×100.

[Circularity of Toner Particles]

The circularity of the toner particles was measured under the following conditions.

Measuring Apparatus: Flow-type particle image analyzer "FPIA-3000" available from Sysmex Corporation.

Preparation of Dispersion:

The dispersion of the toner particles was diluted with deionized water such that the solid content of the resulting diluted dispersion was in the range of 0.001 to 0.05% by mass.

Measuring Mode: HPF measuring mode

[Appearance of Supernatant Solution After Completion of Coalescing Step]

Ten grams of the dispersion of the toner particles obtained after completion of the coalescing step was sampled in a test tube, and then subjected to centrifugal separation treatment using a centrifugal separator at 4000 r/min for 1 minute to obtain a sample, and a supernatant solution of the thus obtained sample was observed visually.

When the supernatant solution of the sample suffered from white turbidity, it was confirmed that the wax liberated from the toner particles was present therein.

[Lowest Fusing Temperature of Toner]

A solid image was outputted and printed-on a wood-free paper "J Paper; size: A4" available from Fuji Xerox Co., Ltd., using a commercially available printer "Microline (registered tradename) 5400" available from Old Data Corporation. The solid image thus outputted was an unfused solid image having a length of 50 mm which was printed on a portion of the A4 paper except for its top margin of the A4 paper extending 5 mm from a top end thereof such that an amount of the toner deposited on the paper was from 0.42 to 0.48 mg/cm$^2$.

Next, the thus obtained unfused solid image on the paper was fused by passing the paper through a fuser mounted to a printer of the same type as used above which was however modified such that its fusing temperature was variably controllable. Specifically, when fusing the image, the temperature of the fuser was adjusted to 90° C., and the fusing rate thereof was adjusted to 1.0 second per one sheet in a longitudinal direction of the A4 paper, thereby obtaining a printed material.

In addition, the same fusing method was conducted while increasing the fusing temperature of the fuser at intervals of 5° C., thereby obtaining printed materials.

A mending tape "Scotch (registered tradename) Mending Tape 810" (width: 18 mm) available from Sumitomo 3M Ltd., was cut into a length of 50 mm and lightly attached to a portion of the respective printed materials extending from its top margin above an upper end of the solid image through the solid image-formed portion. Then, a weight of 500 g was rested on the tape and moved by one reciprocative motion over the tape at a speed of 10 mm/second while allowing the weight to come into press-contact with the tape. Thereafter, the attached tape was peeled off from its lower end side at a peel angle of 180° and a peel speed of 10 mm/second, thereby obtaining the printed materials from which the tape had been peeled off. At each time before attaching the tape to the printed material and after peeling-off the tape therefrom, the printed material was placed on a stack of 30 sheets of a wood-free paper "EXCELLENT WHITE PAPER; size: A4" available from Oki Data Corporation to measure a reflection image density of the fused image portion thereof using a colorimeter "SpectroEye" available from Gretag-Macbeth GmbH under the light irradiating conditions including a standard light source $D_{50}$, an observation visual field of 2°, and a density standard DINNB based on an absolute white color. The fusing rate of the toner was calculated from the thus measured reflection image density values according to the following formula.

Fusing Rate (%)=(Reflection Image Density after Peeling-off Tape/Reflection Image Density before Attaching Tape)×100

The temperature at which the fusing rate first reached 90% or more was defined as a lowest fusing temperature. The lower the lowest fusing temperature, the more excellent the low-temperature fusing properties of the toner.

[Charge Distribution of Toner]

A 50 mL-capacity polypropylene bottle "PP Sample Bottle Wide Mouth" available from Sanplatec Co., Ltd., was charged with 0.6 g of a toner and 19.4 g of a ferrite carrier (ferrite core; silicone-coated; saturation magnetization: 71 Am$^2$/kg). The contents of the bottle were stirred using a ball mill for 20 minutes, and then 5 g of the mixture in the bottle was sampled, and subjected to measurement of a charge of the toner using a charge meter "q-test" available from Epping GmbH, under the following measuring conditions.

Toner Flow (mL/minute): 160

Electrode Voltage (V): 4000

Deposition Time (second): 2

The median q/d value was defined as a charge Q/d (fC/10 µm) of the toner. In this case, it was assumed that the specific density of the toner was 1.2 g/cm$^3$, and the value of the volume median particle size ($D_{50}$) of the toner was adopted as a median diameter of the toner. A graph of the charge distribution of the toner was prepared by connecting respective points of the measured values by a line in a region where the obtained Q/d was in the range of from −0.4 to 0.4 (fC/10 µm).

The charging properties of the toner was evaluated by the value of a half band width of a maximum peak of the charge distribution (a width of a cut section of the charge distribution curve which was formed by cutting the curve along a half value of a maximum peak height present therein). The smaller the value of the half band width, the more narrow the charge distribution of the toner and the more excellent the charging stability of the toner.

[Charging Properties of Toner Under Normal-Temperature and Normal-Humidity Conditions (Under NN Environmental Conditions)]

A 50 mL-capacity cylindrical polypropylene bottle available from Nikko Hansen & Co., Ltd., was charged with 2.1 g of a toner and 27.9 g of a silicone ferrite carrier (average particle size: 40 µm) available from Kanto Denka Kogyo Co., Ltd., at a temperature of 25° C. and a relative humidity of 50%, and the contents of the bottle were subjected to pre-stirring by shaking the bottle 10 times in each of vertical and horizontal directions. Thereafter, the resulting mixture was mixed by a tumbler mixer "T2F" available from Shinmaru Enterprise Corporation at a rotating speed of 90 r/min for 1 hour to measure a charge of the toner using a "q/m-meter" available from Epping GmbH under the following measuring conditions.

Mesh Size: 635 meshes (opening: 24 µm; stainless steel screen);

Soft Blow: blow pressure (1000 V)

Suction Time: 90 seconds

The charge of the toner was calculated according to the following formula. The higher the absolute value of the charge of the toner, the more excellent the charging properties of the toner.

Charge (µC/g)=(Total Electricity (µC) after 90 seconds)/(Amount (g) of Toner Sucked)

[Charging Properties of Toner Under High-Temperature and High-Humidity Conditions (Under HH Environmental Conditions)]

The toner that had been subjected to the above evaluation for charging properties thereof under the normal-temperature and normal-humidity conditions was placed under the conditions of a temperature of 30° C. and a relative humidity of 85% (under high-temperature and high-humidity conditions), and allowed to stand under the conditions for 12 hours. Thereafter, the environmental conditions under which the toner was placed was changed from the high-temperature and high-humidity conditions to the conditions of a temperature of 25° C. and a relative humidity of 50%, and the toner was stirred by a ball mill for 1 minute under the latter conditions to measure a charge of the toner by the same method as used above for evaluating the charging properties under the normal-temperature and normal-humidity conditions (under NN environmental conditions). The charge of the toner was calculated according to the following formula. The higher the absolute value of the charge of the toner, the more excellent the charging properties of the toner.

Charge (µC/g)=(Total Electricity (µC) after 90 seconds)/(Amount (g) of Toner Sucked)

[Variation in Charge Under High-Temperature and High-Humidity Conditions (Under HH Environmental Conditions)]

The variation in charge under high-temperature and high-humidity conditions (under HH environmental conditions) was calculated according to the following formula. The closer to 1 the numeral value obtained according to the following formula, the less the variation in charge of the toner and the more excellent the charging stability of the toner against change in the environmental conditions.

Variation in Charge under High-Temperature and High-Humidity Conditions (under HH Environmental Conditions) =[Charge (µC/g) of Toner under High-Temperature and High-Humidity Conditions (under HH Environmental Conditions)]/[Charge (µC/g) of Toner under Normal-Temperature and Normal-Humidity Conditions (under NN Environmental Conditions)]

[Optical Density of Printed Images]

A solid image was outputted and printed on a wood-free paper "J Paper; size: A4" available from Fuji Xerox Co., Ltd., using a commercially available printer "Microline (registered tradename) 5400" available from Oki Data Corporation such that an amount of the toner deposited on the paper was from 0.42 to 0.48 mg/cm$^2$, thereby obtaining a printed material.

The thus obtained printed material was placed on a stack of 30 sheets of a wood-free paper "EXCELLENT WHITE PAPER; size: A4" available from Oki Data Corporation to measure a reflection image density of the solid image portion on the outputted printed material using a colorimeter "SpectroEye" available from GretagMacbeth GmbH under the light irradiating conditions including a standard light source $D_{50}$, an observation visual field of 2°, and a density standard DINNB based on an absolute white color. The measurement was conducted at optional three points on the solid image portion of the printed material to calculate an average value of the thus measured three reflection image density values which was defined as an optical density of the printed images of the toner. The higher the average reflection image density value, the more excellent the optical density of the printed images of the toner.

[Production of Resins]

Production Example A1

(Production of Non-Crystalline Resin A-1)

An inside atmosphere of a four-necked flask equipped with a nitrogen inlet tube, a dehydration tube, a stirrer and a thermocouple was replaced with nitrogen, and 2,999 g of polyoxypropylene (2.2)-2,2-bis(4-hydroxyphenyl)propane, 1,193 g of polyoxyethylene (2.2)-2,2-bis(4-hydroxyphenyl) propane, 1,422 g of terephthalic acid, 347 g of a hydrocarbon wax (W1) "Paracohol 6490", 30 g of tin (II) di(2-ethyl hexanoate) and 3 g of gallic acid (same as 3,4,5-trihydroxybenzoic acid) were charged into the flask. The contents of the flask were heated to 235° C. in a nitrogen atmosphere while stirring and maintained at 235° C. for 8 hours, and then the pressure within the flask was reduced and maintained under 8 kPa for 1 hour. Thereafter, the contents of the flask were cooled to 160° C., and while maintaining the contents of the flask at 160° C., a mixture of 721 g of styrene, 614 g of 2-ethylhexyl acrylate, 71 g of acrylic acid and 54 g of dibutyl peroxide was added dropwise thereto over 1 hour. Thereafter, the contents of the flask were maintained at 160° C. for 30 minutes and then heated to 200° C., and further the pressure within the flask was reduced and maintained under 8 kPa for 1 hour. Then, after the pressure within the flask was returned to atmospheric pressure, the contents of the flask were cooled to 180° C., and 57 g of fumaric acid, 259 g of trimellitic anhydride and 0.5 g of 4-tert-butyl catechol were added to the flask. The contents of the flask were heated to 220° C. at a temperature rise rate of 10° C./hour and then reacted at that temperature under 10 kPa until the softening point thereof reached a desired temperature, thereby obtaining a non-crystalline resin A-1. The properties of the thus obtained non-crystalline resin A-1 are shown in Table 1.

Production Examples A2 to A7

(Production of Non-Crystalline Resins A-2 to A-7)

The same procedure as in Production Example A1 was repeated except that the kind and amount of the hydrocarbon wax were changed as shown in Table 1, thereby obtaining non-crystalline resins A-2 to A-7. The properties of the thus obtained non-crystalline resins A-2 to A-7 are shown in Table 1.

Production Example A8

(Production of Non-Crystalline Resin A-8)

An inside atmosphere of a four-necked flask equipped with a nitrogen inlet tube, a dehydration tube, a stirrer and a thermocouple was replaced with nitrogen, and 3,424 g of polyoxypropylene (2.2)-2,2-bis(4-hydroxyphenyl)propane, 1,363 g of polyoxyethylene (2.2)-2,2-bis(4-hydroxyphenyl) propane, 1,160 g of terephthalic acid, 347 g of a hydrocarbon wax (W1) "Paracohol 6490", 30 g of tin (II) di(2-ethyl hexanoate) and 3 g of gallic acid were charged into the flask. The contents of the flask were heated to 230° C. in a nitrogen atmosphere while stirring and maintained at 230° C. for 8 hour. Thereafter, the contents of the flask were cooled to 180° C., and then 162 g of fumaric acid, 1,124 g of dodecenyl succinic anhydride, 268 g of trimellitic anhydride and 3.8 g of 4-tert-butyl catechol were added to the flask. The contents of the flask were heated to 220° C. at a temperature rise rate of 10° C./hour and then reacted at that temperature under 10 kPa until the softening point thereof reached a desired temperature, thereby obtaining a non-crystalline resin A-8. The properties of the thus obtained non-crystalline resin A-8 are shown in Table 1.

Production Example B1

(Production of Crystalline Polyester B-1)

An inside atmosphere of a four-necked flask equipped with a nitrogen inlet tube, a dehydration tube, a stirrer and a thermocouple was replaced with nitrogen, and 3,416 g of 1,10-decanediol and 4,084 g of sebacic acid were charged into the flask. The contents of the flask were heated to 135° C. while stirring and maintained at 135° C. for 3 hours, and then further heated from 135° C. to 200° C. over 10 hours. Thereafter, 16 g of tin (II) di(2-ethyl hexanoate) was added to the flask, and the contents of the flask were further maintained at 200° C. for 1 hour. Then, the pressure within the flask was reduced and maintained under 8.3 kPa for 1 hour, thereby obtaining a crystalline polyester B-1. The properties of the thus obtained crystalline polyester B-1 are shown in Table 2.

Production Example B2

(Production of Crystalline Polyester B-2)

The same procedure as in Production Example B1 was repeated except that the composition of the raw materials was changed as shown in Table 2, thereby obtaining a crystalline polyester B-2. The properties of the thus obtained crystalline polyester B-2 are shown in Table 2.

Production Example C1

(Production of Non-Crystalline Polyester Resin C-1)

An inside atmosphere of a four-necked flask equipped with a nitrogen inlet tube, a dehydration tube, a stirrer and a thermocouple was replaced with nitrogen, and 5,001 g of polyoxyethylene (2.2)-2,2-bis(4-hydroxyphenyl)propane, 1,788 g of terephthalic acid, 30 g of tin (II) di(2-ethyl hexanoate) and 3 g of gallic acid were charged into the flask. The contents of the flask were heated to 235° C. in a nitrogen atmosphere while stirring and maintained at 235° C. for 8 hour. Thereafter, the contents of the flask were cooled to 180° C., and then 179 g of fumaric acid, 206 g of dodecenyl succinic anhydride, 325 g of trimellitic anhydride and 3.8 g of 4-tert-butyl catechol were added to the flask, and further the contents of the flask were heated to 220° C. at a temperature rise rate of 10° C./hour. Thereafter, the pressure within the flask was reduced, and the contents of the flask were reacted at that temperature under 10 kPa until the softening point thereof reached a desired temperature, thereby obtaining a non-crystalline polyester resin C-1. The properties of the thus obtained non-crystalline polyester resin C-1 are shown in Table 1.

TABLE 1

| | Production Examples | | | | | | | | | | | | | | | | | |
|---|---|---|---|---|---|---|---|---|---|---|---|---|---|---|---|---|---|---|
| | A1 | | A2 | | A3 | | A4 | | A5 | | A6 | | A7 | | A8 | | C1 | |
| | Non-crystalline resin No. | | | | | | | | | | | | | | | | | |
| | A-1 | | A-2 | | A-3 | | A-4 | | A-5 | | A-6 | | A-7 | | A-8 | | C-1 | |
| | Raw material monomers (A) of polyester segment | | | | | | | | | | | | | | | | | |
| | g | mole parts *2 | g | mole parts *2 | g | mole parts *2 | g | mole parts *2 | g | mole parts *2 | g | mole parts *2 | g | mole parts *2 | g | mole parts *2 | g | mole parts *2 |
| Polyhydric alcohol component *1 | | | | | | | | | | | | | | | | | | |
| BPA-PO | 2999 | 70 | 2999 | 70 | 2999 | 70 | 2999 | 70 | 2999 | 70 | 2999 | 70 | 2999 | 70 | 3424 | 70 | — | — |
| BPA-EO | 1193 | 30 | 1193 | 30 | 1193 | 30 | 1193 | 30 | 1193 | 30 | 1193 | 30 | 1193 | 30 | 1363 | 30 | 5001 | 100 |
| Polycarboxylic acid component | | | | | | | | | | | | | | | | | | |
| Terephthalic acid | 1422 | 70 | 1422 | 70 | 1422 | 70 | 1422 | 70 | 1422 | 70 | 1422 | 70 | 1422 | 70 | 1160 | 50 | 1788 | 70 |

TABLE 1-continued

| | | | | | | | | | | | | | | | | | | | |
|---|---|---|---|---|---|---|---|---|---|---|---|---|---|---|---|---|---|---|---|
| Fumaric acid | 57 | 4 | 57 | 4 | 57 | 4 | 57 | 4 | 57 | 4 | 57 | 4 | 57 | 4 | 162 | 10 | 179 | 10 |
| Dodecenyl succinic anhydride | — | — | — | — | — | — | — | — | — | — | — | — | — | — | 1124 | 30 | 206 | 5 |
| Trimellitic anhydride | 259 | 11 | 259 | 11 | 259 | 11 | 259 | 11 | 259 | 11 | 259 | 11 | 259 | 11 | 268 | 10 | 325 | 11 |

| | Production Examples | | | | | | | | | | | | | | | | | |
|---|---|---|---|---|---|---|---|---|---|---|---|---|---|---|---|---|---|---|
| | A1 | | A2 | | A3 | | A4 | | A5 | | A6 | | A7 | | A8 | | C1 | |
| | g | mole parts *2 | g | mole parts *2 | g | mole parts *2 | g | mole parts *2 | g | mole parts *2 | g | mole parts *2 | g | mole parts *2 | g | mole parts *2 | g | mole parts *2 |
| Bireactive monomer | | | | | | | | | | | | | | | | | | |
| Acrylic acid | 71 | 8 | 71 | 8 | 71 | 8 | 71 | 8 | 71 | 8 | 71 | 8 | 71 | 8 | — | — | — | — |

Raw material monomers (B) of vinyl-based resin segment

| | g | mass % *3 | g | mass % *3 | g | mass % *3 | g | mass % *3 | g | mass % *3 | g | mass % *3 | g | mass % *3 | g | mass % *3 | g | mass % *3 |
|---|---|---|---|---|---|---|---|---|---|---|---|---|---|---|---|---|---|---|---|
| Styrene | 721 | 54 | 721 | 54 | 721 | 54 | 721 | 54 | 721 | 54 | 721 | 54 | 721 | 54 | — | — | — | — |
| 2-Ethylhexyl acrylate | 614 | 46 | 614 | 46 | 614 | 46 | 614 | 46 | 614 | 46 | 614 | 46 | 614 | 46 | — | — | — | — |

| | Production Examples | | | | | | | | |
|---|---|---|---|---|---|---|---|---|---|
| | A1 | A2 | A3 | A4 | A5 | A6 | A7 | A8 | C1 |
| Hydrocarbon wax *4 | | | | | | | | | |
| Paracohol 6490 (g) | 347 | — | — | 694 | 174 | — | — | 347 | — |
| Paracohol 6420 (g) | — | 347 | — | — | — | — | — | — | — |
| Paracohol 6470 (g) | — | — | 347 | — | — | — | — | — | — |
| HNP-51 (g) | — | — | — | — | — | 347 | — | — | — |
| Esterification catalyst | | | | | | | | | |
| Tin (II) di(2-ethyl hexanoate) (g) | 30 | 30 | 30 | 30 | 30 | 30 | 30 | 30 | 30 |
| Esterification co-catalyst | | | | | | | | | |
| 3,4,5-Trihydroxy benzoic acid (g) | 3 | 3 | 3 | 3 | 3 | 3 | 3 | 3 | 3 |
| Radical Polymerization initiator | | | | | | | | | |
| Dibutyl peroxide (g) | 54 | 54 | 54 | 54 | 54 | 54 | 54 | — | — |
| Radical Polymerization inhibitor | | | | | | | | | |
| 4-tert-Butyl catechol (g) | 0.5 | 0.5 | 0.5 | 0.5 | 0.5 | 0.5 | 0.5 | 3.8 | 3.8 |

| | Production Examples | | | | | | | | |
|---|---|---|---|---|---|---|---|---|---|
| | A1 | A2 | A3 | A4 | A5 | A6 | A7 | A8 | C1 |
| Properties. etc. | | | | | | | | | |
| Content of vinyl-based resin segment (% by mass) *5 | 20 | 20 | 20 | 20 | 20 | 20 | 20 | 0 | 0 |
| Content of hydrocarbon wax (% by mass) *6 | 4.8 | 4.8 | 4.8 | 9.1 | 2.4 | 4.8 | 0 | 4.8 | 0 |
| Softening point (° C.) | 105 | 106 | 105 | 101 | 107 | 106 | 108 | 104 | 118 |

TABLE 1-continued

| | | | | | | | | | |
|---|---|---|---|---|---|---|---|---|---|
| Crystallinity index | 1.9 | 1.8 | 1.8 | 1.9 | 1.8 | 1.8 | 1.8 | 1.9 | 1.7 |
| Glass transition temperature (° C.) | 47 | 48 | 49 | 45 | 51 | 50 | 55 | 48 | 64 |
| Acid value (mgKOH/g) | 19 | 20 | 21 | 20 | 23 | 23 | 22 | 22 | 19 |

Note:
*1: BPA-PO: Polyoxypropylene (2.2)-2,2-bis(4-hydroxyphenyl)propane; BPA-EO: Polyoxyethylene (2.2)-2,2-bis(4-hydroxyphenyl)propane.
*2: Mole parts of respective monomers constituting the raw material monomers (A) and the bireactive monomer on the basis of 100 mole parts of the polyhydric alcohol component in the raw material monomers (A).
*3: Content (% by mass) of respective monomers constituting the raw material monomers (B) on the basis of a total amount of the raw material monomers (B).
*4: Paracohol 6490: Available from Nippon Seiro Co., Ltd.; Mn: 800; melting point: 76° C.; acid value: 18 mgKOH/g; hydroxy value: 97 mgKOH/g. Paracohol 6420: Available from Nippon Seiro Co., Ltd.; Mn: 1000; melting point: 76° C.; acid value: 4 mgKOH/g; hydroxy value: 45 mgKOH/g. Paracohol 6470: Available from Nippon Seiro Co., Ltd.; Mn: 1300; melting point: 90° C.; acid value: 12 mgKOH/g; hydroxy value: 88 mgKOH/g. HNP-51: Hydrocarbon wax containing neither hydroxyl group nor carboxy group; available from Nippon Seiro Co., Ltd.; Mn: 1000; melting point: 77° C.
*5: Content of the vinyl-based resin segment on the basis of 100% by mass of a total amount of the polyester segment and the vinyl-based resin segment. The content of the polyester segment was calculated as a theoretical yield except for an amount of reaction water, and the content of the vinyl-based resin segment was calculated assuming that the content of the radial polymerization initiator was included therein.
*6: Content of the hydrocarbon wax on the basis of 100% by mass of the resin(s). The content of the polyester segment was calculated as a theoretical yield except for an amount of reaction water, and the content of the vinyl-based resin segment was calculated assuming that the content of the radial polymerization initiator was included therein.

TABLE 2

| | | | Production Examples | | | |
|---|---|---|---|---|---|---|
| | | | B1 | | B2 | |
| | | | Crystalline polyester resin No. | | | |
| | | | B-1 | | B-2 | |
| | | | g | mole parts *1 | g | mole parts *1 |
| Raw material monomers | Polyhydric alcohol component | 1,6-Hexanediol | — | — | 2714 | 100 |
| | | 1,10-Decanediol | 3416 | 100 | — | — |
| | Polycarboxylic acid component | Sebacic acid | 4084 | 103 | 4786 | 103 |
| Esterification catalyst | Tin (II) di(2-ethyl hexanoate) (g) | | 16 | | 16 | |
| Properties, etc. | Softening point (° C.) | | 88 | | 72 | |
| | Crystallinity index | | 1.1 | | 1.1 | |
| | Melting point (° C.) | | 77 | | 67 | |
| | Acid value (mgKOH/g) | | 17 | | 21 | |

Note:
*1: Mole parts of respective monomers on the basis of 100 mole parts of the polyhydric alcohol component.

[Production of Aqueous Dispersions of Resin Particles]

Production Example X1

(Production of Resin Particle Aqueous Dispersion X-1)

A 3 L-capacity reaction vessel equipped with a stirrer, a reflux condenser, a dropping funnel, a thermometer and a nitrogen inlet tube was charged with 300 g of the non-crystalline resin A-1 and 180 g of methyl ethyl ketone, and the contents of the reaction vessel were dissolved at 73° C. over 2 hours. The resulting solution was mixed with a 5% by mass sodium hydroxide aqueous solution such that the degree of neutralization of the non-crystalline resin A-1 was 60 mol % on the basis of an acid value of the non-crystalline resin A-1, followed by stirring the resulting mixed solution for 30 minutes.

Next, while maintaining the obtained reaction solution at a temperature of 73° C. and continuously stirring the reaction solution at a rotating speed of 280 r/min (peripheral speed: 88 m/min), 1000 g of deionized water was added thereto over 60 minutes to subject the solution to phase inversion emulsification. While continuously maintaining the resulting solution at a temperature of 73° C., methyl ethyl ketone was removed therefrom by distillation under reduced pressure to obtain an aqueous dispersion. Thereafter, while continuously stirring the thus obtained aqueous dispersion at a rotating speed of 280 r/min (peripheral speed: 88 m/min), the aqueous dispersion was cooled to 30° C., and then deionized water was added thereto such that the solid content of the aqueous dispersion was reduced to 20% by mass, thereby obtaining a resin particle aqueous dispersion X-1. The properties of the thus obtained resin particle aqueous dispersion X-1 are shown in Table 3.

Production Examples X2 to X8, Y1, Y2 and Z1

(Production of Resin Particle Aqueous Dispersions X-2 to X-8, Y-1, Y-2 and Z-1)

The same procedure as in Production Example X1 was repeated except that the kinds of resins used were changed as shown in Table 3, thereby obtaining resin particle aqueous dispersions X-2 to X-8, Y-1, Y-2 and Z-1. The properties of the thus obtained resin particle aqueous dispersions X-2 to X-8, Y-1, Y-2 and Z-1 are shown in Table 3.

Production Example X9

(Production of Resin Particle Aqueous Dispersion X-9)

A 3 L-capacity reaction vessel equipped with a stirrer, a reflux condenser, a dropping funnel, a thermometer and a nitrogen inlet tube was charged with 270 g of the non-crystalline resin A-1, 30 g of the crystalline polyester B-1 and 180 g of methyl ethyl ketone, and the contents of the reaction vessel were dissolved at 73° C. over 2 hours. The resulting solution was mixed with a 5% by mass sodium hydroxide aqueous solution such that the degree of neutralization of the resins was 60 mol % on the basis of the value of [(acid value of non-crystalline resin A-1)×0.9+(acid value of crystalline polyester B-1)×0.1], followed by stirring the resulting mixed solution for 30 minutes.

Next, while maintaining the obtained reaction solution at a temperature of 73° C. and continuously stirring the reaction solution at a rotating speed of 280 r/min (peripheral speed: 88 m/min), 1000 g of deionized water was added thereto over 60 minutes to subject the solution to phase inversion emulsification. While continuously maintaining the resulting solution at a temperature of 73° C., methyl ethyl ketone was removed therefrom by distillation under reduced pressure to obtain an aqueous dispersion. Thereafter, while continuously stirring the thus obtained aqueous dispersion at a rotating speed of 280 r/min (peripheral speed: 88 m/min), the aqueous dispersion was cooled to 30° C., and then deionized water was added thereto such that the solid content of the aqueous dispersion was reduced to 20% by mass, thereby obtaining a resin particle aqueous dispersion X-9. The properties of the thus obtained resin particle aqueous dispersion X-9 are shown in Table 3.

While further maintaining the thus obtained preliminary dispersion at a temperature of 90 to 95° C., the preliminary dispersion was treated twice under a pressure of 20 MPa using a high-pressure wet-type atomizer "NANOMIZER (registered trademark) NM2-L200-D08" available from

TABLE 3

| | Production Examples | | | | | | | | | | | |
|---|---|---|---|---|---|---|---|---|---|---|---|---|
| | X1 | X2 | X3 | X4 | X5 | X6 | X7 | X8 | X9 | Y1 | Y2 | Z1 |
| No. of resin particle aqueous dispersion | X-1 | X-2 | X-3 | X-4 | X-5 | X-6 | X-7 | X-8 | X-9 | Y-1 | Y-2 | Z-1 |
| Resins | A-1 | A-2 | A-3 | A-4 | A-5 | A-6 | A-7 | A-8 | A-1(90)/B-1(10) | B-1 | B-2 | C-1 |
| Volume median particle size $D_{50}$ of resin particles (μm) | 0.16 | 0.18 | 0.17 | 0.18 | 0.15 | 0.19 | 0.14 | 0.17 | 0.16 | 0.13 | 0.13 | 0.14 |
| CV (%) | 27 | 28 | 26 | 28 | 26 | 29 | 26 | 27 | 28 | 26 | 26 | 24 |

[Production of Wax Particle Dispersions]

Production Example D1

(Production of Wax (W2) Particle Dispersion D-1)

A 1 L-capacity beaker was charged with 213 g of deionized water and 5.36 g of an anionic surfactant "LATEMUL (registered tradename) ASK" (aqueous solution of dipotassium alkenyl succinate; concentration of active ingredients: 28% by mass) available from Kao Corporation, and after mixing the contents of the beaker, 50 g of a paraffin wax "HNP-9" (melting point: 75° C.) available from Nippon Seiro Co., Ltd., was added thereto. While maintaining the obtained mixture at a temperature of 95 to 98° C., the mixture was stirred using a homomixer, thereby obtaining a preliminary dispersion.

While further maintaining the thus obtained preliminary dispersion at a temperature of 90 to 95° C., the preliminary dispersion was treated twice under a pressure of 20 MPa using a high-pressure wet-type atomizer "NANOMIZER (registered trademark) NM2-L200-D08" available from Yoshida Kikai Co., Ltd., and then cooled to 25° C., and deionized water was added to the resulting dispersion to control a solid content of the dispersion to 20% by mass, thereby obtaining a wax (W2) particle dispersion D-1. The wax (W2) particles in the resulting wax (W2) particle dispersion D-1 had a volume median particle size ($D_{50}$) of 0.44 μm and CV of 40%.

Production Example D2

(Production of Wax (W2) Particle Dispersion D-2)

A 1 L-capacity beaker was charged with 213 g of deionized water, 5.36 g of an anionic surfactant "LATEMUL (registered tradename) ASK" (aqueous solution of dipotassium alkenyl succinate; concentration of active ingredients: 28% by mass) available from Kao Corporation and 50 g of an ester-based wax "WEP-8" (pentaerythritol behenic acid ester; melting point: 78° C.) available from Nippon Seiro Co., Ltd. While maintaining the contents of the beaker at a temperature of 95 to 98° C., the contents of the beaker were stirred using a homomixer, thereby obtaining a preliminary dispersion.

Yoshida Kikai Co., Ltd., and then cooled to 25° C., and deionized water was added to the resulting dispersion to control a solid content of the dispersion to 20% by mass, thereby obtaining a wax (W2) particle dispersion D-2. The wax (W2) particles in the resulting wax (W2) particle dispersion D-2 had a volume median particle size ($D_{50}$) of 0.40 μm and CV of 38%.

[Production of Colorant Dispersion]

Production Example E1

(Production of Colorant Dispersion E-1)

A 1 L-capacity beaker was charged with 116.2 g of a copper phthalocyanine pigment "ECB-301" available from Dai-Nichi Seika Color & Chemicals Mfg. Co., Ltd., 154.9 g of an anionic surfactant "NEOPELEX (registered tradename) G-15" (a 15% by mass aqueous solution of sodium dodecylbenzenesulfonate) available from Kao Corporation and 340 g of deionized water. The contents of the beaker were mixed and dispersed using a homogenizer at room temperature for 3 hours, and then deionized water was added to the resulting dispersion such that the solid content of the dispersion was reduced to 24% by mass, thereby obtaining a colorant dispersion E-1. The colorant particles in the resulting colorant dispersion E-1 had a volume median particle size ($D_{50}$) of 0.118 μm.

[Production of Toners]

Example 1

(Production of Toner 1)

A 3 L-capacity four-necked flask equipped with a dehydration tube, a stirrer and a thermocouple was charged with 270 g of the resin particle aqueous dispersion X-1, 30 g of the resin particle aqueous dispersion Y-1, 28 g of the wax (W2) particle dispersion D-1, 23 g of the colorant dispersion E-1 and 6 g of a 10% by mass aqueous solution of a nonionic surfactant "EMULGEN (registered trademark) 150" (a polyoxyethylene (50 mol) lauryl ether) available from Kao Corporation, and the contents of the flask were mixed with each other at 25° C. Then, while stirring the resulting mixture, a mixed solution prepared by adding a 4.8% by mass potassium hydroxide aqueous solution to an aqueous solution obtained by dissolving 17 g of ammonium sulfate in 178 g of deionized water to thereby control a pH value of the solution to 8.1 was added dropwise to the mixture at 25° C. over 5 minutes. Thereafter, the resulting dispersion was heated to 60° C. over 2 hours, and maintained at 60° C. until a volume median particle size ($D_{50}$) of aggregated particles formed therein reached 5.1 µm, thereby obtaining a dispersion of aggregated particles (1).

Then, a mixed aqueous solution prepared by mixing 9.4 g of an anionic surfactant "EMAL (registered trademark) E-27C" (sodium polyoxyethylene laurylethersulfate; concentration of active ingredients: 27% by mass) available from Kao Corporation and 970 g of deionized water was added to the thus obtained dispersion of the aggregated particles (1). Thereafter, the resulting mixture was heated to 73° C. over 1 hour and maintained at 73° C. until a circularity of the resulting particles reached 0.970, thereby obtaining a dispersion of toner particles.

The resulting dispersion of the toner particles was cooled to 30° C., and subjected to suction filtration to separate solid components therefrom. The thus separated solid components were rinsed with deionized water and then dried at 33° C., thereby obtaining toner particles. The properties of the thus obtained toner particles are shown in Table 4. One hundred parts by mass of the toner particles were charged together with 2.5 parts by mass of a hydrophobic silica "RY50" (number-average particle size: 0.04 µm) available from Nippon Aerosil Co., Ltd., and 1.0 part by mass of a hydrophobic silica "CAB-O-SIL (registered trademark) TS720" (number-average particle size: 0.012 µm) available from Cabot Japan K.K., into a Henschel mixer, followed by mixing the contents of the mixer while stirring. The resulting mixture was then allowed to pass through a 150 mesh sieve, thereby obtaining a toner 1. Evaluation results of the thus obtained toner are shown in Table 4.

Examples 2, 3 and 6 to 10 and Comparative Examples 1 and 2

(Production of Toners 2, 3, 6 to 10, 13 and 14)

The same procedure as in Example 1 was repeated except that the resin particle aqueous dispersion and the wax particle dispersion used were changed as shown in Table 4, thereby obtaining toners 2, 3, 6 to 10, 13 and 14. Properties and evaluation results of the thus obtained toners are shown in Table 4.

Example 4

(Production of Toner 4)

The same procedure as in Example 1 was repeated except that the amounts of the resin particle aqueous dispersion X-1 and the resin particle aqueous dispersion Y-1 used were changed to 285 g and 15 g, respectively, thereby obtaining a toner 4. Properties and evaluation results of the thus obtained toner are shown in Table 4.

Example 5

(Production of Toner 5)

The same procedure as in Example 1 was repeated except that the amounts of the resin particle aqueous dispersion X-1 and the resin particle aqueous dispersion Y-1 used were changed to 240 g and 60 g, respectively, thereby obtaining a toner 5. Properties and evaluation results of the thus obtained toner are shown in Table 4.

Example 11

(Production of Toner 11)

The same procedure as in Example 1 was repeated except that 270 g of the resin particle aqueous dispersion X-1 and 30 g of the resin particle aqueous dispersion Y-1 were replaced with 300 g of the resin particle aqueous dispersion X-9, thereby obtaining a toner 11. Properties and evaluation results of the thus obtained toner are shown in Table 4.

Example 12

(Production of Toner 12)

A 3 L-capacity four-necked flask equipped with a dehydration tube, a stirrer and a thermocouple was charged with 270 g of the resin particle aqueous dispersion X-1, 30 g of the resin particle aqueous dispersion Y-1, 28 g of the wax (W2) particle dispersion D-1, 23 g of the colorant dispersion E-1 and 6 g of a 10% by mass aqueous solution of a nonionic surfactant "EMULGEN (registered trademark) 150" (a polyoxyethylene (50 mol) lauryl ether) available from Kao Corporation, and the contents of the flask were mixed with each other at 25° C. Then, while stirring the resulting mixture, a mixed solution prepared by adding a 4.8% by mass potassium hydroxide aqueous solution to an aqueous solution obtained by dissolving 17 g of ammonium sulfate in 178 g of deionized water to thereby control a pH value of the solution to 8.1 was added dropwise to the mixture at 25° C. over 5 minutes. Thereafter, the resulting dispersion was heated to 57° C. over 2 hours, and maintained at 57° C. until a volume median particle size ($D_{50}$) of aggregated particles formed therein reached 4.3 µm, thereby obtaining a dispersion of aggregated particles (1).

While maintaining the thus obtained dispersion of the aggregated particles (1) at a temperature of 57° C., 79 g of the resin particle aqueous dispersion Z-1 was added dropwise thereinto at a rate of 0.3 mL/minute to thereby obtain a dispersion of aggregated particles (2).

Then, an aqueous solution prepared by mixing 10 g of an anionic surfactant "EMAL (registered trademark) E-27C" (sodium polyoxyethylene laurylethersulfate; concentration of active ingredients: 27% by mass) available from Kao Corporation and 1000 g of deionized water was added to the thus obtained dispersion of the aggregated particles (2). Thereafter, the resulting mixture was heated to 73° C. over 1 hour and maintained at 73° C. until a circularity of the resulting particles reached 0.970, thereby obtaining a dispersion of toner particles.

The resulting dispersion of the toner particles was cooled to 30° C., and subjected to suction filtration to separate solid components therefrom. The thus separated solid components were rinsed with deionized water and then dried at 33° C., thereby obtaining toner particles. The properties of the thus obtained toner particles are shown in Table 4. One hundred parts by mass of the toner particles were charged together with 2.5 parts by mass of a hydrophobic silica "RY50" (number-average particle size: 0.04 µm) available from Nippon Aerosil Co., Ltd., and 1.0 part by mass of a hydrophobic silica "CAB-O-SIL (registered trademark) TS720" (number-average particle size: 0.012 µm) available from Cabot Japan K.K., into a Henschel mixer, followed by mixing the contents of the mixer while stirring. The resulting mixture was then allowed to pass through a 150 mesh sieve, thereby obtaining a toner 12. Evaluation results of the thus obtained toner are shown in Table 4.

Comparative Example 3

(Production of Toner 15)

The same procedure as in Example 1 was repeated except that the resin particle aqueous dispersion X-1 was used in an amount of 300 g, and no resin particle aqueous dispersion Y-1 was used, thereby obtaining a toner 15. Properties and evaluation results of the thus obtained toner are shown in Table 4.

TABLE 4

| | | Examples | | | | | | | | | | | | Comparative Examples | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 |
| Step (1) | Non-crystalline resin (A) | A-1 | A-1 | A-1 | A-1 | A-1 | A-2 | A-3 | A-4 | A-5 | A-8 | A-1 | A-1 | A-6 | A-7 | A-1 |
| | Kind of wax (W1) *1 | P6490 | P6490 | P6490 | P6490 | P6490 | P6420 | P6470 | P6490 | P6490 | P6490 | P6490 | P6490 | HNP-51 | | P6490 |
| Step (3) | Resin particles (X) | X-1 | X-1 | X-1 | X-1 | X-1 | X-2 | X-3 | X-4 | X-5 | X-8 | X-9 | X-1 | X-6 | X-7 | X-1 |
| | Resin particles (Y) | Y-1 | Y-1 | Y-1 | Y-1 | Y-1 | Y-1 | Y-1 | Y-1 | Y-1 | Y-1 | | Y-1 | Y-1 | Y-1 | |
| | Wax (W2) | D-1 | D-1 | D-2 | D-1 | D-1 | D-1 | D-1 | D-1 | D-1 | D-1 | D-1 | D-1 | D-1 | D-1 | D-1 |
| | Mass ratio between waxes [(W2)/(W1)] | 1.6 | 1.6 | 1.6 | 1.7 | 1.4 | 1.6 | 1.6 | 0.8 | 3.3 | 1.6 | 1.6 | 1.6 | 1.6 | 1.6 | 1.6 |
| | Resin particles (Z) | | | | | | | | | | | | Z-1 | | | |
| Properties of toner particles | Toner No. | 1 | 2 | 3 | 4 | 5 | 6 | 7 | 8 | 9 | 10 | 11 | 12 | 13 | 14 | 15 |
| | Volume median particle size D$_{50}$ (μm) | 5.0 | 5.1 | 5.1 | 5.0 | 5.1 | 5.0 | 5.0 | 4.9 | 5.1 | 5.0 | 5.1 | 5.1 | 4.9 | 5.1 | 5.0 |
| | CV (%) | 20.4 | 20.3 | 21.6 | 20.2 | 22.4 | 21.1 | 20.8 | 20.3 | 20.4 | 20.7 | 20.3 | 20.1 | 21.4 | 21.7 | 20.7 |
| | | Examples | | | | | | | | | | | | Examples | | |
| | | 1 | 2 | 3 | 4 | 5 | 6 | 7 | 8 | 9 | 10 | 11 | 12 | 1 | 2 | 3 |
| | Appearance of supernatant solution after completion of coalescing step | *TP | *TP | *TP | *TP | *TP | *TP | *TP | *TP | *TP | *TP | *TP | *TP | *WT | *WT | *TP |
| Low-temperature fusing properties of toner | Lowest fusing temperature (°C.) | 105 | 105 | 105 | 110 | 105 | 110 | 105 | 105 | 110 | 105 | 105 | 110 | 115 | 115 | 135 |
| Charging properties of toner | Charge distribution | | | | | | | | | | | | | | | |
| | Charge (μC/g) Under NN | 0.4 | 0.4 | 0.5 | 0.4 | 0.5 | 0.7 | 0.5 | 0.4 | 0.6 | 0.4 | 0.5 | 0.4 | 0.9 | 0.8 | 0.4 |
| | Under HH | -37 | -36 | -35 | -38 | -34 | -35 | -36 | -36 | -35 | -36 | -36 | -37 | -28 | -30 | -37 |
| | | -34 | -32 | -30 | -36 | -29 | -29 | -31 | -34 | -30 | -32 | -33 | -36 | -14 | -16 | -34 |
| | Variation in charge ratio under under | 0.92 | 0.89 | 0.86 | 0.95 | 0.85 | 0.83 | 0.86 | 0.94 | 0.86 | 0.89 | 0.92 | 0.97 | 0.50 | 0.53 | 0.92 |

TABLE 4-continued

| | | | | | | | | | | |
|---|---|---|---|---|---|---|---|---|---|---|
| HH | 1.5 | 1.5 | 1.4 | 1.5 | 1.4 | 1.3 | 1.4 | 1.5 | 1.5 | 1.4 |
| HH/ under NN | | | | | | | | | 1.3 | 1.2 | 1.2 | 1.4 |
| Optical density of printed images | | | | | | | | | | | |

Note:
*1: P6490, P6420 and P6470 indicate "Paracohol 6490", "Paracohol 6420" and "Paracohol 6470", respectively.
*TP: Transparent.
*WT: White turbidity.

From Table 4, it was confirmed that the toners obtained in Examples 1 to 12 were excellent in low-temperature fusing properties and charging properties as well as optical density of printed images obtained using the toners, as compared to the toners obtained in Comparative Examples 1 to 3.

INDUSTRIAL APPLICABILITY

In the process for producing a toner for development of electrostatic images according to the present invention, it is possible to produce a toner for development of electrostatic images which is excellent in low-temperature fusing properties and charging properties as well as optical density of printed images obtained using the toner.

The invention claimed is:

1. A process for producing a toner for development of electrostatic images, the process comprising:
   subjecting a polyhydric alcohol component and a polycarboxylic acid component to a polycondensation reaction in the presence of a hydrocarbon wax (W1) to obtain a non-crystalline resin (A) comprising a polyester moiety and a constitutional component derived from the hydrocarbon wax (W1);
   dispersing the non-crystalline resin (A) in an aqueous medium to obtain an aqueous dispersion comprising resin particles (X);
   aggregating the resin particles (X) in an aqueous medium in the presence of a crystalline polyester (B) to obtain aggregated particles, wherein a mass ratio of the non-crystalline resin (A) to the crystalline polyester (B), [(A)/(B)], is not less than 70/30 and not more than 98/2; and
   coalescing the aggregated particles,
   wherein:
   the hydrocarbon wax (W1) comprises hydroxy groups and carboxy groups,
   a melting point of the hydrocarbon wax (W1) is not lower than 60° C. and not higher than 120° C., and
   a content of the constitutional component derived from the hydrocarbon wax (W1) in the non-crystalline resin (A) is not less than 0.7% by mass and not more than 15% by mass.

2. The process for producing a toner for development of electrostatic images according to claim 1, wherein the aggregating is aggregating the resin particles (X) in the aqueous medium in the presence of the crystalline polyester (B) to obtain aggregated particles (1); and wherein the coalescing is coalescing the aggregated particles (1).

3. The process for producing a toner for development of electrostatic images according to claim 1, wherein the aggregating comprises:
   aggregating the resin particles (X) in the aqueous medium in the presence of the crystalline polyester (B) to obtain aggregated particles (1); followed by
   adding resin particles (Z) comprising a non-crystalline polyester (C) to the aggregated particles (1) to obtain aggregated particles (2) formed by adhering the resin particles (Z) onto the aggregated particles (1); and
   wherein the coalescing is coalescing the aggregated particles (2).

4. The process for producing a toner for development of electrostatic images according to claim 3, wherein the adding comprises adding an aqueous dispersion comprising the resin particles (Z) comprising the non-crystalline polyester (C) to a dispersion comprising the aggregated particles (1) to obtain a dispersion comprising the aggregated particles (2) formed by adhering the resin particles (Z) onto the aggregated particles (1).

5. The process for producing a toner for development of electrostatic images according to claim 2, wherein the aggregating comprises mixing the aqueous dispersion comprising the resin particles (X) and an aqueous dispersion comprising resin particles (Y) comprising the crystalline polyester (B) to aggregate the resin particles (X) and the resin particles (Y), thereby obtaining the dispersion comprising the aggregated particles (1).

6. The process for producing a toner for development of electrostatic images according to claim 1, wherein the aggregating comprises aggregating the resin particles (X) in the aqueous medium in the presence of the crystalline polyester (B) and a wax (W2) to obtain the aggregated particles.

7. The process for producing a toner for development of electrostatic images according to claim 2, wherein the aggregating comprises aggregating the resin particles (X) in the aqueous medium in the presence of the crystalline polyester (B) and a wax (W2) to obtain the aggregated particles (1).

8. The process for producing a toner for development of electrostatic images according to claim 7, wherein the aggregating comprises mixing the aqueous dispersion comprising the resin particles (X), an aqueous dispersion comprising resin particles (Y) comprising the crystalline polyester (B), and a wax particle dispersion comprising wax (W2) to aggregate the resin particles (X), the resin particles (Y), and the wax (W2) particles, thereby obtaining the dispersion comprising the aggregated particles (1).

9. The process for producing a toner for development of electrostatic images according to claim 1, wherein a number-average molecular weight of the hydrocarbon wax (W1) is not less than 500 and not more than 2000.

10. The process for producing a toner for development of electrostatic images according to claim 1, wherein the crystalline polyester (B) is produced by subjecting a polyhydric alcohol component comprising an α,ω-aliphatic diol having not less than 4 and not more than 16 carbon atoms in an amount of not less than 80 mol % and a polycarboxylic acid component comprising an aliphatic saturated dicarboxylic acid having not less than 8 and not more than 16 carbon atoms in an amount of not less than 80 mol % to a polycondensation reaction.

11. The process for producing a toner for development of electrostatic images according to claim 1, wherein an amount of the hydrocarbon wax (W1) is controlled such that a content of the hydrocarbon wax (W1) in raw materials constituting the non-crystalline resin (A) is not less than 1% by mass and not more than 15% by mass.

12. The process for producing a toner for development of electrostatic images according to claim 1, wherein the polyester moiety of the non-crystalline resin (A) is a segment comprising a polyester resin produced by subjecting a polyhydric alcohol component (A-al) and a polycarboxylic acid component (A-ac) to a polycondensation reaction, and a content of an alkyleneoxide adduct of bisphenol A in the polyhydric alcohol component (A-al) is not less than 80 mol %.

13. The process for producing a toner for development of electrostatic images according to claim 12, wherein the alkyleneoxide adduct of bisphenol A is a propyleneoxide adduct of bisphenol A.

14. The process for producing a toner for development of electrostatic images according to claim 1, wherein the non-crystalline resin (A) comprises the constitutional component derived from the hydrocarbon wax (W1) and the non-crystalline resin (A) is in the form of a composite resin comprising a polyester segment (a1) comprising:
- a polyester resin produced by subjecting a polyhydric alcohol component and a polycarboxylic acid component to a polycondensation reaction, and
- a vinyl-based resin segment (a2).

15. The process for producing a toner for development of electrostatic images according to claim 14, wherein a raw material vinyl monomer constituting the vinyl-based resin segment (a2) comprises styrene and an alkyl (meth)acrylate comprising an alkyl group having not less than 6 and not more than 20 carbon atoms.

16. The process for producing a toner for development of electrostatic images according to claim 14, wherein the composite resin comprises a constitutional unit derived from a bireactive monomer.

17. The process for producing a toner for development of electrostatic images according to claim 3, wherein the non-crystalline polyester (C) is a polyester resin produced by subjecting a polyhydric alcohol component (C-al) and a polycarboxylic acid component (C-ac) to a polycondensation reaction, and a content of an alkyleneoxide adduct of bisphenol A in the polyhydric alcohol component (C-al) is not less than 80 mol %.

18. The process for producing a toner for development of electrostatic images according to claim 17, wherein the alkyleneoxide adduct of bisphenol A is an ethyleneoxide adduct of bisphenol A.

19. The process for producing a toner for development of electrostatic images according to claim 1, wherein the process does not comprise kneading toner components.

20. The process for producing a toner for development of electrostatic images according to claim 1, wherein the hydrocarbon wax (W1) has an acid value of not less than 5 mgKOH/g.

21. The process for producing a toner for development of electrostatic images according to claim 1, wherein the hydrocarbon wax (W1) has an acid value of not less than 8 mgKOH/g.

* * * * *